(12) United States Patent
Sprague et al.

(10) Patent No.: US 12,418,220 B2
(45) Date of Patent: Sep. 16, 2025

(54) BATTERY-POWERED STAND-ALONE MOTOR UNIT

(71) Applicant: MILWAUKEE ELECTRIC TOOL CORPORATION, Brookfield, WI (US)

(72) Inventors: Connor P. Sprague, Milwaukee, WI (US); Evan M. Glanzer, Milwaukee, WI (US); John E. Koller, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 229 days.

(21) Appl. No.: 17/092,871

(22) Filed: Nov. 9, 2020

(65) Prior Publication Data

US 2021/0143709 A1  May 13, 2021

Related U.S. Application Data

(60) Provisional application No. 62/945,337, filed on Dec. 9, 2019, provisional application No. 62/932,705, filed on Nov. 8, 2019.

(51) Int. Cl.
| | | |
|---|---|---|
| *H02K 11/00* | (2016.01) | |
| *H01M 10/42* | (2006.01) | |
| *H01M 50/20* | (2021.01) | |
| *H02K 7/00* | (2006.01) | |
| *H02K 7/116* | (2006.01) | |

(Continued)

(52) U.S. Cl.
CPC ...... *H02K 11/0094* (2013.01); *H01M 10/425* (2013.01); *H01M 50/20* (2021.01); *H02K 7/003* (2013.01); *H02K 7/116* (2013.01); *H02K 11/27* (2016.01); *H02K 11/33* (2016.01);

(Continued)

(58) Field of Classification Search
CPC .... H02K 11/0094; H02K 7/003; H02K 7/116; H02K 11/27; H02K 11/33; H02K 11/28; H01M 10/425; H01M 50/20; H01M 2220/20; H01M 50/213; H01M 50/204;

(Continued)

(56) References Cited

U.S. PATENT DOCUMENTS

| 2,386,508 A | 10/1945 | Ripley |
|---|---|---|
| 2,478,829 A | 8/1949 | Lechtenberg |

(Continued)

FOREIGN PATENT DOCUMENTS

| CN | 201937372 U | 8/2011 |
|---|---|---|
| DE | 4126311 A1 | 2/1993 |

(Continued)

OTHER PUBLICATIONS

KR20090012730A English Translation (Year: 2022).*
International Search Report and Written Opinion for Application No. PCT/US2020/059655 dated Feb. 26, 2021 (9 pages).

*Primary Examiner* — Christopher M Koehler
*Assistant Examiner* — Viswanathan Subramanian
(74) *Attorney, Agent, or Firm* — Michael Best & Friedrich LLP

(57) ABSTRACT

A stand-alone motor unit for use with a piece of power equipment includes a housing, an electric motor, a battery pack to provide power to the motor, a battery receptacle arranged on the housing and configured to receive the battery pack, and a control panel arranged on either the housing or the piece of power equipment. The control panel is operable to control operation of the electric motor.

20 Claims, 34 Drawing Sheets

(51) Int. Cl.
*H02K 11/27* (2016.01)
*H02K 11/33* (2016.01)
*H02P 6/28* (2016.01)
*B08B 9/032* (2006.01)

(52) U.S. Cl.
CPC .............. *H02P 6/28* (2016.02); *B08B 9/0321* (2013.01); *H01M 2220/20* (2013.01)

(58) Field of Classification Search
CPC .......... H01M 50/244; H02P 6/28; H02P 6/16; B08B 9/0321; Y02E 60/10
See application file for complete search history.

(56) References Cited

U.S. PATENT DOCUMENTS

| | | | |
|---|---|---|---|
| 2,930,322 A | 3/1960 | Spencer | |
| 3,040,590 A | 6/1962 | Smithburn | |
| 3,254,746 A | 6/1966 | Myers | |
| 3,846,599 A * | 11/1974 | Fontaine | B60W 10/18 200/61.89 |
| 4,145,864 A | 3/1979 | Brewster | |
| 4,500,226 A | 2/1985 | Romand-Monnier et al. | |
| 4,759,560 A | 7/1988 | Virgulti | |
| 4,810,174 A | 3/1989 | Stuckey et al. | |
| 4,848,961 A | 7/1989 | Rouillard | |
| 4,861,188 A | 8/1989 | Rouillard | |
| 5,111,127 A | 5/1992 | Johnson | |
| 5,372,452 A | 12/1994 | Hodgson | |
| D375,963 S | 11/1996 | Braun et al. | |
| 5,583,416 A | 12/1996 | Klang | |
| 5,725,304 A | 3/1998 | Inai | |
| 5,765,671 A | 6/1998 | Endo et al. | |
| 5,787,693 A | 8/1998 | Dyke | |
| 5,819,513 A | 10/1998 | Braun et al. | |
| 5,894,715 A | 4/1999 | Braun et al. | |
| 6,139,217 A | 10/2000 | Reuter | |
| 6,263,979 B1 | 7/2001 | Dyke et al. | |
| 6,296,467 B1 | 10/2001 | Rouillard | |
| 6,485,340 B1 * | 11/2002 | Kolb | B63H 21/213 440/86 |
| 6,534,958 B1 | 3/2003 | Graber et al. | |
| 6,543,926 B2 | 4/2003 | Sherez | |
| 6,606,845 B1 | 8/2003 | Spies | |
| 6,707,203 B2 | 3/2004 | Wickham | |
| 6,751,109 B2 | 6/2004 | Doss et al. | |
| 6,922,981 B1 | 8/2005 | Tyree | |
| 6,928,353 B2 | 8/2005 | Finley et al. | |
| 6,963,153 B1 | 11/2005 | Su | |
| 7,021,599 B2 | 4/2006 | Degrazia et al. | |
| 7,097,384 B2 | 8/2006 | Lindley | |
| 7,153,058 B2 | 12/2006 | Lindley | |
| 7,526,833 B2 | 5/2009 | Cochran et al. | |
| 7,539,570 B2 | 5/2009 | Normann | |
| 7,549,822 B2 | 6/2009 | Rouillard | |
| 7,572,082 B2 | 8/2009 | Rouillard | |
| 7,621,194 B1 | 11/2009 | Tyree | |
| 7,653,963 B2 | 2/2010 | Cochran et al. | |
| 7,659,696 B2 | 2/2010 | Zeiler et al. | |
| 7,677,017 B2 | 3/2010 | Holby | |
| 7,738,979 B2 | 6/2010 | Schmuck et al. | |
| 7,832,513 B2 | 11/2010 | Verbrugge et al. | |
| 7,856,714 B2 | 12/2010 | Hyde et al. | |
| 8,303,266 B2 | 11/2012 | Rush et al. | |
| 8,365,350 B2 | 2/2013 | Cochran et al. | |
| 8,528,782 B2 * | 9/2013 | Mergener | F16N 11/04 222/37 |
| 8,575,800 B1 | 11/2013 | Fox et al. | |
| 8,601,685 B2 | 12/2013 | Hyde et al. | |
| 8,757,925 B2 | 6/2014 | Banchio | |
| 8,910,459 B2 | 12/2014 | Abe et al. | |
| 9,030,040 B2 | 5/2015 | Tarasinki et al. | |
| 9,063,530 B2 | 6/2015 | Lougheed et al. | |
| 9,139,966 B1 | 9/2015 | Mikowychok | |
| 9,397,531 B2 | 7/2016 | Mikowychok | |
| 9,510,504 B2 | 12/2016 | Morita et al. | |
| 9,991,825 B1 | 6/2018 | Ackerman et al. | |
| 2002/0079853 A1 | 6/2002 | Schmitz et al. | |
| 2003/0144774 A1 | 7/2003 | Trissel et al. | |
| 2003/0209645 A1 | 11/2003 | Degrazia et al. | |
| 2004/0035625 A1 | 2/2004 | Talbot et al. | |
| 2005/0156564 A1 | 7/2005 | Krieger | |
| 2006/0048601 A1 | 3/2006 | Chiao | |
| 2006/0288680 A1 | 12/2006 | Holby | |
| 2007/0120366 A1 | 5/2007 | Grant et al. | |
| 2007/0130899 A1 | 6/2007 | Osborne | |
| 2008/0012521 A1 | 1/2008 | Katsumata et al. | |
| 2008/0038073 A1 | 2/2008 | Paolicelli | |
| 2008/0120955 A1 | 5/2008 | Lucal et al. | |
| 2008/0141542 A1 | 6/2008 | Hung | |
| 2008/0143201 A1 | 6/2008 | Gannon et al. | |
| 2008/0236543 A1 * | 10/2008 | Yoshizawa | B62K 23/04 123/399 |
| 2008/0250570 A1 | 10/2008 | Dayton et al. | |
| 2008/0253221 A1 | 10/2008 | Lindley | |
| 2009/0028653 A1 | 1/2009 | Wilbert et al. | |
| 2009/0283343 A1 | 11/2009 | Wurth | |
| 2010/0025131 A1 | 2/2010 | Gloceri et al. | |
| 2010/0058726 A1 | 3/2010 | Notaras et al. | |
| 2010/0326481 A1 | 12/2010 | Buckner | |
| 2011/0094129 A1 | 4/2011 | Rowe et al. | |
| 2011/0115436 A1 | 5/2011 | Zhang et al. | |
| 2012/0007457 A1 | 1/2012 | Andersson et al. | |
| 2012/0227994 A1 | 9/2012 | Yang et al. | |
| 2012/0256568 A1 | 10/2012 | Lee | |
| 2012/0318600 A1 | 12/2012 | Hakamata et al. | |
| 2013/0036727 A1 | 2/2013 | Heichel et al. | |
| 2013/0180495 A1 | 7/2013 | Veerathappa et al. | |
| 2014/0095002 A1 | 3/2014 | Crecelius et al. | |
| 2014/0165946 A1 * | 6/2014 | Yanagihara | F02N 11/0803 123/179.1 |
| 2014/0241105 A1 | 8/2014 | Jin | |
| 2015/0003135 A1 | 1/2015 | Chen et al. | |
| 2015/0007543 A1 * | 1/2015 | Goman | A01D 34/43 56/14.7 |
| 2015/0017632 A1 | 1/2015 | Matsuzaki et al. | |
| 2015/0061413 A1 | 3/2015 | Janarthanam et al. | |
| 2015/0084606 A1 | 3/2015 | Nakamura et al. | |
| 2015/0165602 A1 | 6/2015 | Seith et al. | |
| 2015/0171632 A1 | 6/2015 | Fry et al. | |
| 2015/0207431 A1 | 7/2015 | Brotto et al. | |
| 2015/0231975 A1 | 8/2015 | Ishii et al. | |
| 2015/0314692 A1 | 11/2015 | Inoue | |
| 2015/0316913 A1 | 11/2015 | Rickey et al. | |
| 2016/0007525 A1 | 1/2016 | Drew et al. | |
| 2016/0020443 A1 | 1/2016 | White et al. | |
| 2016/0061227 A1 | 3/2016 | Spohr | |
| 2016/0242356 A1 | 8/2016 | Velderman et al. | |
| 2016/0311102 A1 * | 10/2016 | Ebner | H01M 50/247 |
| 2017/0015455 A1 | 1/2017 | Baskin et al. | |
| 2017/0120435 A1 | 5/2017 | Palich et al. | |
| 2017/0136864 A1 | 5/2017 | Ito et al. | |
| 2017/0271939 A1 | 9/2017 | Kaneko et al. | |
| 2017/0271941 A1 | 9/2017 | Kaneko et al. | |
| 2017/0306575 A1 | 10/2017 | Utterodt et al. | |
| 2018/0138839 A1 * | 5/2018 | Puzio | H02K 11/28 |
| 2018/0331597 A1 | 11/2018 | Schulenberg | |
| 2018/0346047 A1 | 12/2018 | Fielder | |
| 2019/0006909 A1 * | 1/2019 | Nagahama | H02K 11/21 |
| 2019/0006980 A1 | 1/2019 | Sheeks et al. | |
| 2019/0232478 A1 | 8/2019 | Zawisza et al. | |
| 2019/0237715 A1 | 8/2019 | Seman et al. | |
| 2019/0238083 A1 | 8/2019 | White et al. | |
| 2019/0290210 A1 | 9/2019 | Mclaughlin | |
| 2019/0341826 A1 * | 11/2019 | Zeiler | H02K 5/04 |

FOREIGN PATENT DOCUMENTS

| | | |
|---|---|---|
| EP | 0192469 A2 | 8/1986 |
| EP | 1304026 B1 | 9/2005 |
| EP | 2072192 A1 | 6/2009 |
| EP | 1267001 B1 | 9/2009 |
| EP | 3322086 A2 | 5/2018 |
| EP | 3523869 A1 | 8/2019 |

(56) References Cited

FOREIGN PATENT DOCUMENTS

| | | | |
|---|---|---|---|
| JP | 2008274925 | A | 11/2008 |
| JP | 4193683 | B2 | 12/2008 |
| JP | 4337522 | B2 | 9/2009 |
| KR | 1020090012730 | A | 2/2009 |
| WO | 91002845 | A1 | 3/1991 |
| WO | 2008113101 | A1 | 9/2008 |
| WO | 2013043117 | A1 | 3/2013 |
| WO | 2014157463 | A1 | 10/2014 |
| WO | 2016145324 | A1 | 9/2016 |
| WO | 2017220009 | A1 | 12/2017 |
| WO | 2018067506 | A1 | 4/2018 |
| WO | 2018067986 | A1 | 4/2018 |
| WO | 2018081397 | A1 | 5/2018 |
| WO | 2018085411 | A1 | 5/2018 |
| WO | 2018165453 | A1 | 9/2018 |
| WO | 2019058439 | A1 | 3/2019 |

\* cited by examiner

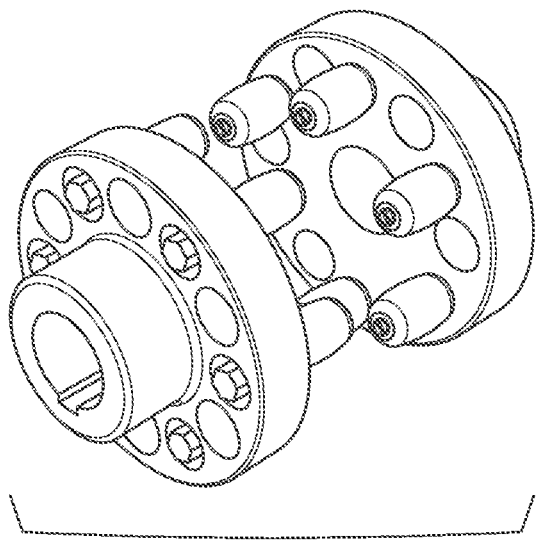
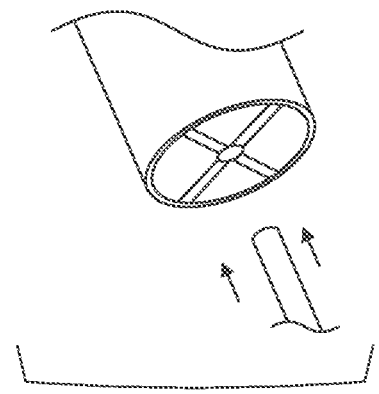
FIG. 39
FIG. 40
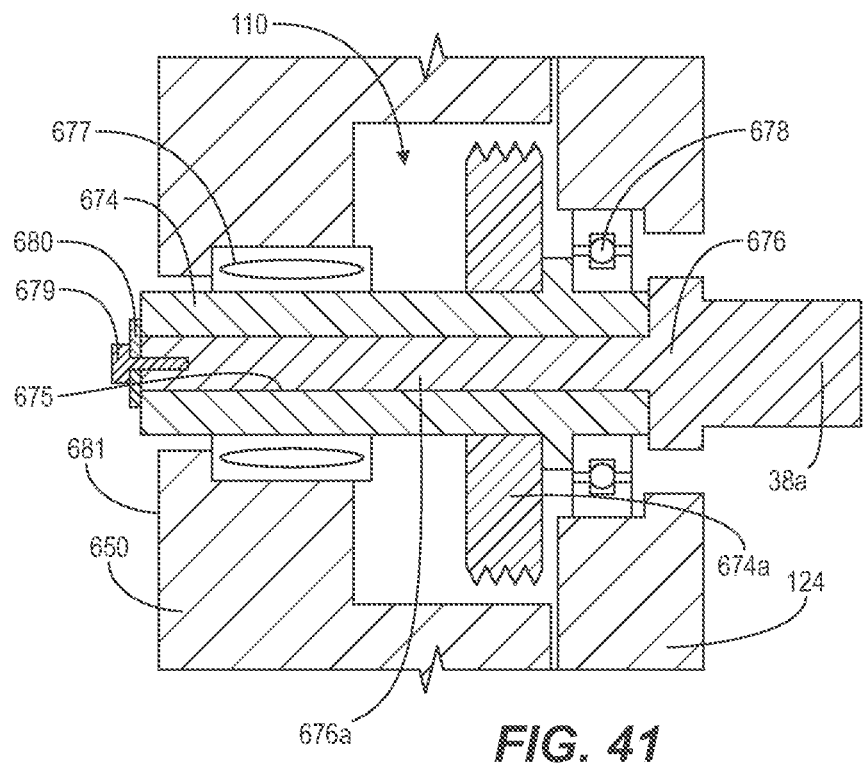
FIG. 41

BATTERY-POWERED STAND-ALONE MOTOR UNIT

CROSS REFERENCE TO RELATED APPLICATIONS

This application claims priority to U.S. Provisional Patent Application No. 62/945,337, filed on Dec. 9, 2019, and U.S. Provisional Patent Application No. 62/932,705, filed on Nov. 8, 2019, the entire contents of both of which are incorporated herein by reference.

FIELD OF THE INVENTION

The present invention relates to motor units, and more particularly to motor units for use with power equipment.

BACKGROUND OF THE INVENTION

Small, single or multi-cylinder gasoline engines can be mounted to power equipment to drive the equipment with a power take-off shaft.

SUMMARY OF THE INVENTION

The present invention provides, in one aspect, a stand-alone motor unit for use with a piece of power equipment. The motor unit includes a housing, an electric motor, a battery pack to provide power to the motor, a battery receptacle arranged on the housing and configured to receive the battery pack, and a control panel arranged on either the housing or the piece of power equipment. The control panel is operable to control operation of the electric motor.

The present invention provides, in another aspect, a stand-alone motor unit for use with a piece of power equipment. The motor unit includes a housing, an electric motor, a battery pack to provide power to the motor, a battery receptacle arranged on the housing and configured to receive the battery pack, a power take-off shaft receiving torque from the motor, a throttle in communication with the motor, the throttle movable to adjust the rotational speed of the power take-off shaft, and a switch located adjacent the throttle. The switch is activated and the rotational speed of the power take-off shaft is adjusted, in sequence, in response to actuation of the throttle.

The present invention provides, in a further aspect, a stand-alone motor unit for use with a piece of power equipment. The motor unit includes a housing, an electric motor, a battery pack to provide power to the motor, a battery receptacle arranged on the housing and configured to receive the battery pack, a power take-off shaft receiving torque from the motor, a throttle in communication with the motor, the throttle movable between a first position and a second position to adjust the rotational speed of the power take-off shaft.

The present invention provides, in yet another aspect, a stand-alone motor unit for use with a piece of power equipment. The motor unit includes a housing, an electric motor, a battery pack to provide power to the motor, a battery receptacle arranged on the housing and configured to receive the battery pack, a power take-off shaft receiving torque from the motor, a throttle in communication with the motor, the throttle operable to adjust the rotational speed of the power take-off shaft, and a bracket movable between a first position, in which the throttle is preset to only function in a first mode of operation, and a second position, in which the throttle is preset to only function in a second mode of operation. When the bracket is in the first position, the throttle is only adjustable between two different positions. And, when the bracket is in the second position, the throttle is adjustable within a range of positions between the first position and the second position.

The present invention provides, in yet another aspect, a stand-alone motor unit for use with a piece of power equipment. The motor unit includes a housing, an electric motor, a battery pack to provide power to the motor, a battery receptacle arranged on the housing and configured to receive the battery pack, and a throttle in communication with the electric motor. The throttle is movable between a first position, in which the motor operates in a first mode, and a second position, in which the motor operates in a second mode that is different than the first mode.

Other features and aspects of the invention will become apparent by consideration of the following detailed description and accompanying drawings.

BRIEF DESCRIPTION OF THE DRAWINGS

FIG. 39 is a perspective view of a peg coupling arrangement for the coupling mechanism of FIG. 33 or 34.

FIG. 40 is a perspective view of a female collar with radial fasteners coupling arrangement for the coupling mechanism of FIG. 33 or 34.

FIG. 41 is a cross-sectional view of a coupling arrangement for a gear train of the motor unit of FIG. 1 and a male shaft subassembly.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
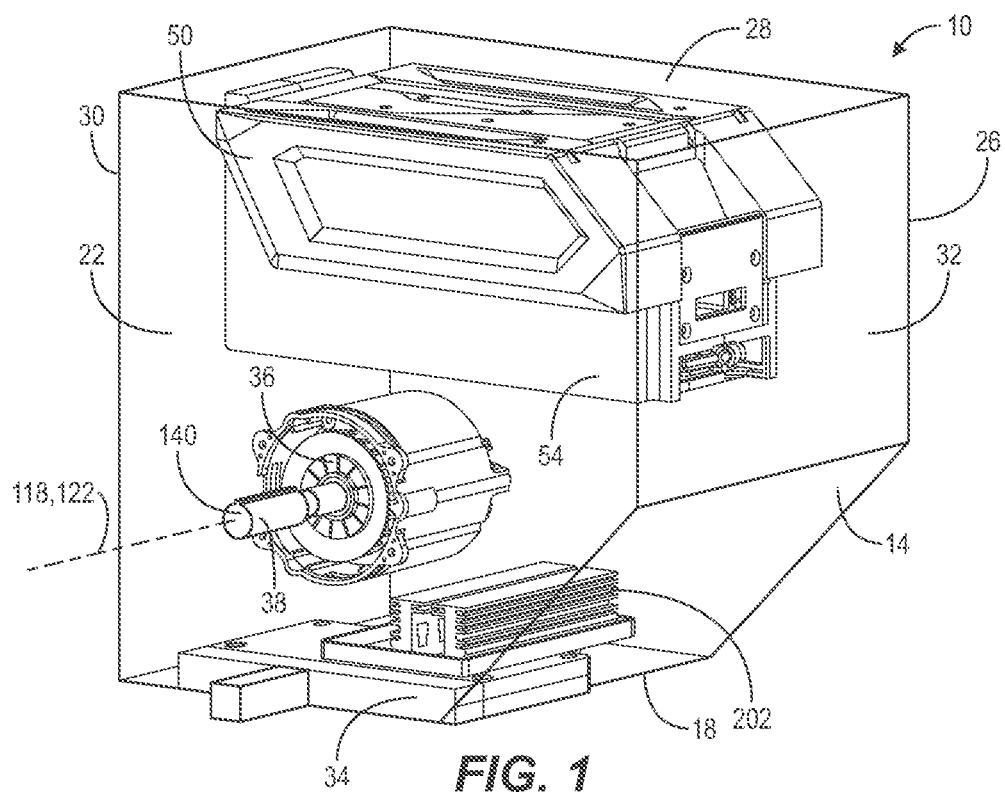
FIG. 1 is a perspective view of a stand-alone motor unit in accordance with an embodiment of the invention.
Figure 2:
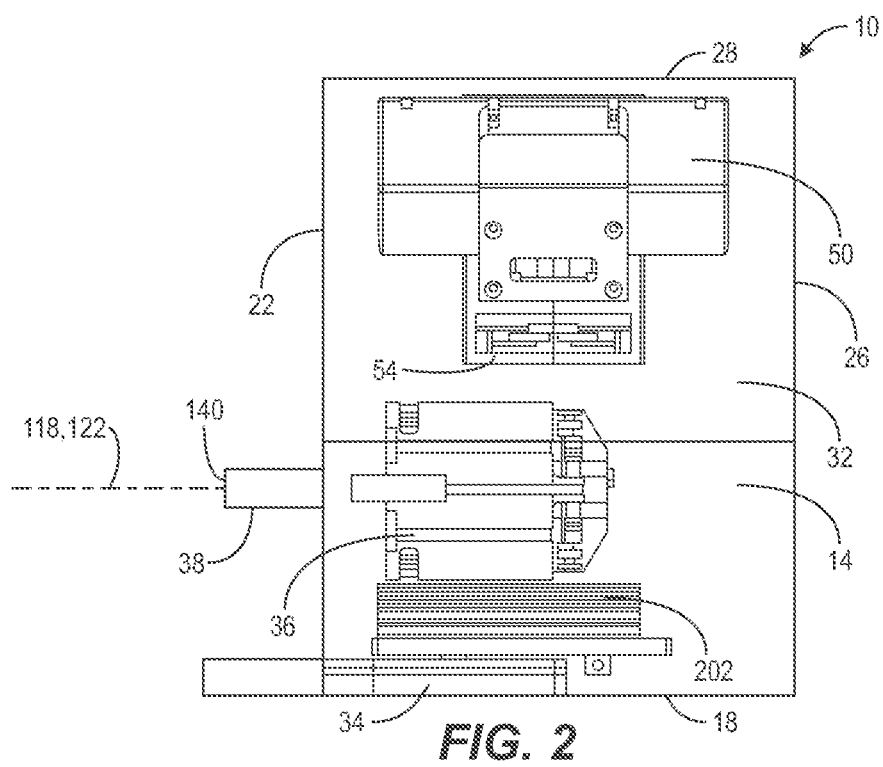
FIG. 2 is a plan view of the stand-alone motor unit of FIG. 1.
Figure 3:
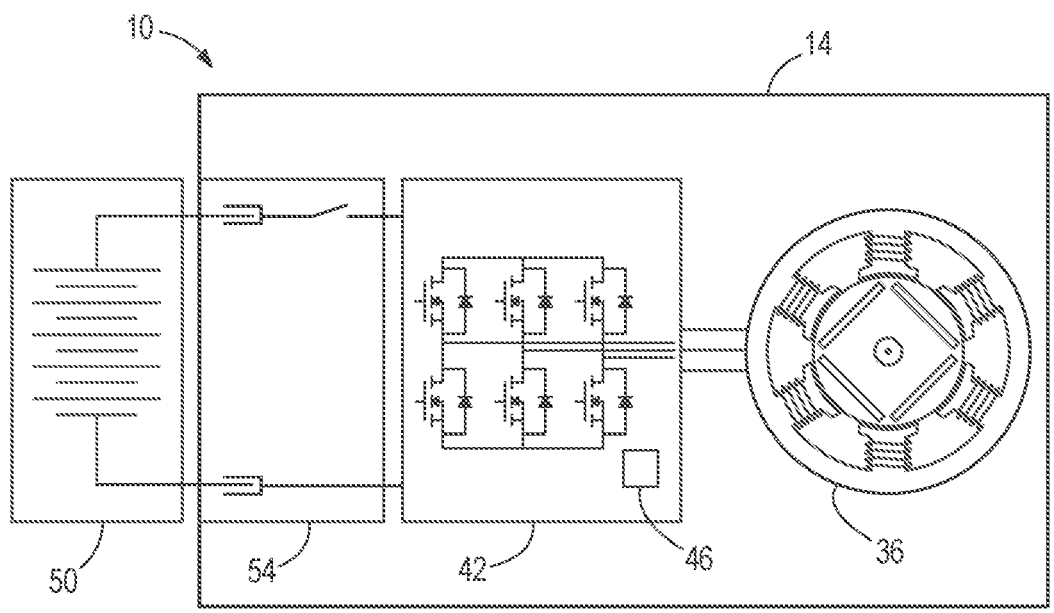
FIG. 3 is a schematic view of the stand-alone motor unit of FIG. 1.
Figure 42:
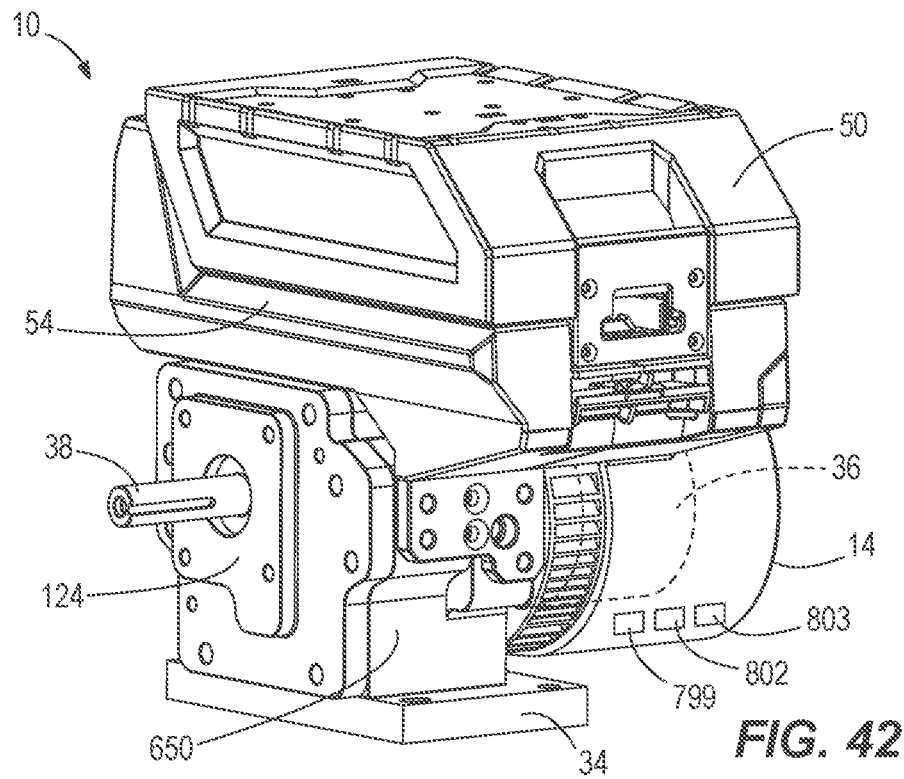
FIG. 42 is a perspective view of a motor unit according to another embodiment of the invention.
Figure 42A:
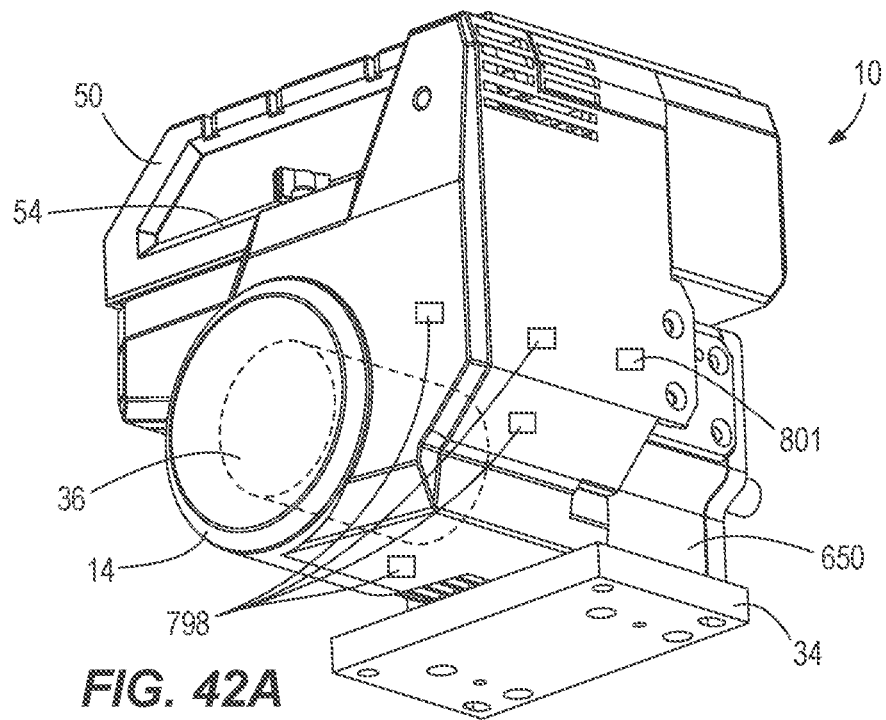
FIG. 42a is another perspective view of the motor unit of FIG. 42

As shown in FIGS. 1, 2, 14 and 15, a stand-alone motor unit 10 for use with a piece of power equipment includes a housing 14 with a first side 18, a second side 22 adjacent the first side 18, a third side 26 opposite the second side 22, a fourth side 28 opposite the first side 18, a fifth side 30 extending between the second and third sides 22, 26, and a sixth side 32 opposite the fifth side 30. The motor unit 10 also includes a flange 34 coupled to the housing 14 on the first side 18, an electric motor 36 located within the housing 14, and a power take-off shaft 38 that protrudes from the second side 22 and receives torque from the motor 36. As explained in further detail below, in some embodiments, the power take-off shaft 38 protrudes from the first side 18 and from the flange 34. As shown in FIGS. 3 and 16, the motor unit 10 also includes control electronics 42 positioned within the housing 14 and including wiring and a controller 46 that is electrically connected to the motor 36. In some embodiments, the control electronics 42 has a volume of up to about 820 mm$^3$. In some embodiments, the control electronics 42 has a weight of up to about 830 g. FIGS. 42 and 42a illustrate another embodiment of the motor unit 10, described in greater detail below.

Figure 4:
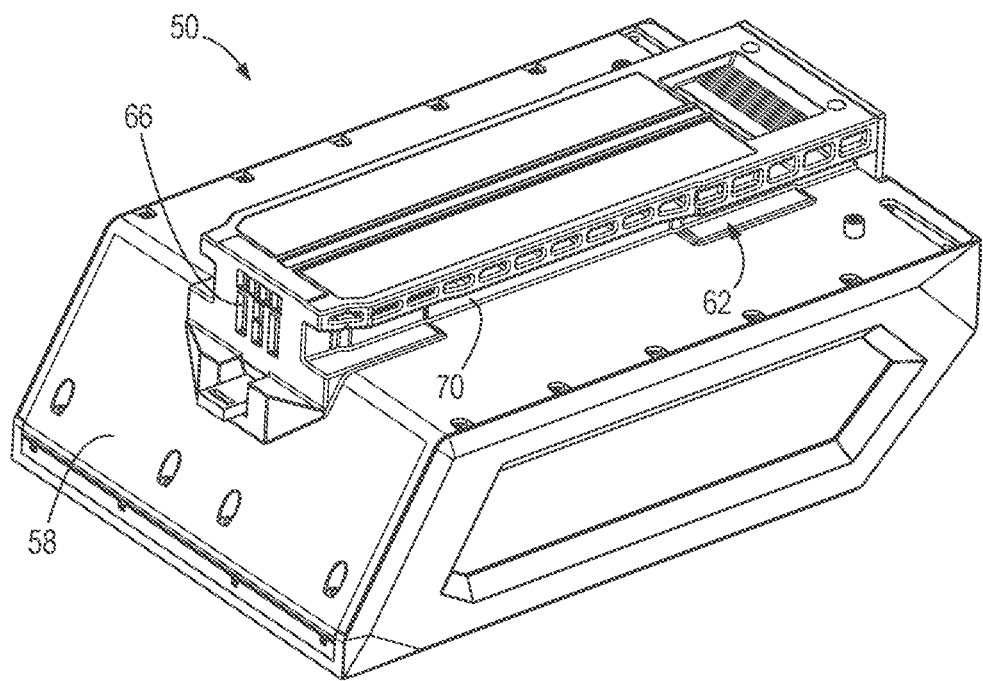
FIG. 4 is a perspective view of a battery pack of the stand-alone motor unit of FIG. 1.
Figure 5:
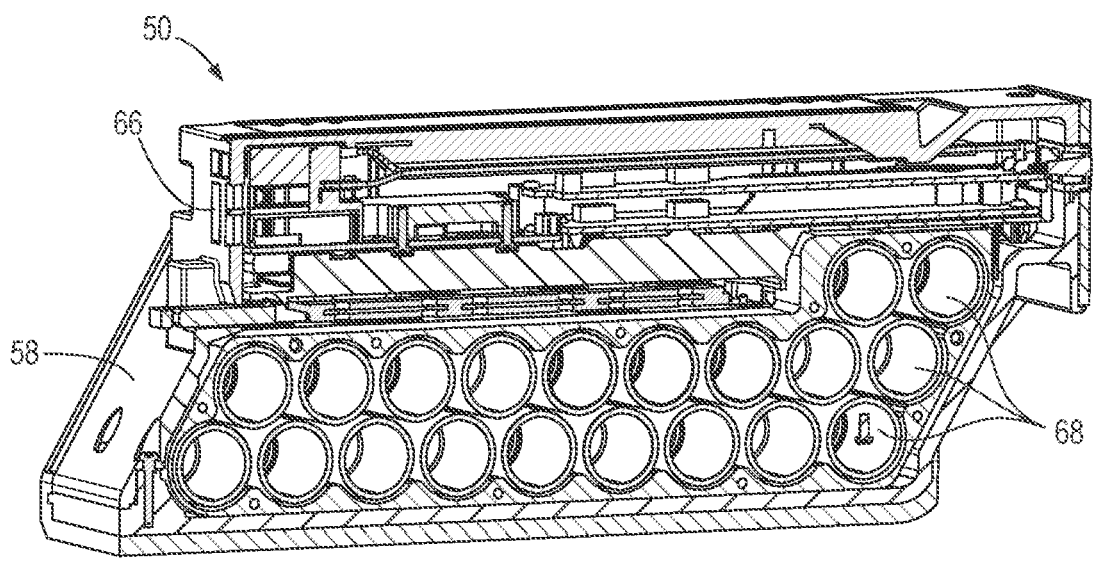
FIG. 5 is a cross-sectional view of the battery pack of FIG. 4.
Figure 6:
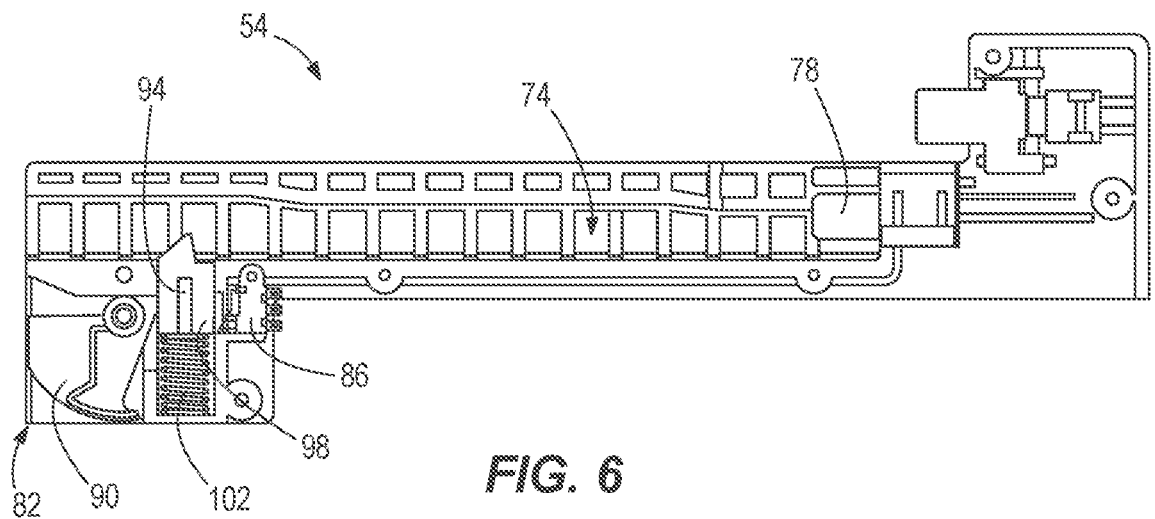
FIG. 6 is a cross-sectional view of a battery receptacle of the stand-alone motor unit of FIG. 1.

As shown in FIGS. 1-6, the motor unit 10 also includes a battery pack 50 that is removably received in a battery receptacle 54 in the housing 14 to transfer current from the battery pack 50 to the motor 36 via the control electronics 42. With reference to FIGS. 4-6, the battery pack 50 includes a battery pack housing 58 with a support portion 62 and a first terminal 66 that is electrically connected to a plurality of battery cells 68 supported by the pack housing 58. The support portion 62 provides a slide-on arrangement with a projection/recess portion 70 cooperating with a complementary projection/recess portion 74 (shown in FIG. 6) of the battery receptacle 54. In the embodiment illustrated in FIGS. 4-6, the projection/recess portion 70 of the battery pack 50 is a guide rail and the projection/recess portion 74 of the battery receptacle 54 is a guide recess. A similar battery pack is described and illustrated in U.S. patent application Ser. No. 16/025,491 filed Jul. 2, 2018, the entire content of which is incorporated herein by reference. In some embodiments, the battery cells 68 have a nominal voltage of up to about 80 V. In some embodiments, the battery cells 68 have a nominal voltage of up to about 120 V. In some embodiments, the battery pack 50 has a weight of up to about 6 lb. In some embodiments, each of the battery cells 68 has a diameter of up to 21 mm and a length of up to about 71 mm. In some embodiments, the battery pack 50 includes up to twenty battery cells 68. In some embodiments, the battery cells 68 are connected in series. In some embodiments, the battery cells 68 are operable to output a sustained operating discharge current of between about 40 A and about 60 A. In some embodiments, each of the battery cells 68 has a capacity of between about 3.0 Ah and about 5.0 Ah.

FIG. 6 illustrates the battery receptacle 54 of the motor unit 10 in accordance with some embodiments. The battery receptacle 54 includes the projection/recess 74, a second terminal 78, a latching mechanism 82, and a power disconnect switch 86. The projection/recess 74 cooperates with the projection/recess 70 of the battery pack 50 to attach the battery pack 50 to the battery receptacle 54 of the motor unit 10. When the battery pack 50 is attached to the motor unit 10, the second terminal 78 and the first terminal 66 are electrically connected to each other. The latching mechanism 82 protrudes from a surface of the battery receptacle 54 and is configured to engage the battery pack 50 to maintain engagement between the battery pack 50 and the battery receptacle 54. Thus, the battery pack 50 is connectable to and supportable by the battery receptacle 54 such that the battery pack 50 is supportable by the housing 14 of the stand-alone motor unit 10. In some embodiments, the battery pack receptacle 54 is arranged on the housing 14 in a position to create a maximum possible distance of separation between the motor 36 and the battery pack 50, in order to inhibit vibration transferred from the motor 36 to the battery pack 50. In some embodiments, elastomeric members are positioned on the battery pack receptacle 54 in order to inhibit vibration transferred from the motor 36, via the housing 14, to the battery pack 50.

In other embodiments (not shown), the latching mechanism 82 may be disposed at various locations (e.g., on a sidewall, an end wall, an upper end wall etc., of the battery receptacle 54) such that the latching mechanism 82 engages corresponding structure on the battery pack 50 to maintain engagement between the battery pack 50 and the battery receptacle 54. The latching mechanism 82 includes a pivotable actuator or handle 90 operatively engaging a latch member 94. The latch member 94 is slidably disposed in a bore 98 of the receptacle 54 and is biased toward a latching position by a biasing member 102 (e.g., a spring) to protrude through a surface of the battery receptacle 54 and into a cavity in the battery pack 50.

The latching mechanism also 82 includes the power disconnect switch 86 (e.g., a micro-switch) facilitating electrical connecting/disconnecting the battery pack 50 from the battery receptacle 54 during actuation of the handle 90 to withdraw the latch member 94 from the battery pack 50. The power disconnect switch 86 may act to electrically disconnect the battery pack 50 from the motor unit 10 prior to removal of the battery pack 50 from the battery receptacle 54. The power disconnect switch 86 is actuated when the latch member 94 is moved from the latched position (i.e., when the latch member 94 is completely within the cavity of the battery pack 50) to an intermediate position. The power disconnect switch 86 is electrically connected to the controller 46 and may generate an interrupt to indicate that the battery pack 50 is being disconnected from the motor unit 10. When the controller 46 receives the interrupt, the controller 46 begins a power down operation to safely power down the control electronics 42 of the motor unit 10. A similar latching mechanism and disconnect switch is described and illustrated in U.S. patent application Ser. No. 16/025,491, which has been incorporated herein by reference.

Figure 7:
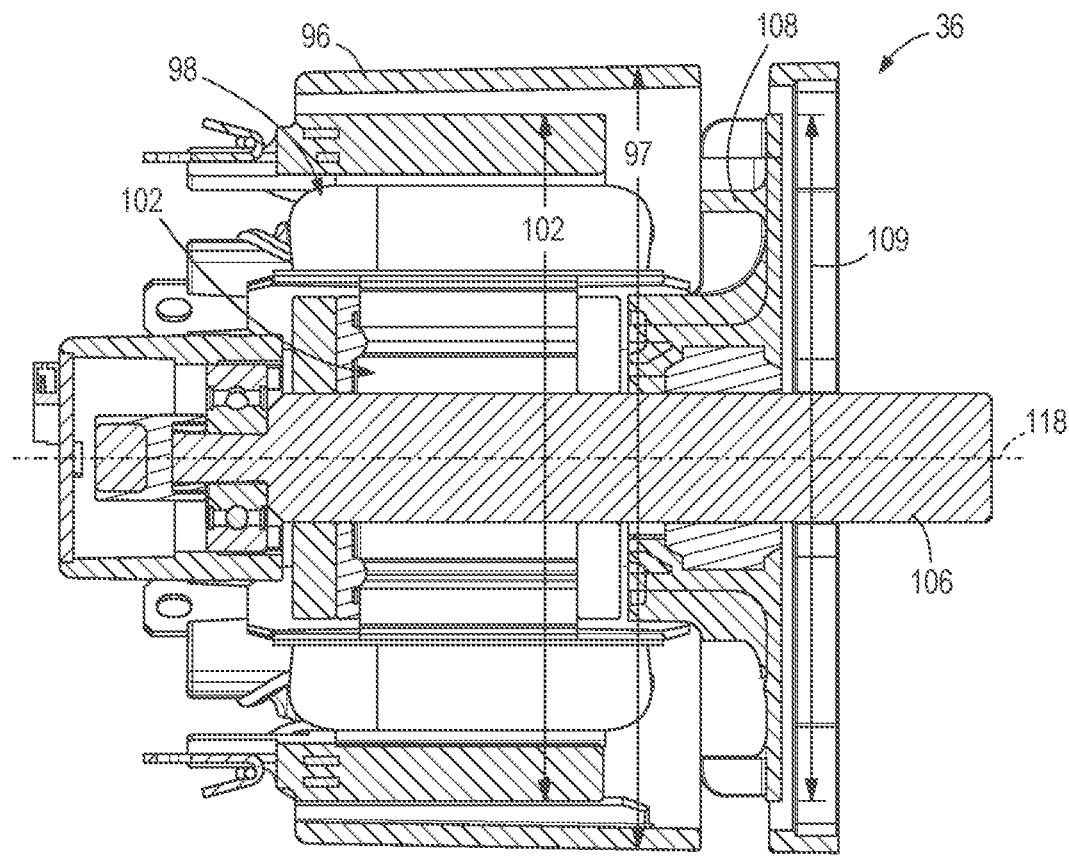
FIG. 7 is a cross-sectional view of a motor of the stand-alone motor unit of FIG. 1.
Figure 8:
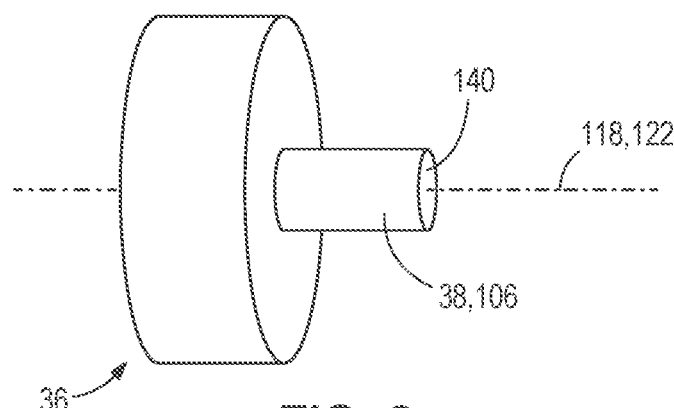
FIG. 8 is a schematic view of a motor of the stand-alone motor unit of FIG. 1.

As shown in FIG. 7, the motor 36 includes a motor housing 96 having an outer diameter 97, a stator 98 having a nominal outer diameter 102 of up to about 80 mm, a rotor 102 having an output shaft 106 and supported for rotation within the stator 98, and a fan 108. A similar motor is described and illustrated in U.S. patent application Ser. No. 16/025,491, which has been incorporated herein by reference. In some embodiments, the motor 36 is a brushless direct current motor. In some embodiments, the motor 36 has a power output of at least about 2760 W. In some embodiments, the power output of the motor 36 may drop below 2760 W during operation. In some embodiments, the fan 108 has a diameter 109 that is larger than the diameter 97 of the motor housing 96. In some embodiments, the motor 36 can be stopped with an electronic clutch (not shown) for quick overload control. In some embodiments, the motor 36 has a volume of up to about 443,619 mm$^3$. In some embodiments, the motor has a weight of up to about 4.6 lb. The housing 14 includes an inlet vent and an outlet vent, such that the motor fan 108 pulls air through the inlet vent and along the control electronics 42 to cool the control electronics 42, before the air is exhausted through the outlet vent. In the embodiment illustrated in FIG. 7, the motor is a 36 is an internal rotor motor, but in other embodiments, the motor 36 can be an outer rotor motor with a nominal outer diameter (i.e. the nominal outer diameter of the rotor) of up to about 80 mm.

Figure 9:
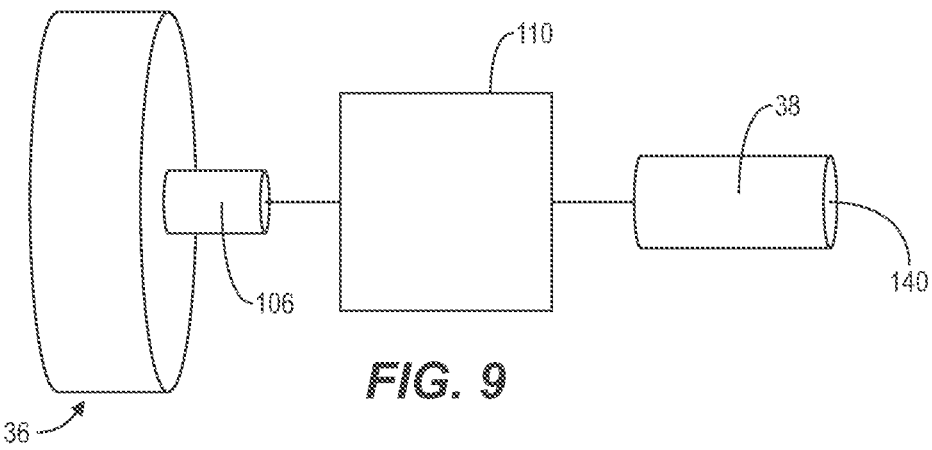
FIG. 9 is a schematic view of a motor, a gear train, and a power take-off shaft of the stand-alone motor unit of FIG. 1.
Figure 10:
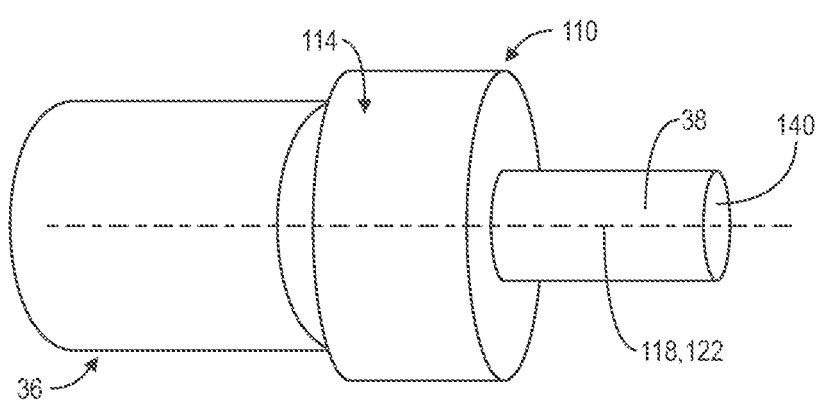
FIG. 10 is a schematic view of a motor, a gear train, and a power take-off shaft of the stand-alone motor unit of FIG. 1 in a first configuration.
Figure 11:
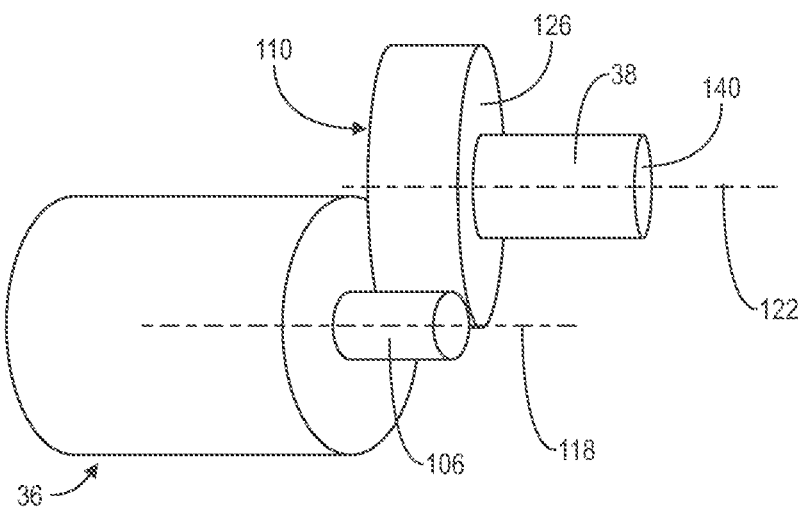
FIG. 11 is a schematic view of a motor, a gear train, and a power take-off shaft of the stand-alone motor unit of FIG. 1 in a second configuration.
Figure 12:
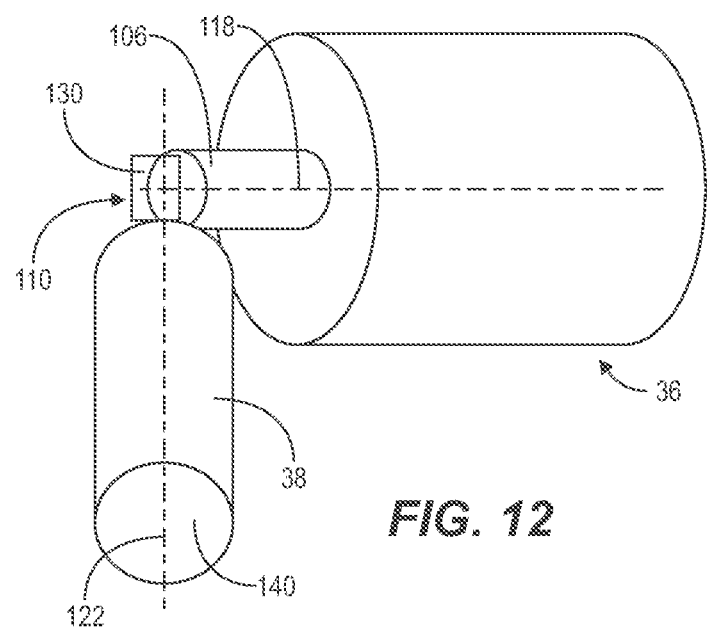
FIG. 12 is a schematic view of a motor, a gear train, and a power take-off shaft of the stand-alone motor unit of FIG. 1 in a third configuration.

With reference to FIGS. 8-12, the motor 36 can transfer torque to the power take-off shaft 38 in a variety of configurations. In the embodiment shown in FIG. 8, the output shaft 106 is also the power take-off shaft 38, such that the motor 36 directly drives the power take-off shaft 38 without any intermediate gear train. For example, the motor 36 may be a direct drive high pole count motor. As shown in FIG. 9, in other embodiments, the motor unit 10 includes a gear train 110 that transfers torque from the motor 36 to the power take-off shaft 38. In some embodiments, the gear train 110 can include a mechanical clutch (not shown) to discontinue the transfer of torque from the motor 36 to the power take-off shaft 38. In the embodiment shown in FIG. 10, the gear train 110 includes a planetary transmission 114 that transfers torque from the output shaft 106 to the power take-off shaft 38, and a rotational axis 118 of the output shaft 106 is coaxial with a rotational axis 122 of the power take-off shaft 38. In the embodiment shown in FIG. 11, the gear train 110 includes a spur gear 126 engaged with the output shaft 106 of the rotor, such that the rotational axis 118 of the output shaft 106 is offset from and parallel to the rotational axis 122 of the power take-off shaft 38. In the embodiment shown in FIG. 12, the gear train 110 includes a bevel gear 130, such that the rotational axis 118 of the output shaft 106 is perpendicular to the rotational axis 122 of the power take-off shaft 38. Thus, in the embodiment of FIG. 12, the rotational axis 118 of the output shaft 106 intersects the second side 22 of the housing 14 and the power take-off shaft 38 protrudes from the flange 34. In other embodiments utilizing a bevel gear, the rotational axis 118 of the output shaft 106 is not perpendicular, parallel, or coaxial to the rotational axis 122 of the power take-off shaft 38, and the power take-off shaft 38 protrudes from the flange 34.

Figure 19:
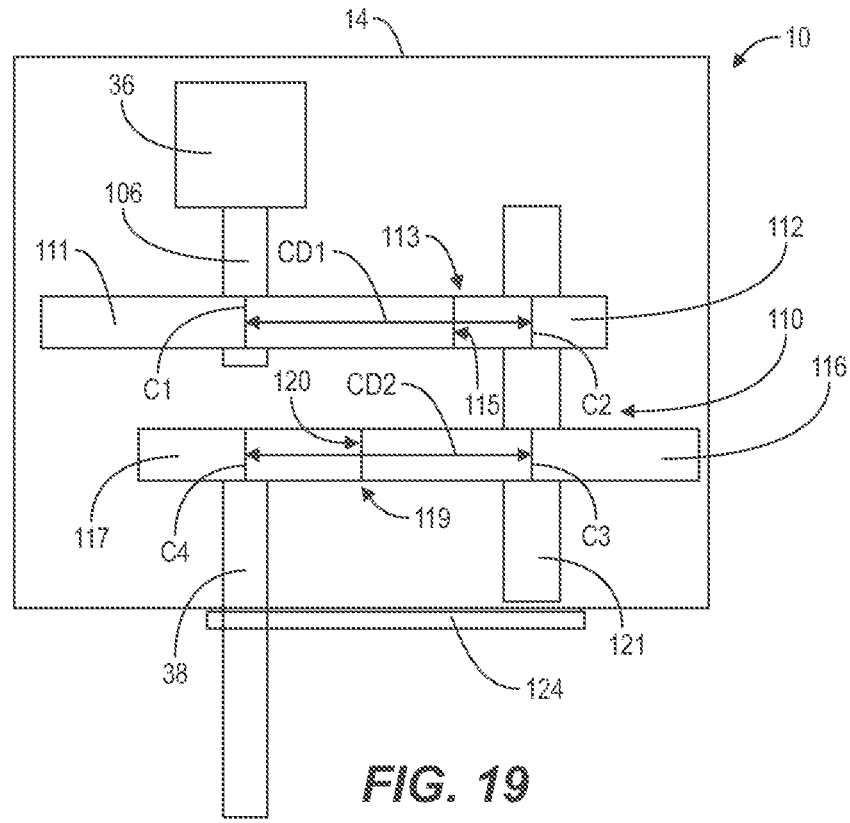
FIG. 19 is a schematic view of a motor, a gear train, and a power take-off shaft of the stand-alone motor unit of FIG. 1 in a fourth configuration.

In the embodiment illustrated in FIG. 19, the gear train 110 includes a first gear 111 and a second gear 112 making up a first gear set 113 with a first reduction stage 115, and a third gear 116 and a fourth gear 117 making up second gear set 119 with a second reduction stage 120. The first gear 111 has a rotational center C1 and is coupled for rotation with the output shaft 106 of the motor 36. The second and third gears 112, 116 have respective rotational centers C2, C3 and are coupled for rotation with a second shaft 121 that is parallel to the output shaft 106 and the power take-off shaft 38. The power take-off shaft 38 is coupled for rotation with the fourth gear 117, which has a rotational center C4. A first center distance CD1 is defined between the rotational centers C1 and C2 of the first and second gears 111, 112. A second center distance CD2 is defined between the rotational centers C3 and C4 of the third and fourth gears 116, 117. In the illustrated embodiment, the first center distance CD1 is equal to the second center distance CD2. However, in other embodiments, the first center distance CD1 may be different than the second center distance CD2.

With continued reference to the embodiment illustrated in FIG. 19, the housing 14 includes a removable faceplate 124 that allows the operator to remove the faceplate 124 to access the first, second, third, and fourth gears 111, 112, 115, 116 and to slide them off the output shaft 106, the second shaft 120 and the power take-off shaft 38. Thus, the operator may replace the first gear set 113 with a different gear set with two gears having the same first center distance CD1 between their rotational centers to change the reduction ratio of the first reduction stage 115. Similarly, the operator may replace the second gear set 119 with a different gear set with two gears having the same second center distance CD2 between their rotational centers to change the reduction ratio of the second reduction stage 120. Thus, the motor unit 10 can implement a variety of reduction ratios to work with a broad range of power equipment, and the removable faceplate 124 makes it easy for an operator to quickly change these reduction ratios. Also the faceplate 124 makes it easy for an operator to change out the power take-off shaft 38 to replace it with a custom power take-off shaft for any given application. Also, the faceplate 124 is easily replaced with a different faceplate to fit a unique or custom mounting configuration.

Figure 13:
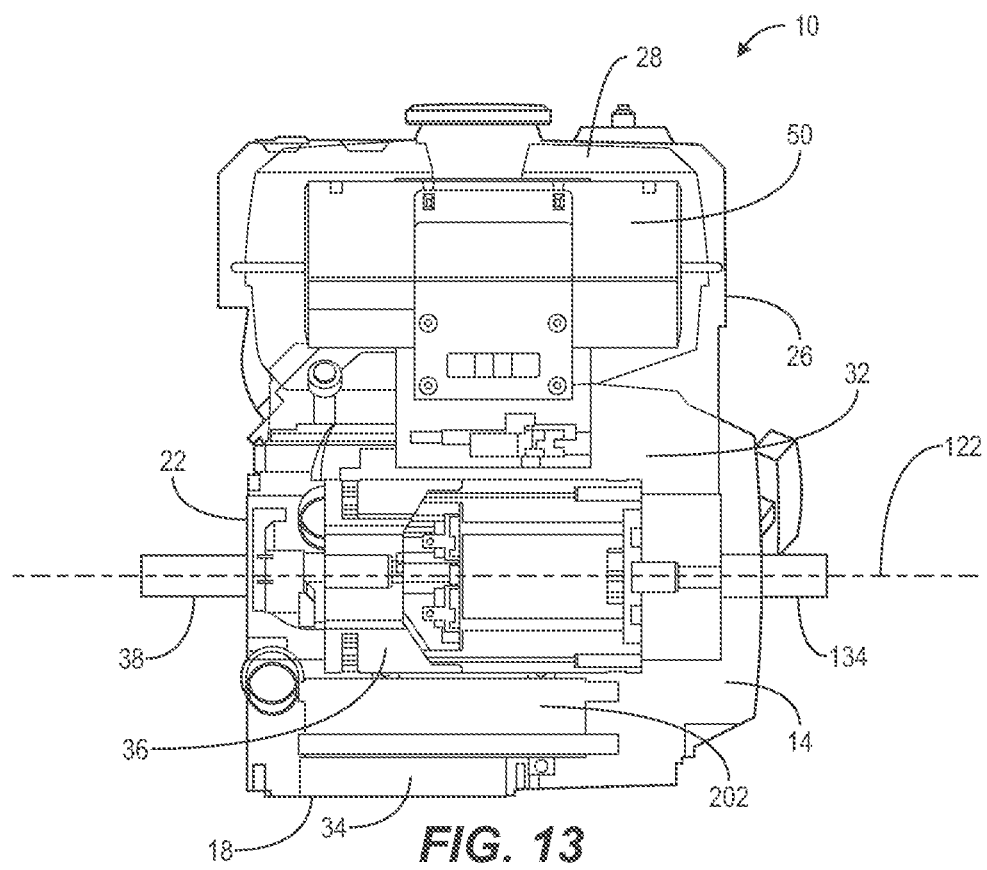
FIG. 13 is a plan view of a stand-alone motor unit in accordance with another embodiment of the invention.
Figure 14:
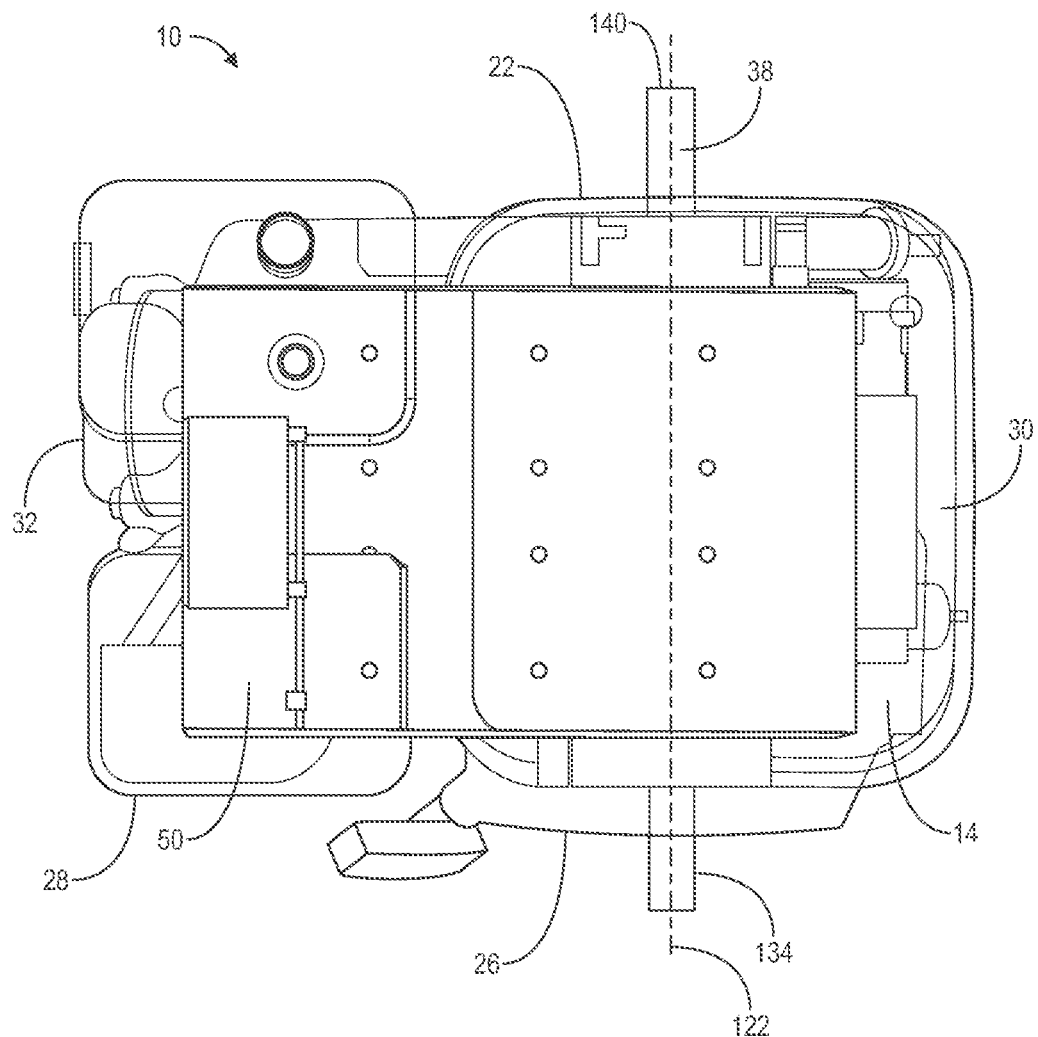
FIG. 14 is a plan view of the stand-alone motor unit of FIG. 13.

In the embodiment shown in FIGS. 13 and 14, the power take-off shaft 38 is a first power take-off shaft and the motor unit 10 includes a second power take-off shaft 134 that also extends along the rotational axis 122 of the first power take-off shaft 38. The motor 36 drives the first and second power take-off shafts 38, 134 simultaneously, such that the motor unit 10 can be used with, for example, tillers, saws, and snow blowers.

Figure 15:
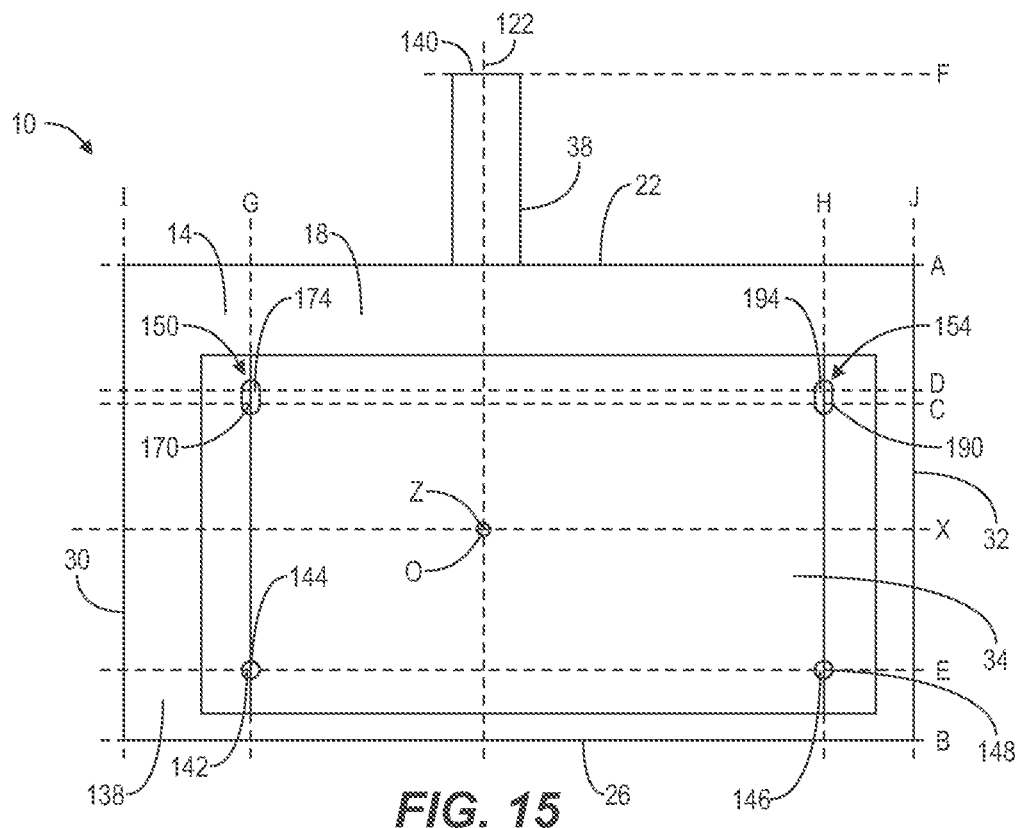
FIG. 15 is a schematic view of a first side of the stand-alone motor unit of FIG. 1.
Figure 16:
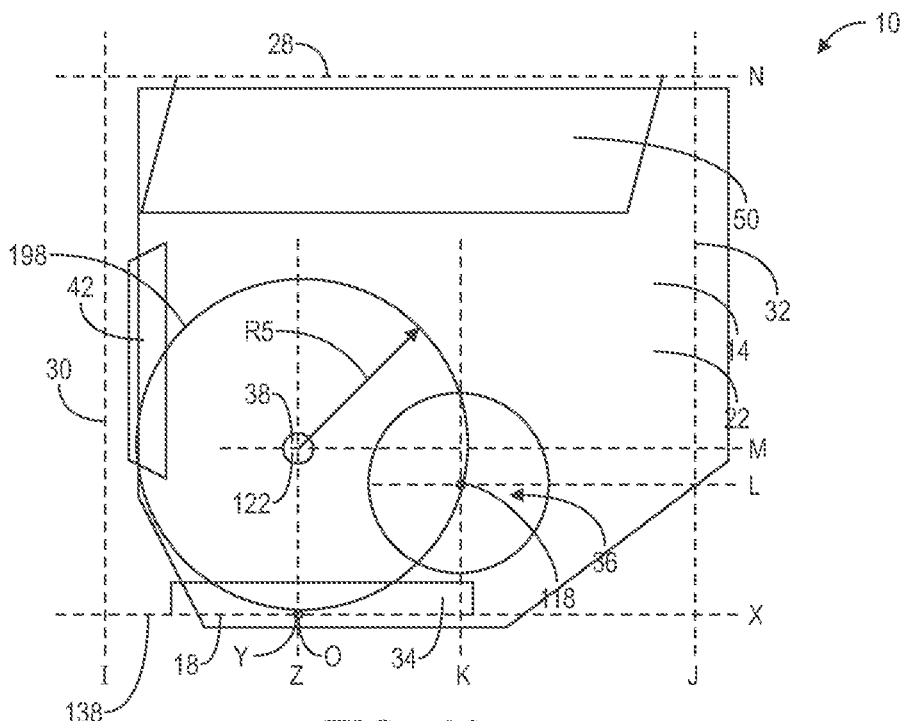
FIG. 16 is a schematic view of a second side of the stand-alone motor unit of FIG. 1.

FIGS. 15 and 16 illustrate embodiments of the motor unit 10 in which the power take-off shaft 38 protrudes through the second side 22 of the housing 14. As shown in FIG. 15, a plane 138 is defined on the first side 18 of the housing 14 on which the flange 34 is coupled. The plane 138 contains orthogonal X and Y axes that intersect at an origin O. As shown in FIG. 16, the power take-off shaft 38 extends parallel to the Y-axis and as shown in FIG. 15, the power take-off shaft 38 has an end 140. The X-axis extends parallel to the second and third sides 22, 26 and the Y-axis extends parallel to the fifth and sixth sides 30, 32.

With continued reference to FIG. 15, the flange 34 includes a plurality of apertures therethrough, including a first hole 142 having a center 144, a second hole 146 having a center 148, a first slot 150, and a second slot 154. The plurality of apertures collectively define a first bolt pattern that matches an "identical", second bolt pattern defined in a piece of power equipment to which the motor unit 10 can be mounted. "Identical" does not mean that each of the plurality of apertures defining the first bolt pattern identically aligns with each of the plurality of apertures defining the second bolt pattern. In other words, not all of the first hole 142, second hole 146, first slot 150, and second slot 154 need align with a corresponding aperture in the second bolt pattern. Rather, at least two of the first hole 142, second hole 146, first slot 150, and second slot 154 will at least partially align with two corresponding apertures in the second bolt pattern, such that at least two fasteners, such as bolts, may be respectively inserted through at least two of the at least partially-aligned respective apertures of the first and second bolt patterns in order to couple the motor unit 10 to the piece of power equipment. Thus, for the first bolt pattern to match an "identical" second bolt pattern, at least two apertures in the first bolt pattern are configured to at least partially align with two apertures of the second bolt pattern. In the disclosed embodiment, the plurality of apertures defining the first bolt pattern includes four apertures (first hole 142, second hole 146, first slot 150, and second slot 154) but in other embodiments, the plurality of apertures defining the first bolt pattern could include more or fewer apertures.

In some embodiments, the flange 34 may include one or more intermediate mounting members or adapters arranged between the flange 34 itself and the flange of the piece of power equipment having the second bolt pattern, such that the adapter(s) couple the flange 34 to the piece of power equipment. In these embodiments, the adapter includes both the second bolt pattern and the first bolt pattern, such that the first bolt pattern of the flange 34 aligns with the first bolt pattern of the adapter and the second bolt pattern of the adapter aligns with the second bolt pattern defined in the piece of power equipment, thereby allowing the flange 34 of the motor unit 10 to be coupled to the piece of power equipment.

Figure 17:
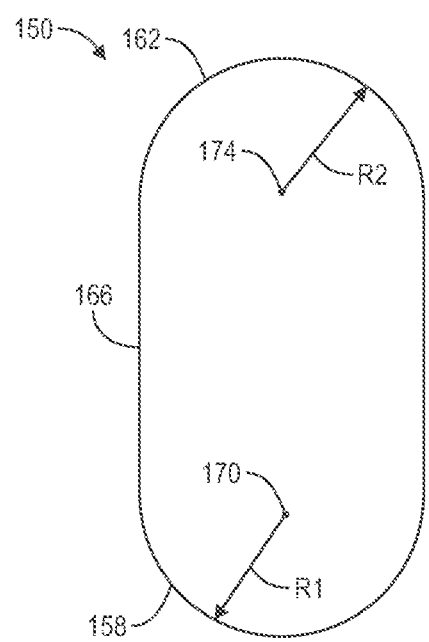
FIG. 17 is an enlarged plan view of a first slot of the stand-alone motor unit of FIG. 1.

As shown in FIG. 17, the first slot 150 includes a first semi-circular portion 158 having a radius R1, a second semi-circular portion 162 having a radius R2, and a straight portion 166 that connects the first and second semi-circular portions 158, 162. The first semi-circular portion 158 has a center 170 from which radius R1 is defined and the second semi-circular portion 162 has a center 174 from which radius R2 is defined. The centers 170, 174 can define points where a bolt is inserted through the first slot 150 when the first slot 150 is aligned with a corresponding aperture in the second bolt pattern in the piece of power equipment, but the bolt may also be inserted anywhere along the straight portion 166.

Figure 18:
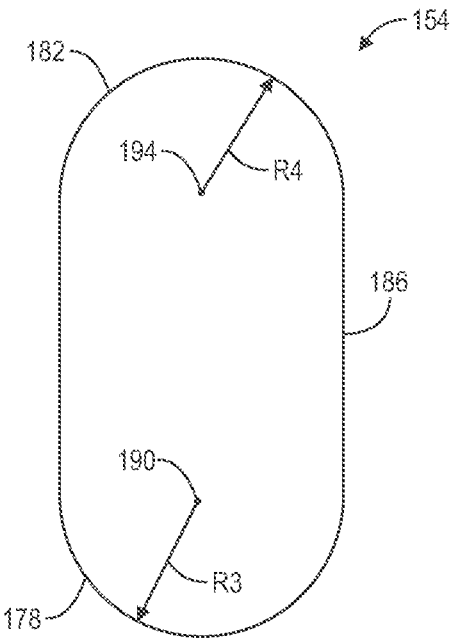
FIG. 18 is an enlarged plan view of a second slot of the stand-alone motor unit of FIG. 1.

As also shown in FIG. 18, the second slot 154 includes a first semi-circular portion 178 having a radius R3, a second semi-circular portion 182 having a radius R4, and a straight portion 186 that connects the first and second semi-circular portions 178, 182. The first semi-circular portion 178 has a center 190 from which radius R3 is defined and the second semi-circular portion 182 has a center 194 from which radius R4 is defined. The centers 170, 174 can define points where a bolt is inserted through the second slot 154 when the second slot 154 is aligned with a corresponding aperture in the second bolt pattern in the piece of power equipment, but the bolt may also be inserted anywhere along the straight portion 186. In the embodiment illustrated in FIGS. 15 and 17, R1, R2, R3, and R4 are all equal, but in other embodiments, one or more of the radii R1, R2, R3, R4 may be different from one another.

With reference again to FIG. 15, Table 1 below lists the distances of various components and reference points with respect to the X-axis and the Y-axis.

TABLE 1

|  | Distance from X-axis | Distance from Y-axis |
| --- | --- | --- |
| Center 144 of first hole 142 | E | G |
| Center 148 of second hole 146 | E | H |
| Center 170 of first semi-circular portion 158 of first slot 150 | C | G |
| Center 174 of second semi-circular portion 162 of first slot 150 | D | G |
| Center 190 of first semi-circular portion 178 of second slot 154 | C | H |
| Center 194 of second semi-circular portion 182 of second slot 154 | D | H |
| Second side 22 of housing 14 | A | Perpendicular to Y-axis |
| Third side 26 of housing 14 | B | Perpendicular to Y-axis |
| End 140 of power take-off shaft 38 | F | Perpendicular to Y-axis |
| Fifth side 30 of housing 14 | Perpendicular to X-axis | I |
| Sixth side 32 of housing 14 | Perpendicular to X-axis | J |

Table 2 below lists five different embodiments of the stand-alone motor unit 10 of FIG. 1, which is also schematically illustrated in FIGS. 15 and 16, in which the values of the distances from Table 1, in millimeters, are provided:

TABLE 2

|  | A | B | C | D | E | F | G | H | I | J |
| --- | --- | --- | --- | --- | --- | --- | --- | --- | --- | --- |
| Embodiment 1 | 75.2-75.5 | 168.6 | 34.5 | 39.5 | 40.5 | 115.4 | 66 | 96 | 115 | 231 |
| Embodiment 2 | 75.2-75.5 | 175.6 | 34.5 | 39.5 | 40.5 | 139.9 | 66 | 96 | 123 | 239 |
| Embodiment 3 | 75.2-75.5 | 184.6 | 34.5 | 39.5 | 40.5 | 136.9 | 66 | 96 | 123 | 253 |
| Embodiment 4 | 75.2-75.5 | 203.1 | 34.5 | 39.5 | 40.5 | 128.4 | 66 | 96 | 135.3 | 278.3 |
| Embodiment 5 | 75.2-75.5 | 221.5 | 34.5 | 39.5 | 40.5 | 128.4 | 66 | 96 | 147.6 | 303.6 |

In some embodiments, dimension F, the length to the end 140 of the power take-off shaft 38, can be modified or customized besides the dimensions listed in Table 2.

As shown in FIG. 16, a Z-axis intersects the origin O of plane 138 and the first and fourth sides 18, 28 of the housing 14. The Z-axis is arranged perpendicular to the X-axis and Y-axis of the plane 138. The Z-axis is also arranged perpendicular to the first and fourth 18, 28 sides of the housing 14. The Z-axis is also arranged parallel to the fifth and sixth sides 30, 32 of the housing 14. As also shown in FIG. 16, a radius R5 extending from the rotational axis 122 of the power take-off shaft 38 defines a circle 198. The rotational axis 118 of the output shaft 106 of the rotor 102 is intersected by the circle 198, such that a distance R5 is defined between the rotational axis 118 of the output shaft 106 and the rotational axis 122 of the power take-off shaft 38. Table 3 below identifies the distances of various components and reference points with respect to the X-axis and Z-axis.

TABLE 3

| | Distance from X-axis | Distance from Z-axis |
|---|---|---|
| Rotational axis 118 of output shaft 106 | L | K |
| Rotational axis 122 of power take-off shaft 38 | M | Intersected by Z-axis |
| Fourth side 28 of housing 14 | N | Perpendicular to Z-axis |
| Fifth side 30 of housing 14 | Perpendicular to X-axis | I |
| Sixth side 32 of housing 14 | Perpendicular to X-axis | J |

Table 4 below lists the five different embodiments from Table 2 and provides the values of the distances from Table 3, as well as R5, in millimeters, for each embodiment:

TABLE 4

| | K | L | M | N | I | J | R5 |
|---|---|---|---|---|---|---|---|
| Embodiment 1 | 46.9 | 95.3 | 106 | 329 | 115 | 231 | 48.1 |
| Embodiment 2 | 46.9 | 95.3 | 106 | 346 | 123 | 239 | 48.1 |
| Embodiment 3 | 46.9 | 95.3 | 106 | 346 | 123 | 253 | 48.1 |
| Embodiment 4 | 46.9 | 95.3 | 106 | 380.6 | 135.3 | 278.3 | 48.1 |
| Embodiment 5 | 46.9 | 95.3 | 106 | 415.2 | 147.6 | 303.6 | 48.1 |

With continued reference to the embodiment illustrated in FIG. 16, the control electronics 42 are vertically oriented relative to flange 34 and positioned between the Z-axis and the fifth side 30 of the housing 14, while being closer to the fifth side 30 of the housing 14. As also shown in the embodiment illustrated in FIG. 16, the battery pack 50 is horizontally oriented relative to flange 34 and positioned between the rotational axis 122 of the power take-off shaft 38 and the fourth side 28 of the housing 14, while being closer to the fourth side 28 of the housing 14. However, in other embodiments, the battery pack 50 may be closer to the rotational axis 122 of the power take-off shaft 38. Thus, in all five embodiments, even when the design envelope of the housing 14 of the motor unit 10 is changed, each of the battery 50, the battery receptacle 54, the control electronics 42, and the motor 36 fit within the housing 14. In some embodiments, the total weight of the motor unit 10 including each of the battery 50, the battery receptacle 54, the control electronics 42, and the motor 36, is 37.05 lbs. In contrast, when fully loaded with fluids, some 120 cc gas engine units can weigh up to 33.50 lbs, some 160 cc gas engine units can weigh up to 40.10 lbs, and some 200 cc gas engine units can weigh up to 41.30 lbs.

In some embodiments, the motor unit 10 includes a "kill switch" (not shown) that can be used when the motor unit 10 is coupled to, e.g., a riding lawnmower with a seat. Thus, when an operator intentionally or inadvertently gets off the seat, the kill switch discontinues power to the motor 36 and/or control electronics 42. In some embodiments, the kill switch stops the motor 36 and/or power take-off shaft 38, but maintains power to the power electronics 42 so that the motor unit 10 may be kept in an armed or ready state. In some embodiments, the motor unit 10 requires two or more actions required to turn on the motor 36 because unlike a gas engine, it may be difficult to determine whether the electric motor 36 is on or not. Specifically, the electric motor 36 is much quieter than a gas engine. Thus, simply hitting an "on" switch may not be enough to indicate to the operator that the motor 36 has been turned on, because of its relative silence. Thus, by forcing the operator to make two actions, such as holding an "on" switch and then depressing a second actuator, the operator is made to feel more certain that the motor 36 has been turned on.

In some embodiments, a control interface to control the power equipment and/or the motor unit 10 is built into the motor unit 10. In some embodiments, the motor unit 10 includes a communication port and a wiring harness electrically connects the motor unit 10 to the piece of power equipment, thus allowing the operator to control the motor unit 10 from the piece of power equipment 10, or vice versa. For example, if the motor unit 10 is mounted to a lawn mower, the operator may arrange the wiring harness between the lawn mower and the communication port on the motor unit 10. The wiring harness could electrically connect a kill switch on a handlebar of the lawnmower, for example, to the motor 36 of the motor unit 10. Thus, if the kill switch is intentionally or inadvertently released during operation of the lawn mower, the motor 36 of the motor unit 10 stops via the electrical communication through the wiring harness and communication port on the motor unit 10. Thus, the control interface and communication port allow the operator flexibility in controlling the motor unit 10 and/or the piece of power equipment.

In some embodiments, the motor unit 10 includes ON/OFF indicators (not shown). In some embodiments, the motor unit 10 includes a filter (not shown) to keep airborne debris out of the motor 36 and control electronics 42. In some embodiments, the filter includes a dirty filter sensor (not shown) and a self-cleaning mechanism (not shown). In some embodiments, the motor 36 will mimic a gas engine response when encountering resistance, such as slowing down or bogging. In some embodiments, the motor unit 10 includes a heat sink 202 in the housing 14 for air-cooling the control electronics 42 (FIGS. 1 and 2). In some embodiments, the motor unit 10 is liquid cooled.

In some embodiments, the output shaft 106 of the rotor 102 has both forward and reverse capability. In some embodiments, the forward and reverse capability is controllable without shifting gears of the gear train 110, in comparison to gas engines, which cannot achieve forward/reverse capability without extra gearing and time delay. Thus, the motor unit 10 provides increased speed, lower weight, and lower cost. Because the motor unit 10 has fewer moving parts and no combustion system, as compared with a gas engine, it also provides additional speed, weight, and cost advantages.

In some embodiments, the motor unit 10 is able to start under a "heavy" load. For example, when the motor unit 10 is mounted to a riding lawnmower and the lawnmower is started over a patch of thick grass, the motor unit 10 is able to start the motor 36 in the thick grass. Thus, unlike gas engines, the motor unit 10 does not require a centripetal clutch. Rather, the motor 36 would always be engaged. Additionally, the motor unit 10 does not need a centrifugal clutch, in comparison to gas engines, which need a centrifugal clutch to idle and disengage from the load, or risk stalling.

The motor unit 10 is able to operate in any orientation (vertical, horizontal, upside down) with respect to a ground surface for a prolonged period of time, giving it an advantage over four-cycle gas engines, which can only be operated in one orientation and at slight inclines for a shorter period of time. Because the motor unit 10 does not require gas, oil, or other fluids, it can run, be transported, and be stored upside down or on any given side without leaking or flooding In operation, the motor unit 10 can be used to replace a gas engine system. Specifically, the motor unit 10 can be mounted to the piece of power equipment having the second bolt pattern by aligning the first bolt pattern defined by the plurality of apertures in the flange 34 with the second bolt pattern. Thus, the power take-off shaft 38 of the motor unit 10 can be used to drive the equipment.

During operation, the housing 14 of the motor unit 10 is comparably much cooler than the housing of an internal combustion unit because there is no combustion in the motor unit 10. Specifically, when a gas engine unit runs, the housing of the gas engine unit is 220 degrees Celsius or higher. In contrast, when the motor unit 10 runs, all of the exterior surfaces of the housing 14 are less than 95 degrees Celsius. Tables 5 and 6 below list with further specificity the temperature limits of different components on the housing 14 of the motor unit 10.

Table 5 below lists the Underwriter's Laboratories (UL) temperature limits of different components typically used in power tools, with respect to whether those components are formed of metal, plastic, rubber, wood, porcelain, or vitreous. The plastic rated temperatures are never exceeded.

TABLE 5

|  | Metal | Plastic/ Rubber/Wood | Porcelain/ Vitreous |
|---|---|---|---|
| Casual Contact | 85° C. | 85° C. | 85° C. |
| Handles and knobs that are continuously held | 55° C. | 75° C. | 65° C. |
| Handles and knobs that are only briefly held (i.e. switches) | 60° C. | 80° C. | 70° C. |

Table 6 below lists the UL temperature limits of different components of the battery pack housing 58 of the battery pack 50, with respect to whether those components are formed of metal, plastic or rubber. The plastic rated temperatures are never exceeded.

TABLE 6

|  | Metal | Plastic/Rubber |
|---|---|---|
| Casual Contact | 70° C. | 95° C. |
| Handles and knobs that are continuously held | 55° C. | 75° C. |
| Handles and knobs that are only briefly held (i.e. switches) | 60° C. | 85° C. |

Figure 20:
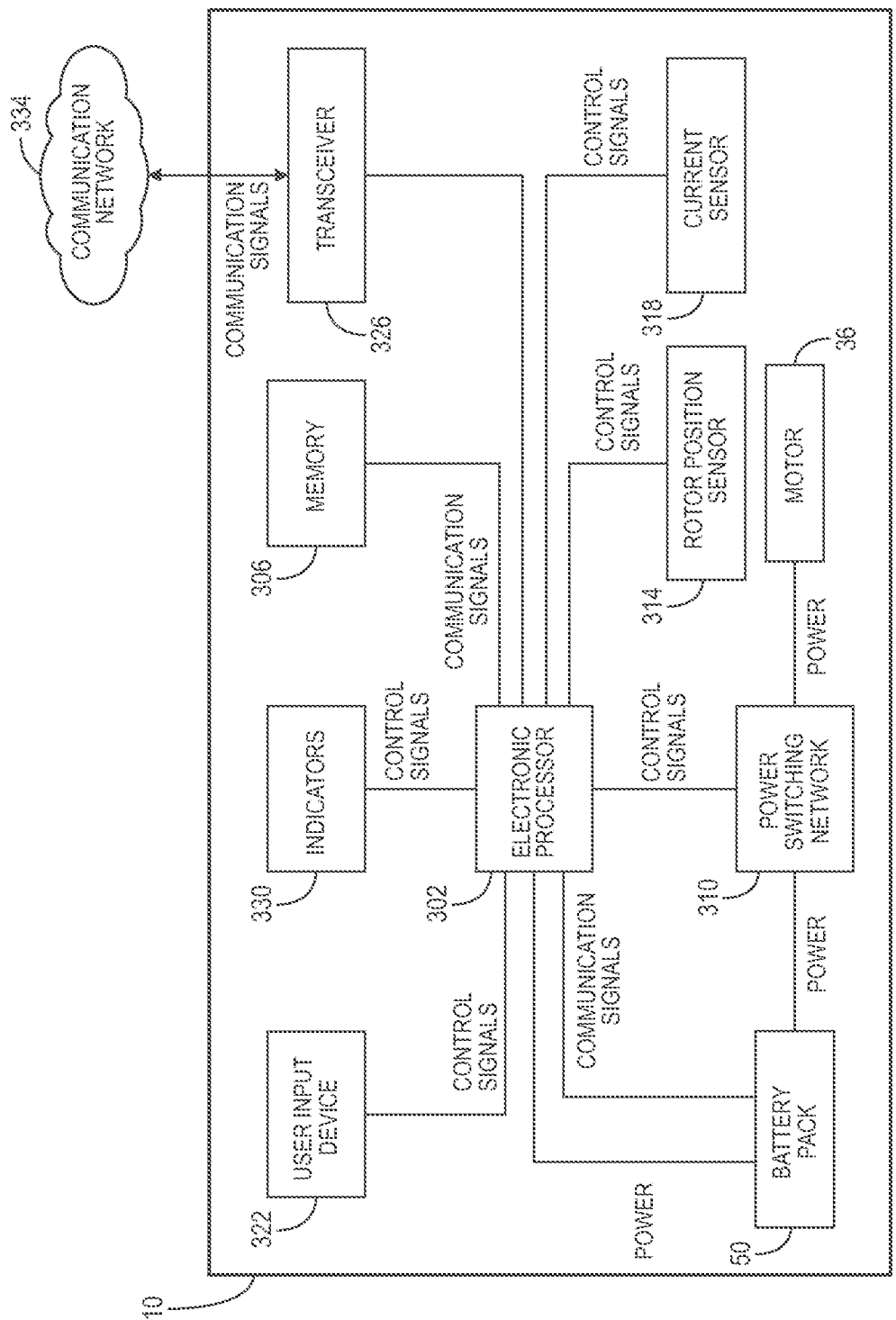
FIG. 20 is a block diagram of the stand-alone motor unit of FIG. 1.

FIG. 20 illustrates a simplified block diagram of the motor unit 10 according to one example embodiment. As shown in FIG. 20, the motor unit 10 includes an electronic processor 302, a memory 306, the battery pack 50, a power switching network 310, the motor 36, a rotor position sensor 314, a current sensor 318, a user input device (e.g., a trigger or power button) 322, a transceiver 326, and indicators (e.g., light-emitting diodes) 330. In some embodiments, the motor unit 10 includes fewer or additional components than those shown in FIG. 20. For example, the motor unit 10 may include a battery pack fuel gauge, work lights, additional sensors, kill switch, the power disconnect switch 86, etc. In some embodiments, elements of the motor unit 10 illustrated in FIG. 20 including one or more of the electronic processor 302, memory 306, power switching network 310, rotor position sensor 314, current sensor 318, user input device (e.g., a trigger or power button) 322, transceiver 326, and indicators (e.g., light-emitting diodes) 330 form at least part of the control electronics 42 shown in FIG. 3, with the electronic processor 302 and the memory 306 forming at least part of the controller 46 shown in FIG. 3.

The memory 306 includes read only memory (ROM), random access memory (RAM), other non-transitory computer-readable media, or a combination thereof. The electronic processor 302 is configured to communicate with the memory 306 to store data and retrieve stored data. The electronic processor 302 is configured to receive instructions and data from the memory 306 and execute, among other things, the instructions. In particular, the electronic processor 302 executes instructions stored in the memory 306 to perform the methods described herein.

As described above, in some embodiments, the battery pack 50 is removably attached to the housing of the motor unit 10 such that a different battery pack 50 may be attached and removed to the motor unit 10 to provide different amount of power to the motor unit 10. Further description of the battery pack 50 (e.g., nominal voltage, sustained operating discharge current, size, number of cells, operation, and the like), as well as the motor 36 (e.g., power output, size, operation, and the like), is provided above with respect to FIGS. 1-19.

The power switching network 310 enables the electronic processor 302 to control the operation of the motor 36. Generally, when the user input device 322 is depressed (or otherwise actuated), electrical current is supplied from the battery pack 50 to the motor 36, via the power switching network 310. When the user input device 322 is not depressed (or otherwise actuated), electrical current is not supplied from the battery pack 50 to the motor 36. In some embodiments, the amount in which the user input device 322 is depressed is related to or corresponds to a desired speed of rotation of the motor 36. In other embodiments, the amount in which the user input device 322 is depressed is related to or corresponds to a desired torque. In other embodiments, a separate input device (e.g., slider, dial, or the like) is included on the motor unit 10 in communication with the electronic processor 302 to provide a desired speed of rotation or torque for the motor 36.

In response to the electronic processor 302 receiving a drive request signal from the user input device 322, the electronic processor 302 activates the power switching network 310 to provide power to the motor 36. Through the power switching network 310, the electronic processor 302 controls the amount of current available to the motor 36 and thereby controls the speed and torque output of the motor 36. The power switching network 310 may include numerous field-effect transistors (FETs), bipolar transistors, or other types of electrical switches. For instance, the power switching network 310 may include a six-FET bridge that receives pulse-width modulated (PWM) signals from the electronic processor 302 to drive the motor 36.

The rotor position sensor 314 and the current sensor 318 are coupled to the electronic processor 302 and communicate to the electronic processor 302 various control signals indicative of different parameters of the motor unit 10 or the motor 36. In some embodiments, the rotor position sensor 314 includes a Hall sensor or a plurality of Hall sensors. In other embodiments, the rotor position sensor 314 includes a quadrature encoder attached to the motor 36. The rotor position sensor 314 outputs motor feedback information to the electronic processor 302, such as an indication (e.g., a pulse) when a magnet of a rotor of the motor 36 rotates across the face of a Hall sensor. In yet other embodiments, the rotor position sensor 314 includes, for example, a voltage or a current sensor that provides an indication of a back electro-motive force (back emf) generated in the motor coils. The electronic processor 302 may determine the rotor position, the rotor speed, and the rotor acceleration based on the back emf signals received from the rotor position sensor 314, that is, the voltage or the current sensor. The rotor position sensor 314 can be combined with the current sensor 318 to form a combined current and rotor position sensor. In this example, the combined sensor provides a current flowing to the active phase coil(s) of the motor 36 and also provides a current in one or more of the inactive phase coil(s) of the motor 36. The electronic processor 302 measures the current flowing to the motor based on the current flowing to the active phase coils and measures the motor speed based on the current in the inactive phase coils.

Based on the motor feedback information from the rotor position sensor 314, the electronic processor 302 can determine the position, velocity, and acceleration of the rotor. In response to the motor feedback information and the signals from the user input device 322, the electronic processor 302 transmits control signals to control the power switching network 310 to drive the motor 36. For instance, by selectively enabling and disabling the FETs of the power switching network 310, power received from the battery pack 50 is selectively applied to stator windings of the motor 36 in a cyclic manner to cause rotation of the rotor of the motor 36. The motor feedback information is used by the electronic processor 302 to ensure proper timing of control signals to the power switching network 310 and, in some instances, to provide closed-loop feedback to control the speed of the motor 36 to be at a desired level. For example, to drive the motor 36, using the motor positioning information from the rotor position sensor 314, the electronic processor 302 determines where the rotor magnets are in relation to the stator windings and (a) energizes a next stator winding pair (or pairs) in the predetermined pattern to provide magnetic force to the rotor magnets in a direct of desired rotation, and (b) de-energizes the previously energized stator winding pair (or pairs) to prevent application of magnetic forces on the rotor magnets that are opposite the direction of rotation of the rotor.

The current sensor 318 monitors or detects a current level of the motor 36 during operation of the motor unit 10 and provides control signals to the electronic processor 302 that are indicative of the detected current level. The electronic processor 302 may use the detected current level to control the power switching network 310 as explained in greater detail below.

The transceiver 326 allows for communication between the electronic processor 302 and an external device (for example, the user equipment 338 of FIG. 21) over a wired or wireless communication network 334. In some embodiments, the transceiver 326 may comprise separate transmitting and receiving components. In some embodiments, the transceiver 326 may comprise a wireless adapter attached to the motor unit 10. In some embodiments, the transceiver 326 is a wireless transceiver that encodes information received from the electronic processor 302 into a carrier wireless signal and transmits the encoded wireless signal to the user equipment 338 over the communication network 334. The transceiver 326 also decodes information from a wireless signal received from the user equipment 338 over the communication network 334 and provides the decoded information to the electronic processor 302.

The communication network 334 provides a wired or wireless connection between the motor unit 10 and the user equipment 338. The communication network 334 may comprise a short range network, for example, a BLUETOOTH network, a Wi-Fi network or the like, or a long range network, for example, the Internet, a cellular network, or the like.

As shown in FIG. 20, the indicators 330 are also coupled to the electronic processor 302 and receive control signals from the electronic processor 302 to turn on and off or otherwise convey information based on different states of the motor unit 10. The indicators 330 include, for example, one or more light-emitting diodes ("LEDs"), or a display screen. The indicators 330 can be configured to display conditions of, or information associated with, the motor unit 10. For example, the indicators 330 are configured to indicate measured electrical characteristics of the motor unit 10, the status of the motor unit 10, the mode of the motor unit 10, etc. The indicators 330 may also include elements to convey information to a user through audible or tactile outputs. In some embodiments, the indicators 330 include an eco-indicator that indicates an amount of power being used by the load during operation.

The connections shown between components of the motor unit 10 are simplified in FIG. 20. In practice, the wiring of the motor unit 10 is more complex, as the components of a motor unit are interconnected by several wires for power and control signals. For instance, each FET of the power switching network 310 is separately connected to the electronic processor 302 by a control line; each FET of the power switching network 310 is connected to a terminal of the motor 36; the power line from the battery pack 50 to the power switching network 310 includes a positive wire and a negative/ground wire; etc. Additionally, the power wires can have a large gauge/diameter to handle increased current. Further, although not shown, additional control signal and power lines are used to interconnect additional components of the motor unit 10.

Figure 21:
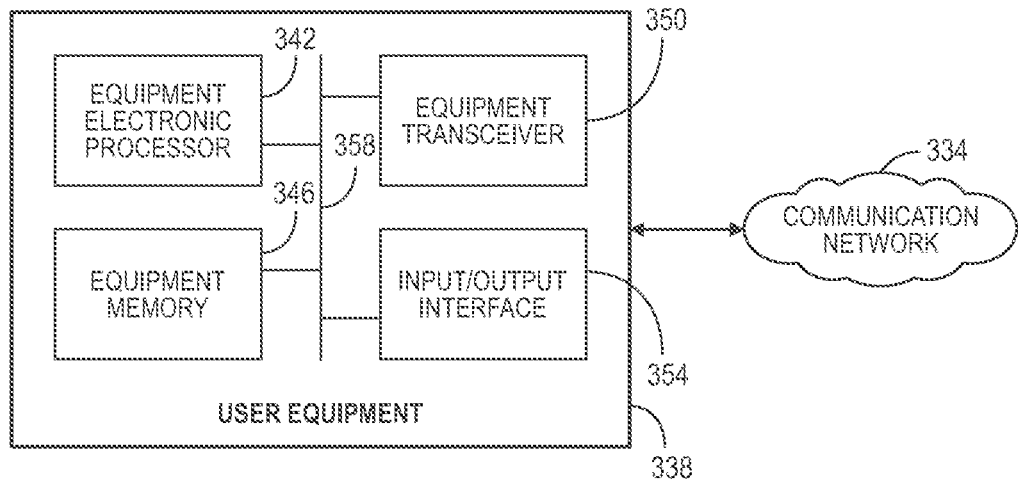
FIG. 21 is a block diagram of a user equipment communicating with the motor unit of FIG. 1.

FIG. 21 illustrates a simplified block diagram of the user equipment 338 according to one example embodiment. The user equipment 338 is, for example, a smart telephone, a tablet computer, a laptop computer, a personal digital assistant, and the like, and may also be referred to as a personal electronic communication device. The user equipment 338 allows the user to customize settings of the motor unit 10 and receive operation information from the motor unit 10. As shown in FIG. 20, the user equipment 338 includes an equipment electronic processor 342, an equipment memory 346, an equipment transceiver 350, and an input/output interface 354. The equipment electronic processor 342, the equipment memory 346, the equipment transceiver 350, and the input/output interface 354 communicate over one or more control and/or data buses (e.g., a communication bus 358). The equipment electronic processor 342, the equipment memory 346, and the equipment transceiver 350 may be implemented similar to the electronic processor 302, the memory 306, and the transceiver 326 of the motor unit 10.

Particularly, the equipment electronic processor 342 executed a motor unit application stored on the equipment memory 346 to perform functionality described herein. The input/output interface 354 includes one or more input components (e.g., a keypad, a mouse, and the like), one or more output components (e.g., a speaker, a display, and the like), or both (e.g., a touch screen display).

Figure 22:
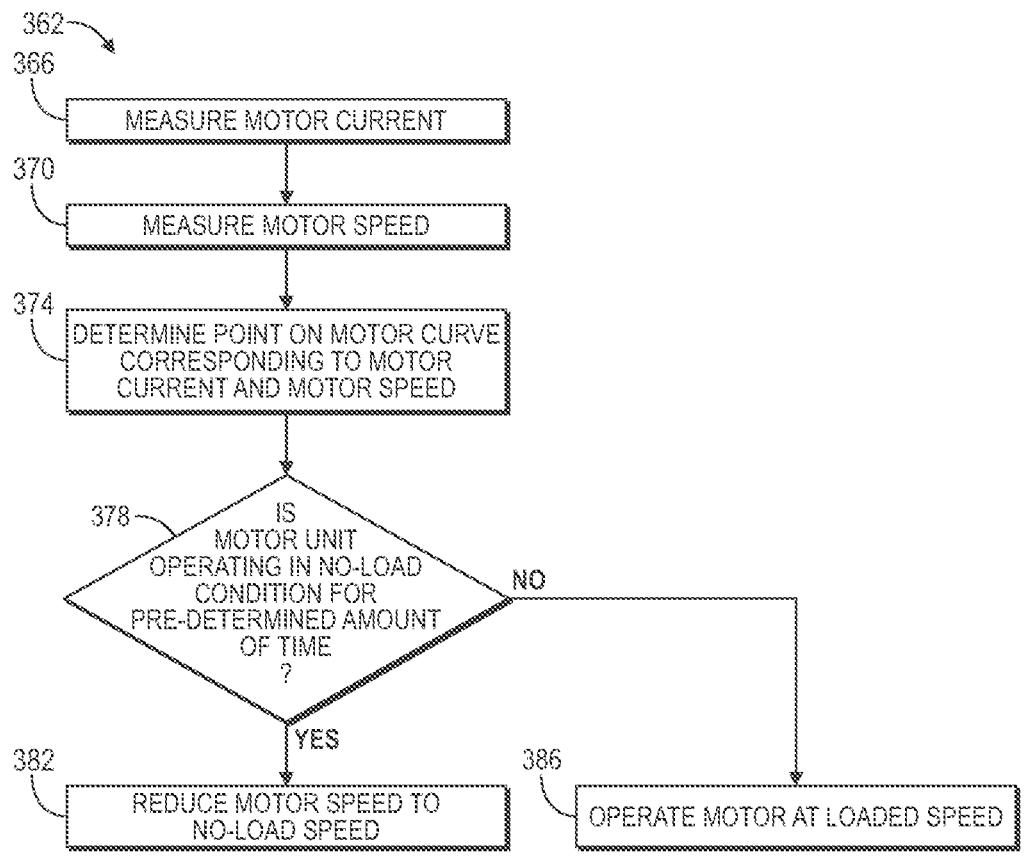
FIG. 22 is a flowchart of a method for no-load operation of the motor unit of FIG. 1.

FIG. 22 illustrates a flowchart of a method 362 for no-load operation of the motor unit 10. In the example illustrated, the method 362 includes measuring, using the current sensor 318, a motor current (at block 366). The electronic processor 302 detects the current flowing through the motor using the current sensor 318 as described above. The current sensor 318 may detect the current level at discrete time intervals, for example, every 2 milli-seconds, and provide the control signals indicating the current level at the discrete time intervals to the electronic processor 302. The method 362 also includes measuring, using the rotor position sensor 314, the motor speed (at block 370). The electronic processor 302 receives feedback from the rotor position sensor 314 when a magnet of the rotor rotates across the face of a Hall sensor. The electronic processor 302 determines the speed of the motor 36 based on the frequency of the pulses received from the rotor position sensor 314.

The method 362 further includes determining, using the electronic processor 302, a point on the motor power curve corresponding to the measured motor current and the measured motor speed (at block 374). In one example, the electronic processor 302 constructs a motor power graph having motor speed on the X-axis and motor current on the Y-axis. The point on the motor power curve is the point corresponding to the measured motor current and the measured motor speed on the motor power graph.

The method 362 also includes determining, using the electronic processor 302, whether the motor unit 10 is operating in a no-load condition for a pre-determined period of time based on the point on the motor power curve (at block 378). The motor 36 may be operating at full power (or 100% duty cycle) or at a selected power or duty cycle corresponding to the position of the user input device 322. The amount of current flowing to the motor 36 is proportional to the load on the motor 36. That is, when there is a high load on the motor unit 10, the motor 36 draws higher current from the battery pack 50 and when there is a lighter load on the motor unit 10, the motor 36 draws lower current from the battery pack 50. The electronic processor 302 determines the load on the motor unit 10 based on the point on the motor power curve. For example, for a measured speed, the electronic processor 302 determines whether the measured current is below a current threshold corresponding to the measured speed. When the measured current is below the current threshold, the electronic processor 302 determines that the motor unit 10 is operating in a no-load condition and, when the measured current is above the current threshold, the electronic processor 302 determines that the motor unit 10 is not operating in a no-load condition. The electronic processor 302 may then further determine whether the motor unit 10 is operating in the no-load condition for the pre-determined period of time. For example, the electronic processor 302 determines whether the measured current is below the current threshold corresponding to the measured speed for the pre-determined period of time.

The method 362 further includes, in response to determining that the motor unit 10 is operating in the no-load condition for a pre-determined period of time, reducing, using the electronic processor 302, the motor speed of the motor 36 to a no-load speed (at block 382). As discussed above, the electronic processor 302 may provide control signals to the power switching network 310 to control the speed of the motor 36 by selecting a particular pulse width modulated (PWM) duty cycle for driving the power switching network 310. The speed control may be open loop or closed loop. The electronic processor 302 may also shutoff (i.e., reduce the duty cycle to zero) the motor when the electronic processor 302 determines that the motor unit 10 is operating in the no-load condition for the pre-determined period of time. In one example, the electronic processor 302 reduces the speed of the motor 36 to a no-load speed by reducing a duty cycle of the pulse width modulated signals provided to the power switching network 310 to 5%, 10%, or 15%. The method 362 also includes, in response to determining that the motor unit 10 is not operating in the no-load condition for the pre-determined period of time, operating, using the electronic processor 302, the motor 36 at a loaded speed that is greater than the no-load speed (at block 386). For example, to operate at the loaded speed, the electronic processor 302 controls the power switching network 310 to operate the motor 36 according to the power or speed corresponding to the position of the user input device 322 or at full power (i.e., 100% duty cycle) (for example, when the motor unit 10 does not include a variable speed trigger). After block 382 and 386, respectively, the electronic processor 302 may loop back to execute block 366, thus providing continued load-based operation control throughout an operation of the motor unit 10.

Figure 23:
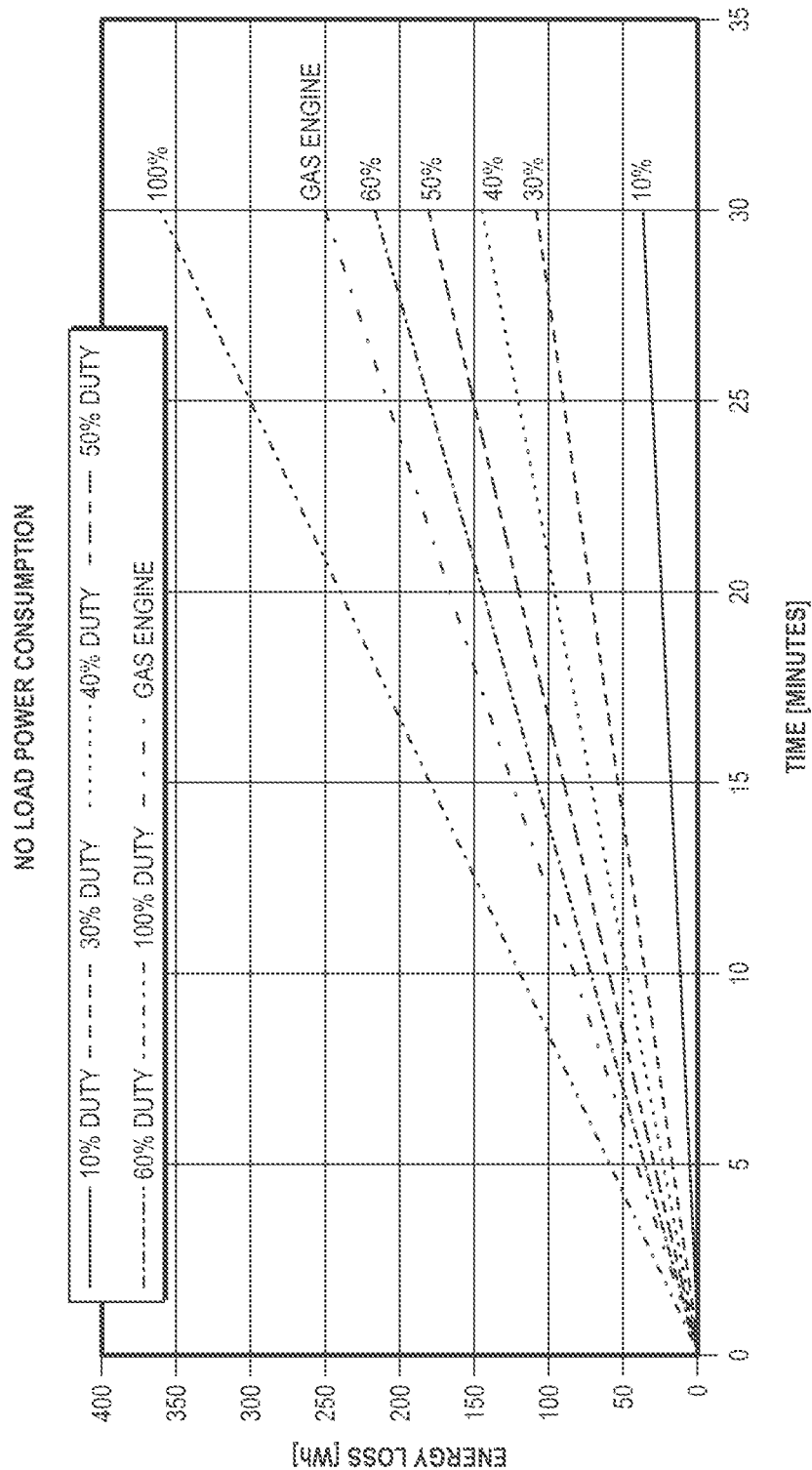
FIG. 23 is a graphical illustration of power savings offered by the motor unit of FIG. 1 implementing the method of FIG. 22.

Typical gasoline engines that drive power equipment are not controlled to reduce speed or power when the gasoline engine is operating in a no-load condition. Accordingly, gasoline engines continue to burn excess amounts of fuel and expend energy even when the gasoline engines are operating under no-load. The electronic processor 302 executing the method 362 detects when the motor unit 10 is operating under no-load and reduces the motor speed or power to provide additional energy savings and then returns to normal power when loaded to meet the demand of a task. In one example, as shown in FIG. 23, by reducing the duty cycle to 10% in the no-load condition, the motor unit 10 provides energy savings of about 5 times that of a gasoline engine operating at no-load. Energy saving resulting from other reduced duty cycle levels are also illustrated in FIG. 23.

During operation of gas engines, an excessive input force exerted on the gas engine or a large load encountered by the power equipment powered by the gas engine may cause a resistive force impeding further operation of the gas engine. For example, a gas engine encountering higher than usual loads may have its motor slowed or bogged-down because of the excessive load. This bog-down of the motor can be sensed (e.g., felt and heard) by a user, and is a helpful indication that an excessive input, which may potentially damage the gas engine or the power equipment, has been encountered. In contrast, high-powered electric motor driven units, similar to the motor unit 10, for example, do not innately provide the bog-down feedback to the user. Rather, in these high-powered electric motor driven units, excessive loading of the motor unit 10 causes the motor to draw excess current from the power source or battery pack 50. Drawing excess current from the battery pack 50 may cause quick and potentially detrimental depletion of the battery pack 50.

Figure 24:
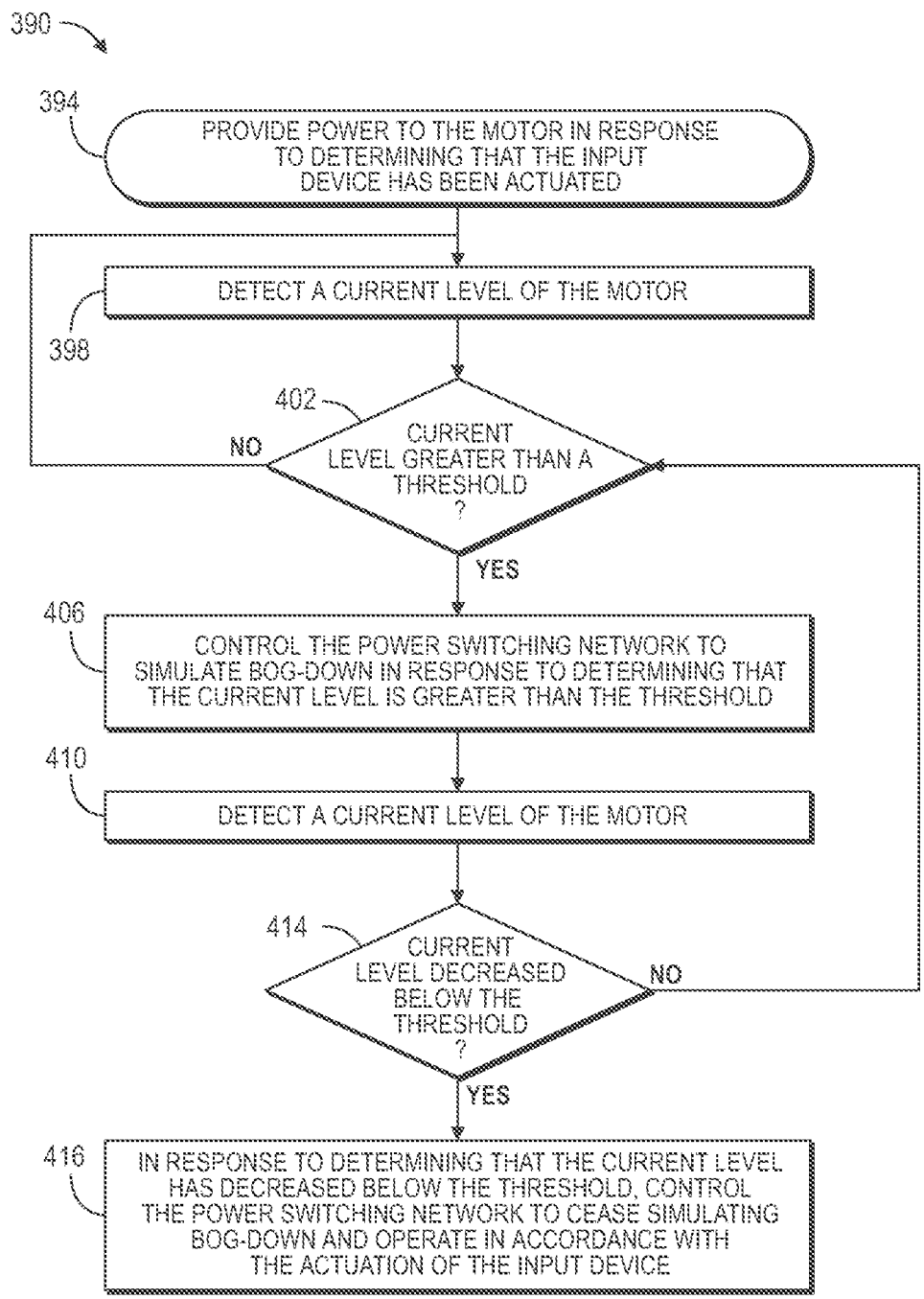
FIG. 24 is a flowchart of a method for providing simulated bog-down operation of the motor unit of FIG. 1 that is similar to actual bog-down experienced by gas engines.

Accordingly, in some embodiments, the motor unit 10 includes a simulated bog-down feature to provide an indication to the user that excessive loading of the motor unit 10 or power equipment is occurring during operation. FIG. 24 illustrates a flowchart of a method 390 for providing simulated bog-down operation of the motor unit 10 that is similar to actual bog-down experienced by gas engines.

The method 390 includes controlling, using the electronic processor 302, the power switching network 310 to provide power to the motor 36 in response to determining that the user input device 322 has been actuated (at block 394). For example, the electronic processor 302 provides a PWM signal to the FETs of the power switching network 310 to drive the motor 36 in accordance with the drive request signal from the user input device 322. The method 390 further includes detecting, using the current sensor 318, a current level of the motor 36 (at block 398). Block 398, at least in some embodiments, may be performed using similar techniques as described above for block 366 with respect to FIG. 22. The method 390 also includes comparing, using the electronic processor 302, the current level to a bog-down current threshold (at block 402). In response to determining that the current level is lower than the bog-down current threshold, the method 390 proceeds back to block 398 such that the electronic processor 302 repeats blocks 398 and 402 until the current level is greater than the bog-down current threshold.

In response to determining that the current level is greater than the bog-down current threshold, the method 390 includes controlling, using the electronic processor 302, the power switching network 310 to simulate bog-down (at block 406). In some embodiments, the electronic processor 302 controls the power switching network 310 to decrease the speed of the motor 36 to a non-zero value. For example, the electronic processor 302 reduces a duty cycle of the PWM signal provided to the FETs of the power switching network 302. In some embodiments, the reduction in the duty cycle (i.e., the speed of the motor 36) is proportional to an amount that the current level is above the bog-down current threshold (i.e., an amount of excessive load). In other words, the more excessive the load of the motor unit 10, the further the speed of the motor 36 is reduced by the electronic processor 302. For example, in some embodiments, the electronic processor 302 determines, at block 406, the difference between the current level of the motor 36 and the bog-down current threshold to determine a difference value. The electronic processor 302 determines the amount of reduction in the duty cycle based on the difference value (e.g., by using a look-up table that maps the difference value to a motor speed or duty cycle).

In some embodiments, at block 406, the electronic processor 302 controls the power switching network 310 in a different or additional manner to provide an indication to the user that excessive loading of the motor unit 10 is occurring during operation. In such embodiments, the behavior of the motor 36 may provide a more noticeable indication to the user that excessive loading of the motor unit 10 is occurring than the simulated bog-down described above. As one example, the electronic processor 302 controls the power switching network 310 to oscillate between different motor speeds. Such motor control may be similar to a gas engine-powered power equipment stalling and may provide haptic feedback to the user to indicate that excessive loading of the motor unit 10 is occurring. In some embodiments, the electronic processor 302 controls the power switching network 310 to oscillate between different motor speeds to provide an indication to the user that very excessive loading of the motor unit 10 is occurring. For example, the electronic processor 302 controls the power switching network 310 to oscillate between different motor speeds in response to determining that the current level of the motor 36 is greater than a second bog-down current threshold that is greater than the bog-down current threshold described above with respect to simulated bog-down. As another example, the electronic processor 302 controls the power switching network 310 to oscillate between different motor speeds in response to determining that the current level of the motor 36 has been greater than the bog-down current threshold described above with respect to simulated bog-down for a predetermined time period (e.g., two seconds). In other words, the electronic processor 302 may control the power switching network 310 to simulate bog-down when excessive loading of the motor unit 10 is detected and may control the power switching network 310 to simulate stalling when excessive loading is prolonged or increases beyond a second bog-down current threshold.

With respect to any of the embodiments described above with respect to block 406, other characteristics of the motor unit 10 and the motor 36 may provide indications to the user that excessive loading of the motor unit 10 is occurring (e.g., tool vibration, resonant sound of a shaft of the motor 36, and sound of the motor 36). In some embodiments, these characteristics change as the electronic processor 302 controls the power switching network 310 to simulate bog-down or to oscillate between different motor speeds as described above.

The method 390 further includes detecting, using the electronic processor 302, the current level of the motor 36 (at block 410). The method 390 also includes comparing, using the electronic processor 302, the current level of the motor 36 to the bog-down current threshold (at block 414). When the current level remains above the bog-down current threshold, the method 362 proceeds back to block 402 such that the electronic processor 302 repeats blocks 402 through 414 until the current level decreases below the bog-down current threshold. In other words, the electronic processor 302 continues to simulate bog-down until the current level decreases below the bog-down current threshold. Repetition of blocks 402 through 414 allows the electronic processor 302 to simulate bog-down differently as the current level changes but remains above the bog-down current threshold (e.g., as mentioned previously regarding proportional adjustment of the duty cycle of the PWM provided to the FETs).

When the current level of the motor 36 decreases below the bog-down current threshold (e.g., in response to the user reducing the load on the motor unit 10), the method 390 includes controlling, using the electronic processor 302, the power switching network 310 to cease simulating bog-down and operate in accordance with the actuation of the user input device 322 (i.e., in accordance with the drive request signal from the user input device 322) (at block 416). In other words, the electronic processor 302 controls the power switching network 310 to increase the speed of the motor 36 from the reduced simulated bog-down speed to a speed corresponding to the drive request signal from the user input device 322. For example, the electronic processor 302 increases the duty cycle of the PWM signal provided to the FETs of the power switching network 310. In some embodiments, the electronic processor 302 gradually ramps the speed of the motor 36 up from the reduced simulated bog-down speed to the speed corresponding to the drive request signal from the user input device 322. Then, the method 390 proceeds back to block 394 to allow the electronic processor 302 to continue to monitor the motor unit 10 for excessive load conditions. In some embodiments of the method 390, in block 414, a second current threshold different than the bog-down threshold of block 402 is used.

For example, in some embodiments, the bog-down threshold is greater than the second current threshold.

Figure 25:
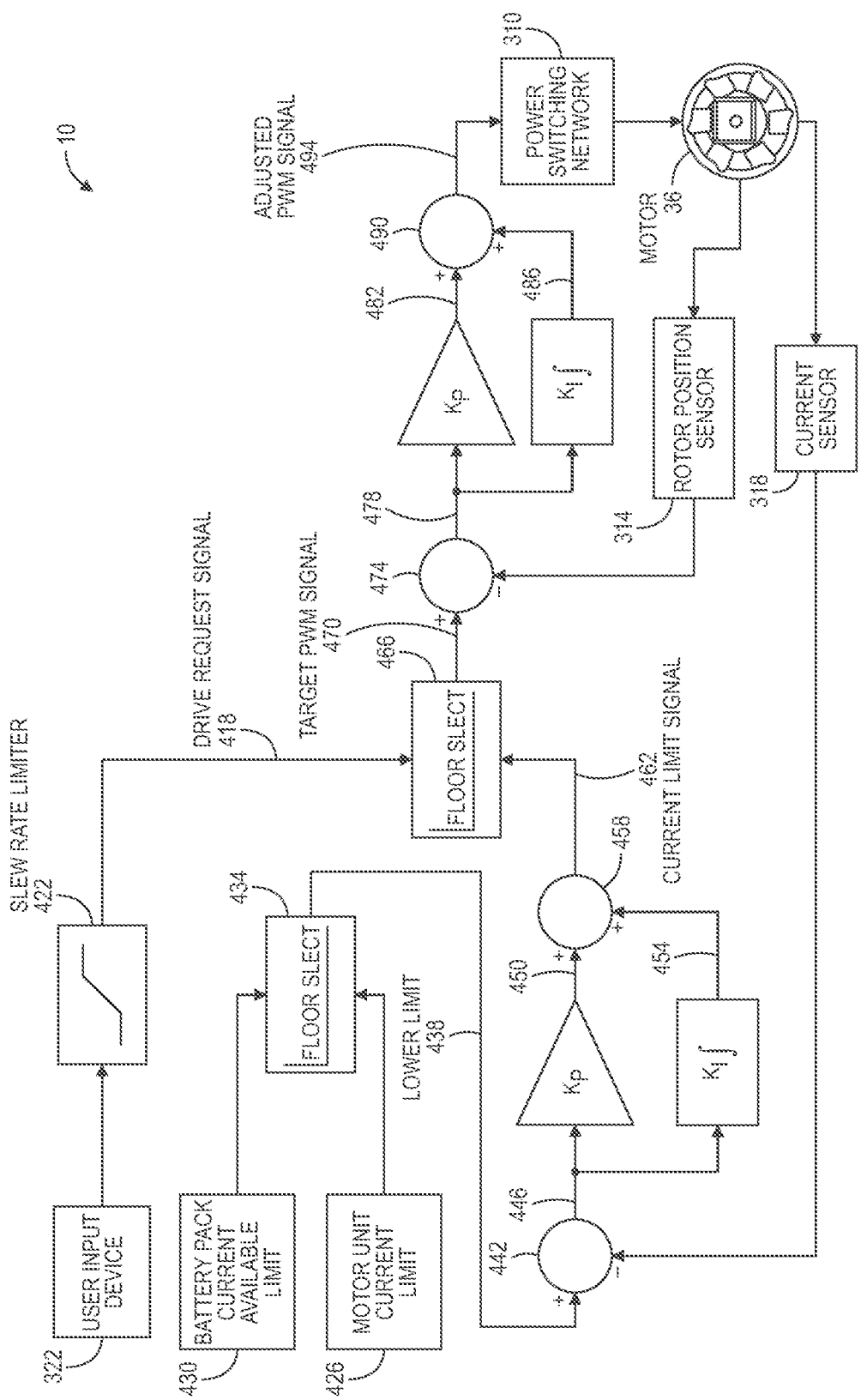
FIG. 25 is a schematic diagram of the motor unit of FIG. 1 that shows how an electronic processor of the motor unit implements the methods of FIG. 24.

FIG. 25 illustrates a schematic control diagram of the motor unit 10 that shows how the electronic processor 302 implements the method 390 according to one example embodiment. The electronic processor 302 receives numerous inputs, makes determinations based on the inputs, and controls the power switching network 310 based on the inputs and determinations. As shown in FIG. 25, the electronic processor 302 receives a drive request signal 418 from the user input device 322 as explained previously herein. In some embodiments, the motor unit 10 includes a slew rate limiter 422 to condition the drive request signal 418 before the drive request signal 418 is provided to the electronic processor 302. The drive request signal 418 corresponds to a first drive speed of the motor 36 (i.e., a desired speed of the motor 36 based on an amount of depression of the user input device 322 or based on the setting of a secondary input device). In some embodiments, the drive request signal 418 is a desired duty ratio (e.g., a value between 0-100%) of the PWM signal for controlling the power switching network 310.

The electronic processor 302 also receives a motor unit current limit 426 and a battery pack current available limit 430. The motor unit current limit 426 is a predetermined current limit that is, for example, stored in and obtained from the memory 306. The motor unit current limit 426 indicates a maximum current level that can be drawn by the motor unit 10 from the battery pack 50. In some embodiments, the motor unit current limit 426 is stored in the memory 306 during manufacturing of the motor unit 10. The battery pack current available limit 430 is a current limit provided by the battery pack 50 to the electronic processor 302. The battery pack current available limit 430 indicates a maximum current that the battery pack 50 is capable of providing to the motor unit 10. In some embodiments, the battery pack current available limit 430 changes during operation of the motor unit 10. For example, as the battery pack 50 becomes depleted, the maximum current that the battery pack 50 is capable of providing decreases, and accordingly, as does the battery pack current available limit 430. The battery pack current available limit 430 may also be different depending on the temperature of the battery pack 50 and/or the type of battery pack 50. Although the limits 426 and 430 are described as maximum current levels for the motor unit 10 and battery pack 50, in some embodiments, these are firmware-coded suggested maximums or rated values that are, in practice, lower than true maximum levels of these devices.

As indicated by floor select block 434 in FIG. 25, the electronic processor 302 compares the motor unit current limit 426 and the battery pack current available limit 430 and determines a lower limit 438 using the lower of the two signals 426 and 430. In other words, the electronic processor 302 implementing a function, floor select 434, determines which of the two signals 426 and 430 is lower, and then uses that lower signal as the lower limit 438. The electronic processor 302 also receives a detected current level of the motor 36 from the current sensor 318. At node 442 of the schematic diagram, the electronic processor 302 determines an error (i.e., a difference) 446 between the detected current level of the motor 36 and the lower limit 438. The electronic processor 302 then applies a proportional gain to the error 446 to generate a proportional component 450. The electronic processor 302 also calculates an integral of the error 446 to generate an integral component 454. At node 458, the electronic processor 302 combines the proportional component 450 and the integral component 454 to generate a current limit signal 462. The current limit signal 462 corresponds to a drive speed of the motor 36 (i.e., a second drive speed) that is based on the detected current level of the motor 36 and one of the motor unit current limit 426 and the battery pack current available limit 430 (whichever of the two limits 426 and 430 is lower). In some embodiments, the current limit signal 462 is in the form of a duty ratio (e.g., a value between 0-100%) for the PWM signal for controlling the power switching network 310.

As indicated by floor select block 466 in FIG. 25, the electronic processor 302 compares the current limit signal 462 and the drive request signal 418 and determines a target PWM signal 470 using the lower of the two signals 462 and 418. In other words, the electronic processor 302 determines which of the first drive speed of the motor 36 corresponding to the drive request signal 418 and the second drive speed of the motor 36 corresponding to the current limit signal 462 is less. The electronic processor 302 then uses the signal 418 or 462 corresponding to the lowest drive speed of the motor 36 to generate the target PWM signal 470.

Figure 26:
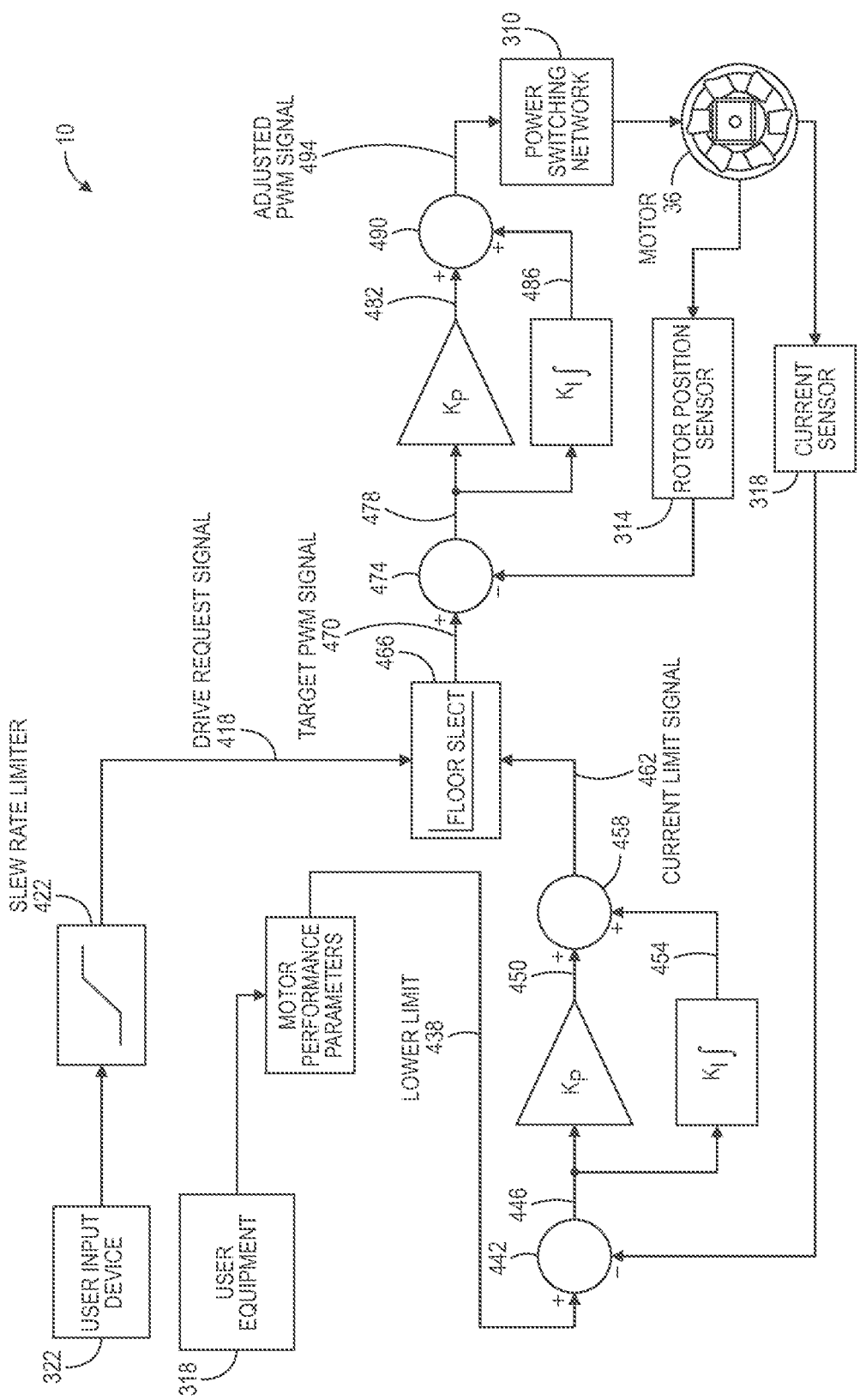
FIG. 26 is a schematic diagram of the motor unit of FIG. 1 that shows how an electronic processor of the motor unit implements the method of FIG. 24 with user customization.

The electronic processor 302 also receives a measured rotational speed of the motor 36, for example, from the rotor position sensor 314. At node 474 of the schematic diagram, the electronic processor 302 determines an error (i.e., a difference) 478 between the measured speed of the motor 36 and a speed corresponding to the target PWM signal 470. The electronic processor 302 then applies a proportional gain to the error 478 to generate a proportional component 482. The electronic processor 302 also calculates an integral of the error 478 to generate an integral component 486. At node 490, the electronic processor 302 combines the proportional component 482 and the integral component 486 to generate an adjusted PWM signal 494 that is provided to the power switching network 310 to control the speed of the motor 36. The components of the schematic diagram implemented by the electronic processor 302 as explained above allow the electronic processor 302 to provide simulated bog-down operation of the motor unit 10 that is similar to actual bog-down experienced by gas engines. In other words, in some embodiments, by adjusting the PWM signal 494 in accordance with the schematic control diagram, the motor unit 10 lowers and raises the motor speed in accordance with the load on the motor unit 10, which is perceived by the user audibly and tactilely, to thereby simulate bog down. FIGS. 25 and 26 illustrate a closed loop speed control of the motor 36. In some embodiments, the method 390 uses open loop speed control of the motor 36. For example, in FIGS. 25 and 26, the method 390 can be adapted for open loop speed control by eliminating node 474, the proportional component 482, the integral component 486, the node 490, and the feedback signal from the rotor positions sensor 314.

FIG. 26 illustrates a schematic control diagram of the motor unit 10 that shows how the electronic processor 302 implements the method 390 according to another example embodiment. The control process illustrated in FIG. 26 is similar to the control process illustrated in FIG. 25. However, rather than determining the lower limit 438 based on the motor unit current limit 426 and the battery pack current available limit 430, the electronic processor 302 determines the lower limit 438 based on an input received from the user equipment 338. For example, the user may define the motor performance on the user equipment 338 by providing current, power, torque, or performance parameters (referred to as motor performance parameters) over the input/output interface of the user equipment 338. The user equipment 338 communicates the motor performance parameters defined by the user to the electronic processor 302 over the communication network 334. The electronic processor 302 determines the lower limit 438 based on the motor performance parameters. For example, the electronic processor 302 uses the current defined in the motor performance parameters as the lower limit 438. The control process shown in FIG. 26 provides the user the ability to customize performance of the motor unit 10 according to the needs of the power equipment.

In some embodiments, the motor performance parameters may be defined based on an application of the motor unit 10. The motor unit 10 may be used to power different kinds of power equipment for different applications. The user may select the application that the motor unit 10 is being used for on the input/output interface 354 of the user equipment 338. The equipment electronic processor 342 may determine the motor performance parameters based on the application selected by the user. For example, the equipment electronic processor 342 may refer to a look-up table in the equipment memory 346 mapping each application of the motor unit 10 to a set of motor performance parameters. The equipment electronic processor 342 may then provide the motor performance parameters to the electronic processor 302. In some embodiments, the user equipment 338 may provide the application selected by the user to the electronic processor 302. The electronic processor 302, rather than the equipment electronic processor 338, may determine the motor performance parameters based on the application selected by the user. For example, the electronic processor 302 may refer a look-up table in the memory 306 mapping each application of the motor unit 10 to a set of motor performance parameters.

Figure 27:
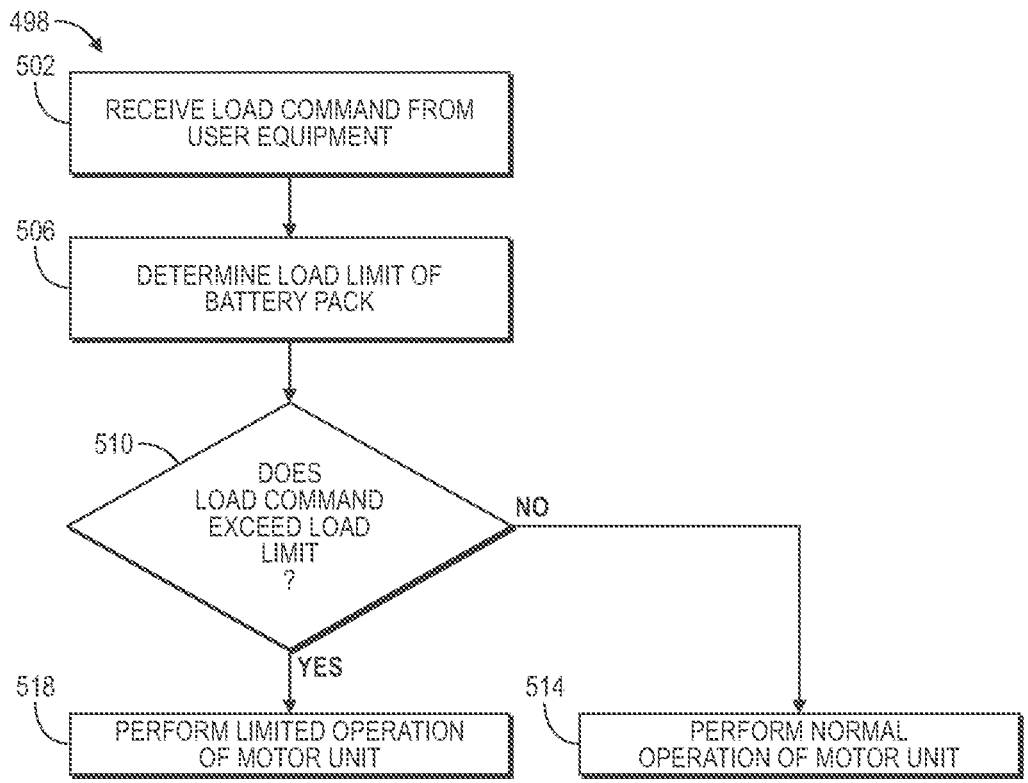
FIG. 27 is a flowchart of a method for checking compatibility of the motor unit of FIG. 1 for a user-selected application.

In some embodiments, the electronic processor 302 may perform a system compatibility check prior to each power-up to determine whether the motor unit 10 is capable of the power outputs defined by the user. FIG. 27 is a flowchart of a method 498 for system compatibility check according to one example embodiment. As shown in FIG. 27, the method 498 includes receiving, via the transceiver 326, a load command from the user equipment 338 (at block 502). For example, the electronic processor 302 receives the motor performance parameters from the equipment electronic processor 342 as described above. The motor performance parameters may include an output power requirement (i.e., the load command) of the motor unit 10. In some embodiments, the load command is a rotation speed of the motor unit 10 (e.g., 5000 RPM). For example, the user may select the rotation speed or an application that maps to the rotation speed on the user equipment 338. The electronic processor 302 determines the amount of load or current draw required to operate the motor at the selected speed (i.e., the load command). The method 498 also includes determining, using the electronic processor 302, a load limit of the battery pack 50 (at block 506). The electronic processor 302 determines the load limit based on, for example, battery type, battery state of charge, battery age, and the like. In some embodiments, the electronic processor 302 determines the load limit based on the battery pack current available limit 430. In some embodiments, the load limit is a maximum speed that can be attained based on the battery conditions. For example, the electronic processor may determine that the maximum rotational speed that can be achieved based on the power available through the battery pack 50 is 4000 RPM.

The method 498 further includes determining, using the electronic processor 302, whether the load command exceeds the load limit (at block 510). The electronic processor 302 compares the load command to the load limit to determine whether the load command exceeds the load limit. In response to determining that the load command does not exceed the load limit, the method 498 includes performing, using the electronic processor 302, normal operation of the motor unit 10 (at block 514). Performing normal operation of the motor unit 10 includes controlling the power switching network 310 to operate the motor 36 according to the load command provided by the user and the input from the user input device 322. For example, the electronic processor 302 provides a PWM signal to the FETs of the power switching network 310 to drive the motor 36 in accordance with the drive request signal from the user input device 322. In response to determining that the load command exceeds the load limit, the method 498 includes performing, using the electronic processor 302, limited operation of the motor unit 10 (at block 518). Performing limited operation may include for example, turning off the motor 36, running the motor 36 with limited power within the load limit of the battery pack 50, or the like. In one example, performing limited operation may include simulating bog-down of the motor unit 10 as described above. In some embodiments, the electronic processor 302 may also warn the user that the load command exceeds the load limit. For example, the electronic processor 302 may provide an indication to the user equipment 338 that the load command exceeds the load limit. The user equipment 338 in response to receiving the indication from the electronic processor 302 provides an audible, tactile, or visual feedback to the user indicating that the load command exceeds the load limit. For example, the user equipment 338 displays a warning text on the input/output interface 354 that the load command exceeds the load limit. In some embodiments, the electronic processor 302 activates the indicators 330 to warn the user that the load command exceeds the load limit. The user may then adjust the load command based on the warning received from the electronic processor 302. After block 514 and 518, respectively, the electronic processor 302 loops back to the block 502.

Figure 28:
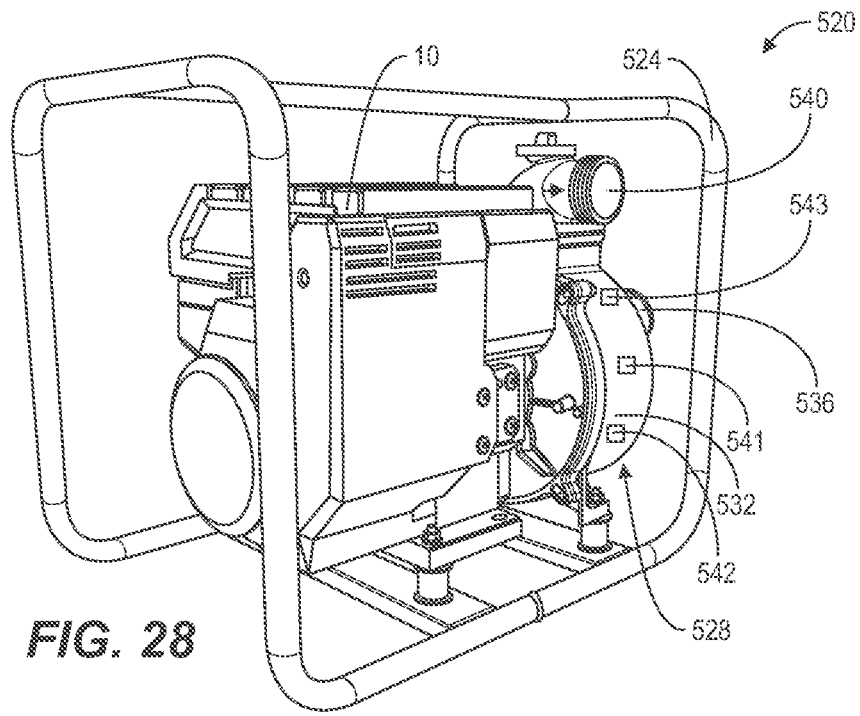
FIG. 28 is a perspective view of a pump system including a stand-alone motor unit of FIG. 42.

FIG. 28 illustrates a pump system 520 including a frame 524 supporting the stand-alone motor unit 10 and a pump 528 with the motor unit 10 operable to drive the pump 528. The illustrated pump 528 is a centrifugal pump having an impeller positioned within a housing 532 of the pump 528 that is rotatable about an axis to move material from an inlet 536 of the pump 528 to an outlet 540 of the pump 528. Specifically, the pump 528 is a "trash pump" that includes enough clearance between the impeller of the pump 528 and the housing 532 (e.g., 8 millimeters) to provide a mixture of a liquid (e.g., water) and debris (e.g., solid material like mud, small rocks, leases, sand, sludge, etc.) to pass through the pump 528 from the inlet 536 to the outlet 540 without the debris getting trapped within the pump 528 and decreasing the performance of the pump system 520. The pump system 520 driven by the motor unit 10 includes many advantages over a conventional pump driven by an internal combustion engine, some of which are discussed below.

The motor unit 10 of the pump system 520:
  drives the pump 528 in two different directions to clear the pump 528 if debris is stuck within the pump 528 (without utilizing a transmission including a forward gear and a rearward gear);
  is operable by AC power (e.g., from a standard 120 volt outlet) or DC power (e.g., from a battery pack) to drive the pump 528 to eliminate a downtime refueling period of the internal combustion engine;
  eliminates an air intake and an exhaust outlet such that the motor unit 10 can be fluidly sealed in a water proof housing;

is operable in a wider speed range than a comparable internal combustion engine, for example, the motor unit 10 is operable at a lower speed range (e.g., less than 2,000 revolutions per minute) than a comparable internal combustion engine to increase runtime of the motor unit 10, and the motor unit 10 is also operable at a higher speed range (e.g., greater than 3,600 revolutions per minute) than a comparable internal combustion engine to provide a broader output capability;

operates the pump 528 regardless of the orientation of the motor unit 10, unlike an internal combustion engine that can only can operate in one orientation (e.g., an upright orientation); and eliminates fuel and oil to operate—unlike an internal combustion engine—allowing the pump system 520 to run, be transported, or stored at any orientation (e.g., upside down or on its side) without the motor unit 10 leaking oil or flooding with fuel.

In addition, the electronic processor 302 of the motor unit 10 can, for example:

via first sensors 541 in the pump 528 that are in communication with the electronic processor 302, detect an amount of liquid being moved through the pump 528 to enable operation of the pump 528 if the amount of liquid is at or above a threshold level and automatically stops operation of the pump 528 if the amount of liquid is below the threshold level. However, in other embodiments, the electronic processor 302 can simply monitor the current drawn by the motor 36 to determine whether to slow down or stop the motor 36;

provide a battery status that at least represents a power level of the battery pack of the motor unit 10;

be in communication with a remote control to start or stop the motor unit 10 remotely with the remote control including status indicators of the motor unit 10;

turn ON/OFF the motor unit 10—and ultimately the pump 528, change a speed of the motor unit 10, change a flow rate of liquid and debris exiting the outlet 540, provide a timer (e.g., automatically turn OFF the motor unit 10), provide a delayed start of the motor unit 10—all of which can occur without direct user input (e.g., via sensors or programs);

be in communication with other power tools to provide tool-to-tool communication and coordination;

be in communication with a wireless network to track the location of the pump system 520, report the pump system 520 usage and performance data, disable/enable the pump system 520 remotely, change the performance of the pump system 520 remotely, etc.;

be in communication with digital controls on a customizable user interface (e.g., a touch display) that control, regulate, measure different aspects of the motor unit 10 and/or the pump 528;

via second sensors 542 on the pump 528 that are in communication with the electronic processor 302 and arranged in an impeller reservoir, monitor suction or fluid level in the impeller reservoir and signal that the pump 528 is not adequately primed or automatically shut off the pump 528 to protect the pump system 520;

electronically control a valve 543 on the pump 528 to adjust an exhaust opening to support an auto-priming capability;

electronically control the valve 543 to adjust the exhaust opening so that only air exits and slowly reopen the valve 543 until suction is established;

adjust pressure or flow rate of the pump 528 with the speed of the motor unit 10 instead of a throttle; and control a priming mode or "soft start" that optimizes the speed of the impeller of the pump 528 for self-priming, and governing to a slower speed until full suction is achieved.

Test specifications of the pump system 520 appear in Table 7 below:

TABLE 7

|  | Full Speed | Low Speed |
| --- | --- | --- |
| Motor Speed (RPM) | 19,627 | 7,452 |
| Average Current (Amperes) | 38.0 | 2.11 |
| Peak Current (95%) (Amperes) | 43 | 2 |
| Instantaneous Peak Current (Amperes) | 46 | 43 |
| Average Voltage (V) | 69.9 | 76.41 |
| Average Power (HP) | 3.56 | 0.22 |
| Peak Power (95%) (HP) | 4.16 | 0.23 |
| Runtime (Minutes) | 9.20 | 96.86 |
| Flow Rate (Gallons per Minute) | 120.3 | 48.9 |
| Total Pumped (Gallons) | 1,098 | 4,753 |

The values listed in Table 7 were measured during a full discharge cycle of the battery pack 50 (i.e., full charge to shutoff due to the voltage of the battery pack 50 dropping below a predetermined value).

Figure 29:
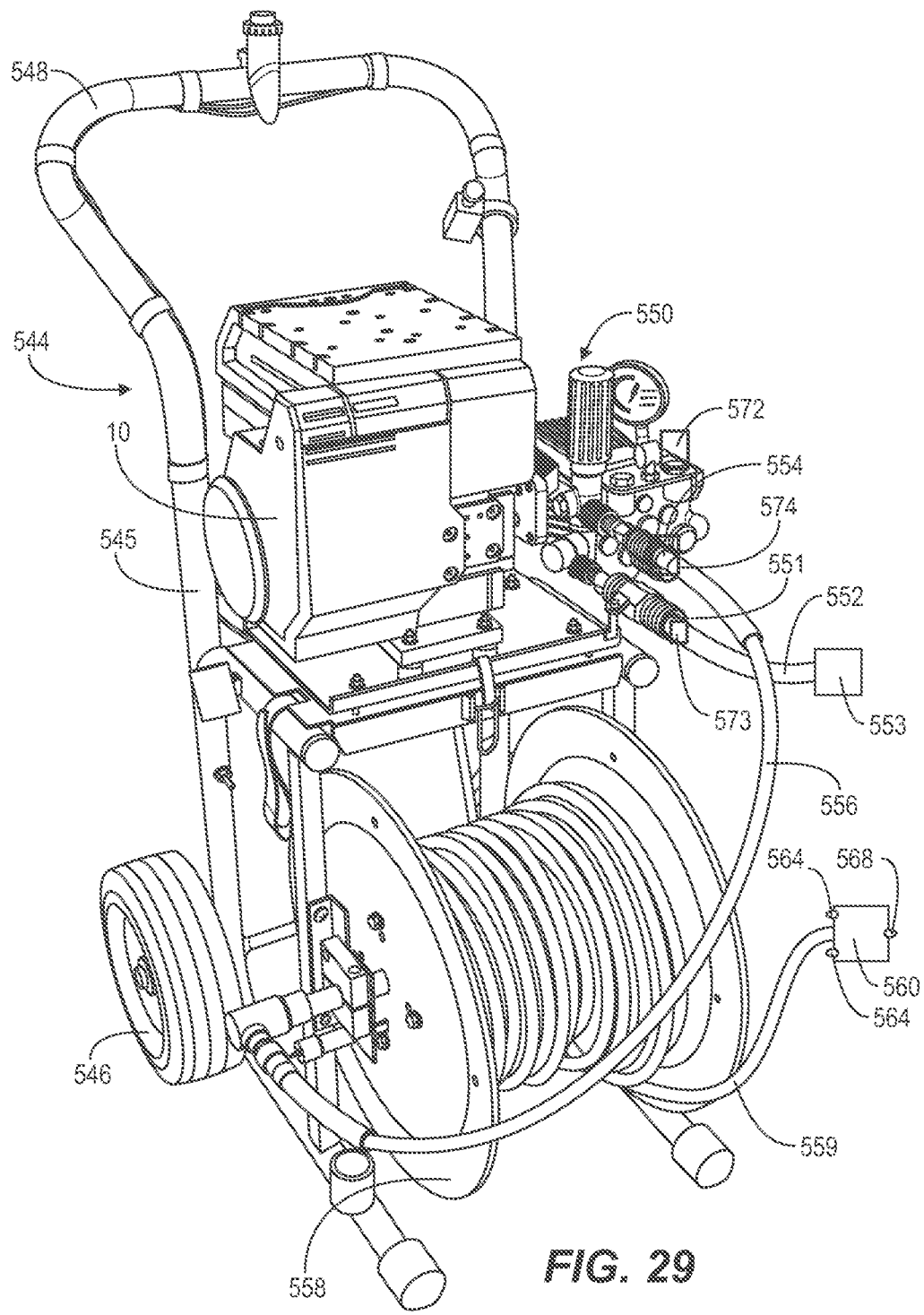
FIG. 29 is a perspective view of a jetter including the stand-alone motor unit of FIG. 42.

FIG. 29 illustrates a jetter 544 including a frame 545 with a pair of wheels 546 and a handle 548. The frame 545 supports the stand-alone motor unit 10 and a pump 550 driven by the motor unit 10. The pump 550 includes an inlet 551 that receives fluid from an inlet line 552 connected to a fluid source 553 (e.g. a spigot or reservoir). The pump 550 also includes an outlet 554 from which an outlet line 556 extends. The frame 545 supports a hose reel 558 that supports a hose 559 that is fluidly coupled to the outlet line 556 and includes a jetter nozzle 560. The hose 559 and jetter nozzle 560 are fluidly coupled with the pump 550 via the outlet line 556, such that the pump 550 pumps fluid from the fluid source 553 to the jetter nozzle 560. The jetter nozzle 560 includes back jets 564 and one or more front jets 568.

In operation, the motor unit 10 drives the pump 550, which supplies water or another fluid from the fluid source 553 to the nozzle 560, such that the back jets 564 of the jetter nozzle 560 propel the jetter nozzle 560 and 559 hose through a plumbing line while front jets 568 of the nozzle 560 are directed forward to break apart clogs in the plumbing line, blasting through sludge, soap, and grease. Once propelled a sufficient distance through the plumbing line, an operator may use the hose reel 558 to retract the hose 559 and jetter nozzle 560 back through the plumbing line, while the pump 550 continues to supply fluid to the back and front jets 564, 568 to break up debris in the line and flush debris therethrough. The jetter 544 including the motor unit 10 possesses advantages over a conventional jetter with an internal combustion engine, some of which are discussed below. For instance, the motor unit 10 can be pulsed to clear a jam in the plumbing line.

In addition, the electronic processor 302 of the motor unit 10 can, for example:

Communicate with fluid level sensors 572 on the pump 550 to detect whether an adequate level of fluid is available;

Communicate with inlet and outlet sensors 573, 574 respectively located at the inlet and outlet lines 552, 556 to prevent the motor unit 10 from being activated until the inlet and outlet lines 552, 556 for the pump 550 are sufficiently bled of air;

adjust pressure or flow rate of the pump 550 with the speed of the motor unit 10 instead of a throttle or regulator; and turn ON/OFF the motor unit 10—and ultimately the pump 550, change a speed of the motor unit 10, change a flow rate of liquid through the pump 550, provide a timer (e.g., automatically turn OFF the motor unit 10), provide a delayed start of the motor unit 10—all of which can occur without direct user input (e.g., via sensors or programs).

Test specifications of the jetter 544 appear in Table 8 below:

TABLE 8

|  | Full Speed |
|---|---|
| Motor Speed (RPM) | 17,773 |
| Average Current (Amperes) | 55.7 |
| Peak Current (95%) (Amperes) | 64 |
| Instantaneous Peak Current (Amperes) | 67 |
| Average Voltage (V) | 65.4 |
| Average Power (HP) | 5.29 |
| Peak Power (95%) (HP) | 6.18 |
| Runtime (Minutes) | 5.7 |
| Peak Jet Pressure (PSI) | 2070 |

The values listed in Table 8 were measured during a full discharge cycle of the battery pack 50 (i.e., full charge to shutoff due to the voltage of the battery pack 50 dropping below a predetermined value).

Figure 30:
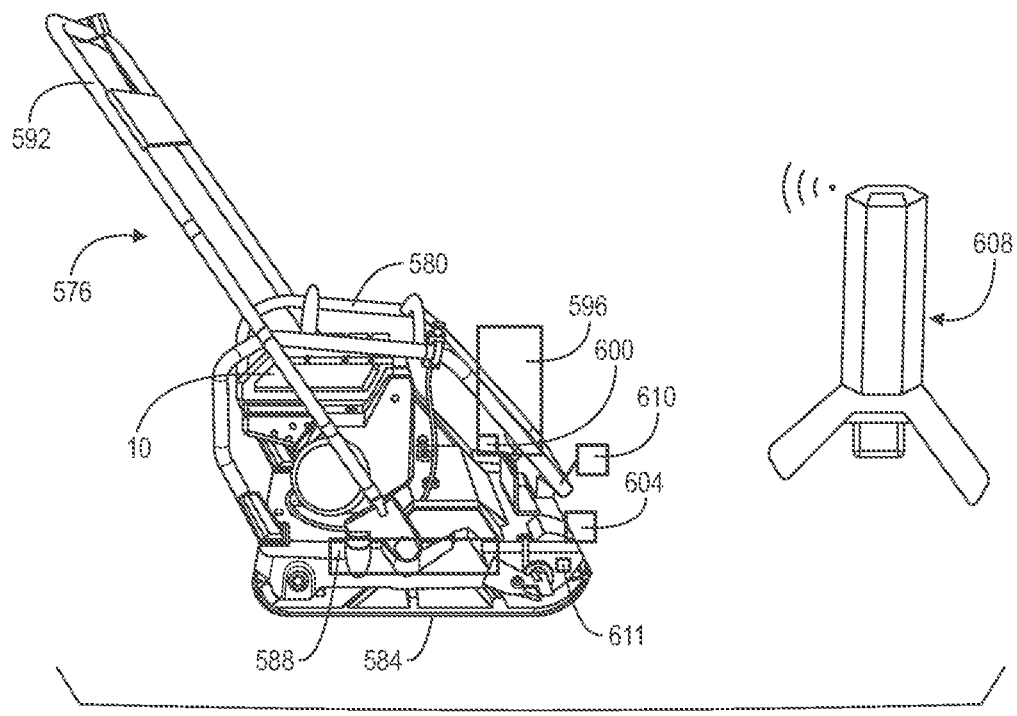
FIG. 30 is a perspective view of a compactor including the stand-alone motor unit of FIG. 42.

FIG. 30 illustrates a compactor 576 including a frame 580 supporting the stand-alone motor unit 10, a vibrating plate 584, and a vibration mechanism 588 intermediate the motor unit 10 and vibrating plate 584, such that the motor unit 10 can drive the vibration mechanism 588 to drive the vibrating plate 584. The frame 580 includes a handle 592 and also supports a water tank 596 with a valve 600 through which water or other liquid can be applied to the surface to be compacted or the vibrating plate 584. In some embodiments, the compactor 576 includes a paint sprayer 604 to spray and demarcate lines or boundaries in and around the compacting operation.

In operation, an operator can grasp the handle 592 and activate the motor unit 10 to drive the vibrating plate 584 to compact soil or asphalt, including granular, mixed materials that are mostly non-cohesive. During operation, the operator may control the valve 600 to allow water from the water tank 596 to be applied to the compacted surface, such that in some applications, the water allows the compacted particles to create a paste and bond together, forming a denser or tighter finished surface. In addition, the water from the water tank 596 prevents asphalt or other material from adhering to the vibrating plate 584 during operation.

The compactor 576 can be used in parking lots and on highway or bridge construction. In particular, the compactor 576 can be used in construction areas next to structures, curbs and abutments. The compactor 576 can also be used for landscaping for subbase and paver compaction. The compactor 576 including the motor unit 10 possesses advantages over a conventional compactor with by an internal combustion engine, some of which are discussed below. For instance, the motor 36 of the motor unit 10 can run forward or reverse, allowing the operator to shift directional bias of the vibration mechanism 588. Thus the vibration mechanism 588 is configured to move or "walk" itself forward or reverse, depending on how the operator has shifted the directional bias of the vibration mechanism 588.

In addition, the electronic processor 302 of the motor unit 10 can, for example:

sense the levelness of compaction, such as the grade or pitch, by communicating with an auxiliary sensor device such as a surveying and grading tool 608;

sense the degree of compactness, such as whether the material being compacted is loose or sufficiently tight, by communicating with an auxiliary or onboard device 610 such as a durometer probe, ultrasound, accelerometer, or gyroscope. However, in other embodiments, the electronic processor 302 can simply monitor the current drawn by the motor 36 to sense the level of compactness;

turn ON/OFF the motor unit 10—and ultimately the vibration mechanism 588, change a speed of the motor unit 10, and output direction and steering of the compactor system 576;

use sensors 611 on the compactor system 576 that are in communication with the electronic processor 302 to detect where a compacted surface dips and in response, control the paint sprayer 604 to mark where more material is needed at the detected dip; and control the valve 600 of the water tank 596 to adjust the flow rate to the vibrating plate or compacted surface.

Test specifications of the compactor 576 appear in Table 9 below:

TABLE 9

|  | Full Speed |
|---|---|
| Motor Speed (RPM) | 19,663 |
| Average Current (Amperes) | 26.4 |
| Peak Current (95%) (Amperes) | 32 |
| Instantaneous Peak Current (Amperes) | 52 |
| Average Voltage (V) | 71.9 |
| Average Power (HP) | 2.55 |
| Peak Power (95%) (HP) | 3.24 |
| Runtime (Minutes) | 12.78 |

The values listed in Table 9 were measured during a full discharge cycle of the battery pack 50 (i.e., full charge to shutoff due to the voltage of the battery pack 50 dropping below a predetermined value).

Figure 31:
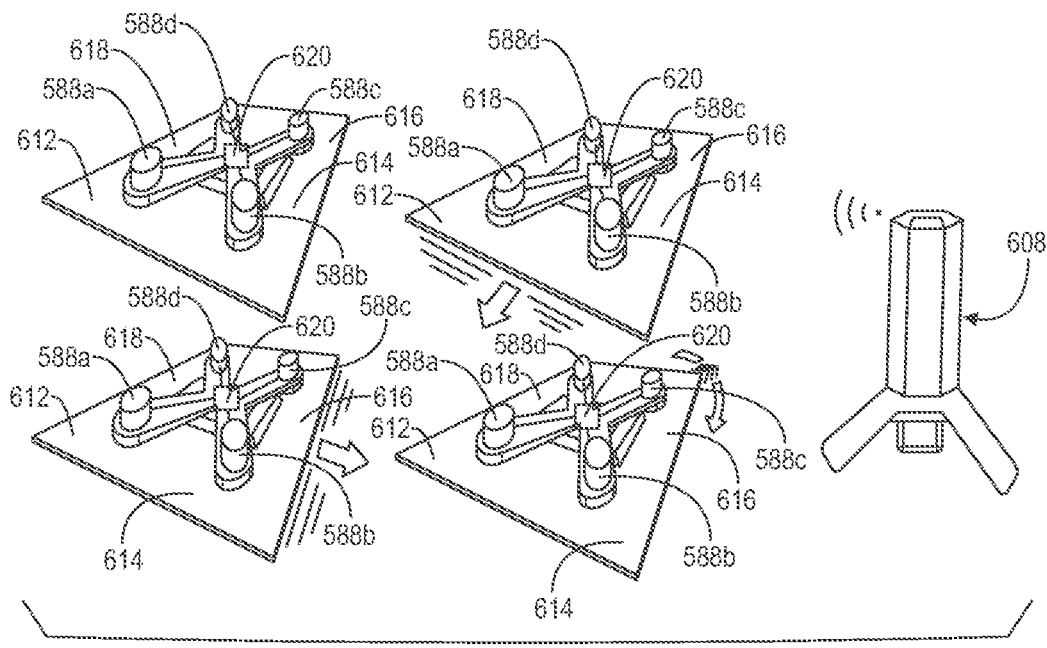
FIG. 31 is a schematic view of a vibration mechanism of the compactor of FIG. 30.

In another embodiment of a compactor 576 shown schematically in FIG. 31, the vibration mechanism 588 is a multi-motor drive system with four separate vibration mechanisms 588a, 588b, 588c, 588d, each having its own motor and each configured to respectively vibrate an individual quadrant 612, 614, 616, 618 of the vibrating plate 584. Each vibration mechanism 588a, 588b, 588c, 588d, is controlled by a controller 620 of the compactor 576. Thus, depending on readings from the auxiliary or onboard sensor devices 608, 610 described above, the controller 620 can select which quadrant 612, 614, 616, 618 requires vibration. In some embodiments, the controller 620 may receive instructions from an operator via, e.g., a remote control. In some embodiments, the controller 620 can control the vibration mechanisms 588a, 588b, 588c, 588d to move the compactor 576 forward or reverse, as well as steer or turn the compactor 576 via the vibration plate 584.

Figure 32:
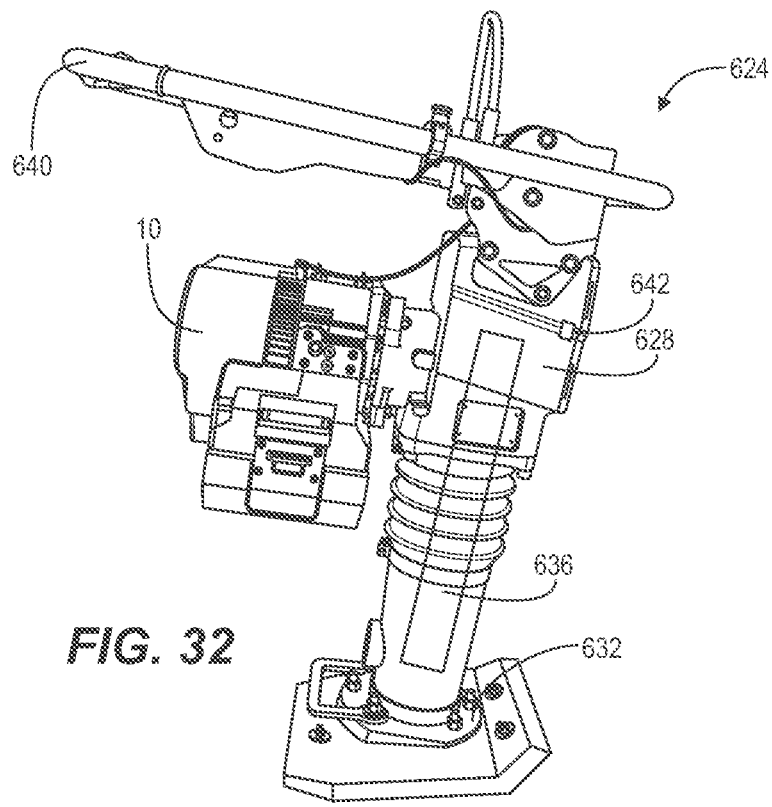
FIG. 32 is a perspective view of a rammer including the stand-alone motor unit of FIG. 42.

FIG. 32 illustrates a rammer 624 including a body 628 supporting the stand-alone motor unit 10, a vibrating plate 632, and a vibration mechanism 636 intermediate the motor unit 10 and vibrating plate 632, such that the motor unit 10 can drive the vibration mechanism 636 to drive the vibrating plate 632. The rammer 624 includes a handle 640 extending from the body 628 to enable an operator to manipulate the rammer 624.

In operation, an operator can grasp the handle 640 and activate the motor unit 10 to drive the vibrating plate 632 to compact cohesive and mixed soils in compact areas, such as trenches, foundations and footings. The rammer 624 including the motor unit 10 possesses advantages over a conventional rammer driven with an internal combustion engine, some of which are discussed below.

For instance, the electronic processor 302 of the motor unit 10 can, for example:
- turn ON/OFF the motor unit 10—and ultimately the vibration mechanism 636, change a speed of the motor unit 10;
- provide a delayed start of the motor unit 10—all of which can occur without direct user input (e.g., via sensors or programs); and
- utilize preset modes for compacting soft, hard, loose, or tight material.

The electronic processor 302 can also input data from sensors 642 on the rammer 624 to detect whether the frequency and/or amplitude of the vibrating plate is within a predetermined range, such that the control electronics 42 can precisely control the speed of the motor unit 10 and adjust the frequency of vibration of the vibration mechanism 636. In this manner, the electronic processor 302 can prevent amplified vibration or resonance and ensure that the rammer 624 is under control when the operator wishes to lower the output speed and reduce the rate of compaction. Also, this ensures that vibration energy is being efficiently transferred into the surface material instead of the operator.

Test specifications of the rammer 624 appear in Table 10 below:

TABLE 10

| | Full Speed |
|---|---|
| Motor Speed (RPM) | 19,863 |
| Average Current (Amperes) | 19.7 |
| Peak Current (95%) (Amperes) | 28 |
| Instantaneous Peak Current (Amperes) | 56 |
| Average Voltage (V) | 72.7 |
| Average Power (HP) | 1.92 |
| Peak Power (95%) (HP) | 2.76 |
| Runtime (Minutes) | 15.73 |

The values listed in Table 10 were measured during a full discharge cycle of the battery pack 50 (i.e., full charge to shutoff due to the voltage of the battery pack 50 dropping below a predetermined value).

Figure 33:
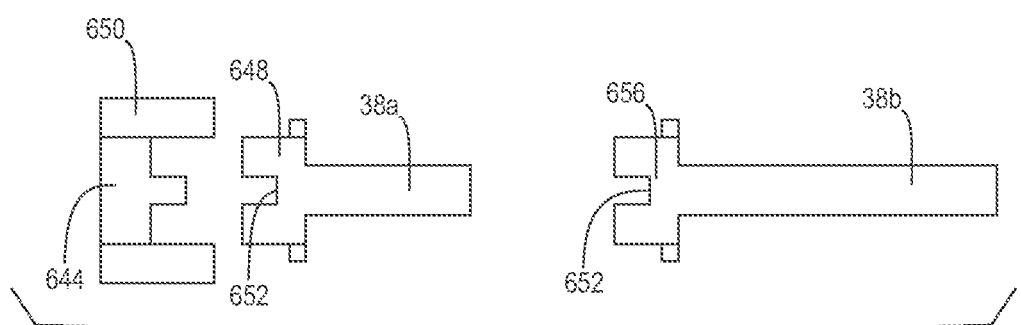
FIG. 33 is a schematic view of coupling arrangement for a gear train of the motor unit of FIG. 42 and a female shaft subassembly.

As shown in FIG. 33, in some embodiments, the gear train 110 of the motor unit 10 includes a terminal male shaft section 644 to which a first female shaft subassembly 648 can mount within a gearbox 650 of the motor unit 10. The first female shaft subassembly 648 includes a first power take-off shaft 38a configured to drive a first tool and a female socket 652 that mates with the male shaft section 644. In the embodiment of FIG. 33, a second female shaft subassembly 656 is provided with the female socket 652 and a second power take-off shaft 38b configured to drive a second tool that is different than the first tool. Thus, the first and second female shaft subassemblies 648, 656 may be conveniently swapped in and out of mating relationship with the male shaft section 644 to allow an operator to quickly and conveniently adapt the motor unit 10 to drive different first and second tools. In contrast, a typical gas engine does not permit such quick or convenient replacement of the power take-off shaft.

Figure 34:
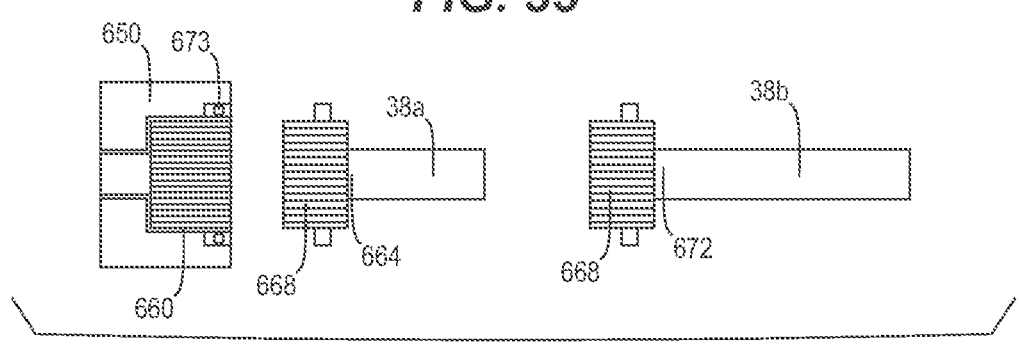
FIG. 34 is a schematic view of coupling arrangement for a gear train of the motor unit of FIG. 42 and a male shaft subassembly.

As shown in FIG. 34, in some embodiments, the gear train 110 of the motor unit 10 includes a terminal female shaft section 660 to which a first male shaft subassembly 664 can mount within the gearbox 650 of the motor unit 10. The first male shaft subassembly 664 includes the first power take-off shaft 38a configured to drive the first tool and a male shaft section 668 that mates with the female shaft section 660. In the embodiment of FIG. 34, a second male shaft subassembly 672 is provided with the male shaft section 668 and the second power take-off shaft 38b configured to drive the second tool. Thus, the first and second male shaft subassemblies 664, 672 may be conveniently swapped in and out of mating relationship with the female shaft section 660 to allow an operator to quickly and conveniently adapt the motor unit 10 to drive different first and second tools. In contrast, a typical gas engine does not permit such quick or convenient replacement of the power take-off shaft. In some embodiments, the male shaft section 668 mates with the female shaft section 660 via a splined connection. In the embodiment illustrated in FIG. 34, the first and second male shaft subassemblies 664, 672 are axially retained to the gearbox 650 via a retaining ring 673 on the gearbox 650.

Figure 35:
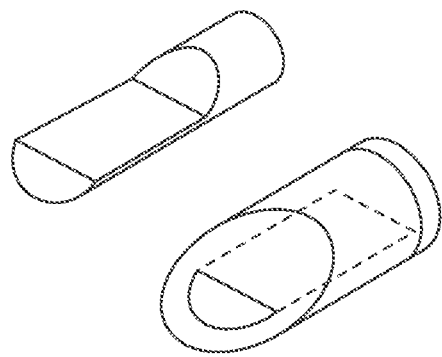
FIG. 35 is a perspective view of a half-circle shaft with female bore coupling arrangement for the coupling mechanism of FIG. 33 or 34.
Figure 36:
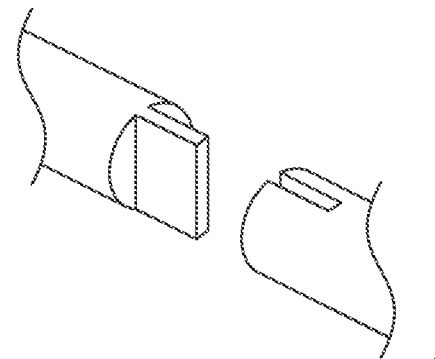
FIG. 36 is a perspective view of a tongue and groove coupling arrangement for the coupling mechanism of FIG. 33 or 34.
Figure 37:
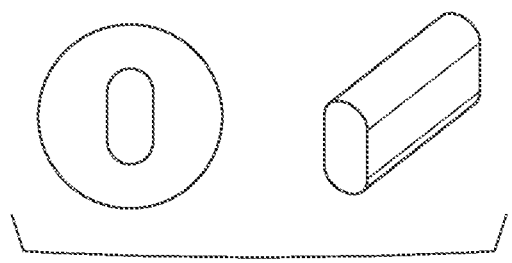
FIG. 37 is a perspective view of a double D coupling arrangement for the coupling mechanism of FIG. 33 or 34.
Figure 38:
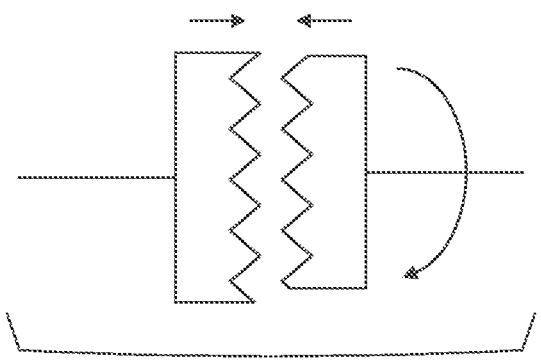
FIG. 38 is a perspective view of a serrated coupling arrangement for the coupling mechanism of FIG. 33 or 34.

In some embodiments, the female socket 652 mates with the male shaft section 644, and the male shaft section 668 mates with the female shaft section 660, via any of the following connection methods: spline-fit (FIG. 34), keyed, half-circle shaft w/ female bore (FIG. 35), tongue & groove (FIG. 36), double "D" (FIG. 37), face ratchet bolted together, Morse taper, internal/external thread, pinned together, flats and set screws, tapered shafts, or serrated connections (FIG. 38).

In some embodiments, different types of power take-off shaft subassemblies 38 may couple to the gear train 110 using a quick-connect structure similar to any of the following applications: modular drill, pneumatic quick connect, socket set-style, ball-detent hex coupling, drill chuck, pins filling gaps around shaft, hole saw arbor. In some embodiments, different types of power take-off shaft subassemblies 38 may couple to the gear train 110 using one of the following coupling structures: Spring coupling, c-clamp style, love joy style, plates w/ male/female pegs (FIG. 39), or female collar with radial fasteners (FIG. 40).

In another embodiment shown in FIG. 41, the geartrain 110 includes a female shaft section 674 with a gear 674a and an elongate bore 675 for receiving a stem 676a of a first male shaft subassembly 676 having the first power take-off shaft 38a. The female shaft section 674 is rotatably supported in the gearbox 650 by first and second bearings 677, 678. Once received in the elongate bore 675, the first male shaft subassembly 676 is axially secured to the female shaft section 674 via a fastener 679 inserted into the stem 676a of the first male shaft subassembly 676a while securing a washer 680 between the fastener 679 and the stem 676a of the first male shaft subassembly 676. Thus, unlike the embodiments of FIGS. 33 and 34, the embodiment of FIG. 41 requires the operator to access a side 681 of the gearbox 650 opposite the faceplate 124 to access the fastener 679. In the embodiment of FIG. 41, a second male shaft subassembly having the second power take-off shaft 38b can be inserted in lieu of the first male shaft subassembly 676 to allow an operator to conveniently adapt the motor unit 10 to drive different first and second tools. In contrast, a typical gas engine does not permit such quick or convenient replacement of the power take-off shaft.

Figure 43:
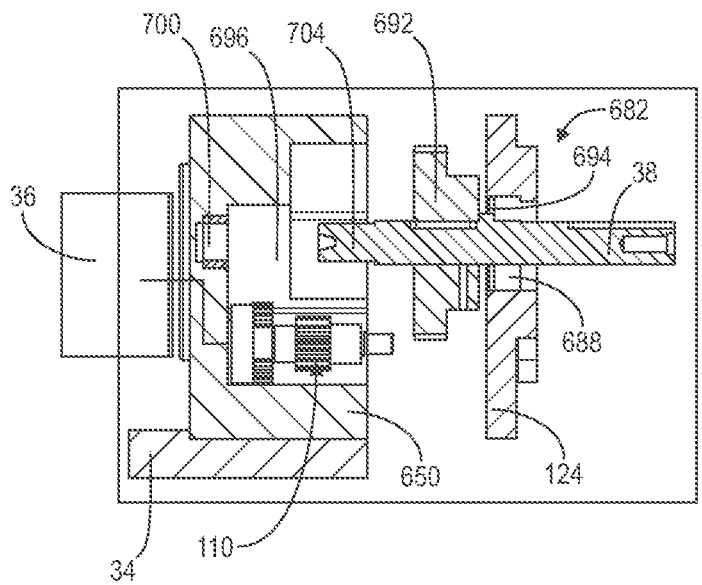
FIG. 43 is a cross-sectional view of a coupling arrangement for a gear train of the motor unit of FIG. 1 and a shaft subassembly.

In an embodiment shown in FIG. 43, a shaft subassembly 682 may be removably coupled to the gearbox 650. Specifically, the shaft subassembly 682 includes the faceplate 124, the power take-off shaft 38 rotatably supported by a first bearing 688 in the faceplate 124, and a first gear 692 arranged on and coupled for rotation with the power take-off shaft 38. In some embodiments, the power take-off shaft 38 is axially constrained with respect to the faceplate 124 with a retaining ring 694. The shaft subassembly 682 is removably received in a recess 696 of the gearbox 650. The recess 696 includes a second bearing 700 for rotatably supporting an end 704 of the power take-off shaft 38 within the recess 696 when the shaft subassembly 682 is received in the recess 696 and coupled to the gearbox 650.

Also, when the shaft subassembly 682 is received in the recess 696 and coupled to the gearbox 650, the faceplate 124 covers the gear train 110 and the first gear 692 is the final drive gear of the gear train 110, such that the gear train 110 can drive the power take-off shaft 38 using a first overall reduction ratio. When the shaft subassembly 682 is removed from the gearbox 650, the first gear 692 can be replaced with a second gear. Using the second gear with the shaft subassembly 682 results in a second overall reduction ratio of the gear train 110. The second overall reduction ratio is different than the first overall reduction ratio, such that an operator can reconfigure the shaft subassembly 682 for driving different tools by swapping between the first gear 692 and the second gear. Also, when the shaft subassembly 682 is removed from the gearbox 650, at least a portion of the gear train 110 is exposed, thus enabling an operator to replace, repair, or access certain gears within the gear train 110.

Figure 44:
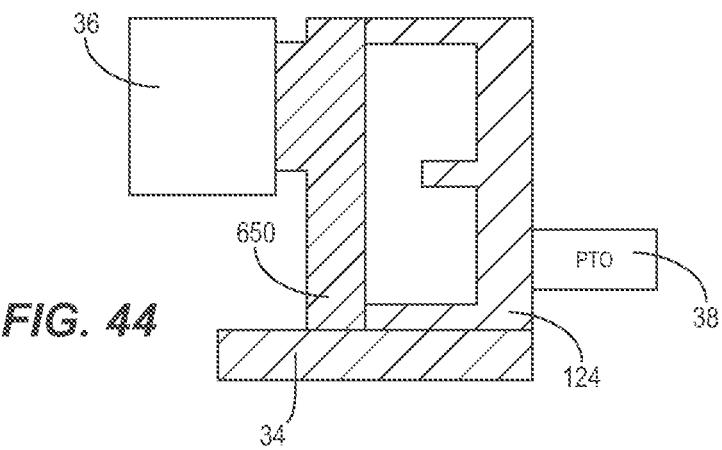
FIG. 44 is a cross-sectional view of a coupling arrangement for a gear train of the motor unit of FIG. 1 and a shaft subassembly.

As shown in FIG. 43, the motor 36 mounts to a portion of the gearbox 650 that has a generally C-shaped cross-section, and the faceplate 124 is part of a shaft subassembly 682 including the power take-off shaft 38, with the faceplate 124 being generally planar. In an alternative embodiment shown in FIG. 44, the geometries are swapped from those of the embodiment of FIG. 43. Specifically, the motor 36 mounts to a portion of the gearbox 650 having a generally planar cross-section and the faceplate 124 has a generally reverse-C-shaped cross-section.

Figure 45:
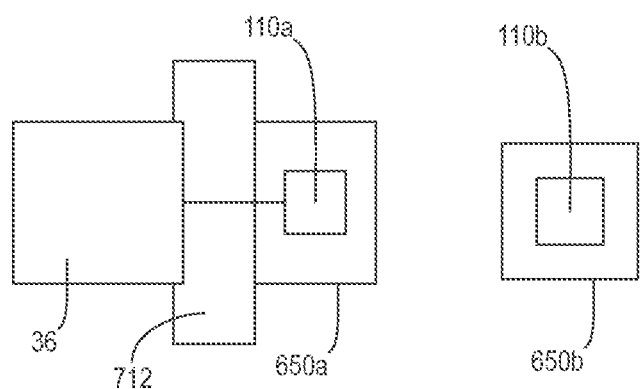
FIG. 45 is a schematic view of a mounting arrangement for a motor and a gearbox of the motor unit of FIG. 42.

As shown in FIG. 45, in some embodiments, a first gearbox 650a with a first gear train 110a is removably attachable to an adapter plate 712 adjacent the motor 36 in the housing 14, such that the output shaft 106 of the motor 36 can drive the first gear train 110a when the first gearbox 650a is attached to the adapter plate 712. A second gearbox 650b with a second gear train 110b that has a different reduction ratio than the first gear train 110a is also removably attachable to the adapter plate 712. Thus, depending on what tool an operator wishes to drive with the motor unit 10, an operator can select either the first or second gearboxes 650a, 650b. In some embodiments, the first and second gearboxes 650a, 650b can attach to the adapter plate 712 via a bayonet connection. In some embodiments, there are a plurality of additional gearboxes respectively having different gear trains than the first and second gear trains 110a, 110b, each of the additional gearboxes being attachable to the adapter plate 712.

Figure 46:
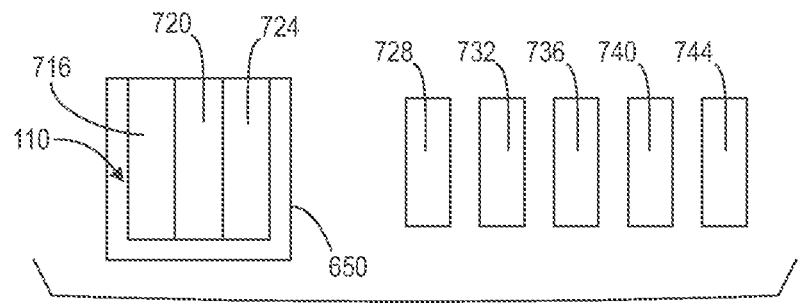
FIG. 46 is a schematic view of a gearbox and geartrain of the motor unit of FIG. 42.

Instead of swappable gearboxes 650a, 650b as in the embodiment of FIG. 45, and instead of embodiments of FIGS. 19 and 43 that allow an operator to change or replace individual gears, in some embodiments the gear train 110 in the gearbox 650 includes a transmission allowing an operator to shift gear sets to change the reduction ratio. In some embodiments, the gear train 110 in the gearbox 650 has a predetermined number of stages that can be arranged in different combinations to produce different outputs. For example, as shown in FIG. 46, the gearbox 650 might include three slots 716, 720, 724 for accepting cartridge-style gear stages 728, 732, 736, 740, 744 (e.g., planetary stages). Thus, depending on the output that an operator desires from the gear train 110, the operator can selectively insert three of the five stages 728, 732, 736, 740, 744 into the three slots 716, 720, 724 in a particular order depending on which tool the operator wishes the motor unit 10 to drive.

Figure 47:
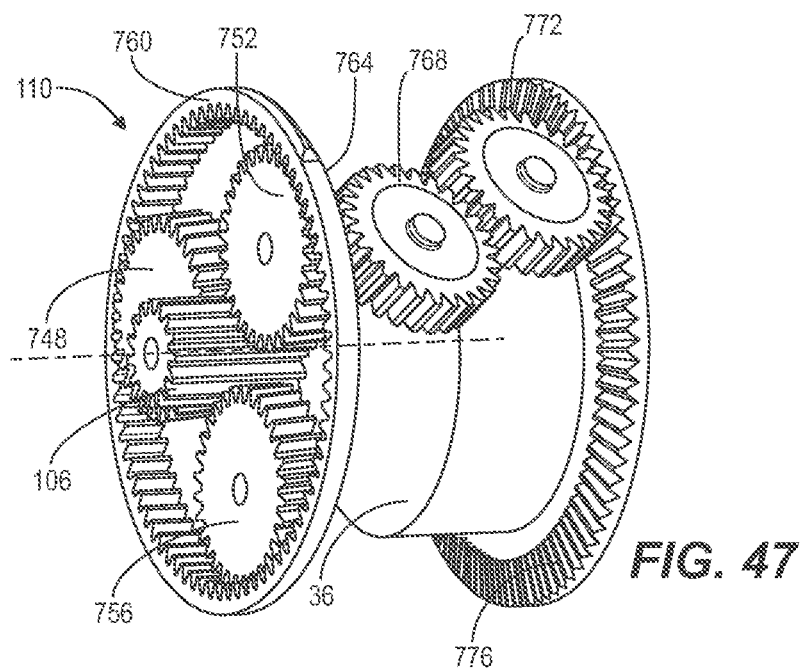
FIG. 47 is a perspective view of an arrangement of a motor and a geartrain of the motor unit of FIG. 42.

As shown in FIG. 47, in some embodiments, the motor 36 is enveloped within the gear train 110 in the gearbox 650. Specifically, the output shaft 106 of the motor 36 acts as a sun gear with three planetary gears 748, 752, 756 between the output shaft 106 and a ring gear 760 that includes a first face gear 764. First and second spur gear 768, 772 are arranged between the first face gear 764 and a second face gear 776.

Figure 48:
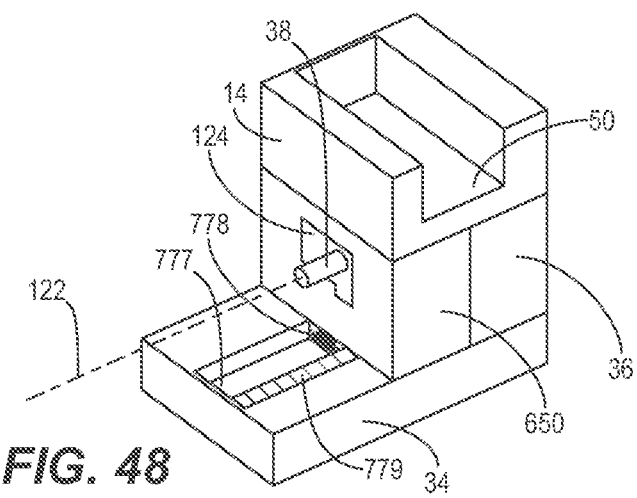
FIG. 48 is a perspective view of a motor unit according to another embodiment of the invention.

As shown in FIG. 48, in some embodiments, the flange 34 is configured to translate all or part of the housing 14 and gearbox 650 with respect to the flange 34 to provide freedom for varying geometries of the power take-off shaft 38. For instance, the flange 34 may include a groove 777 for receipt of a tongue 778 of the housing or gearbox 650 to permit lateral translation. In some embodiments, a locking mechanism 779 may be included to lock the housing 14 at a particular position with respect to the flange 34. The lateral translation of housing 14 with respect to flange 34 permits an operator to slide the housing 14 in a direction away from the tool to which the motor unit 10 is mounted, then service or remove the power take-off shaft 38, without having to decouple the flange 34 from the tool. In some embodiments, the housing 14 can translate with respect to the flange 34 in a direction parallel to, perpendicular to, or both parallel and perpendicular to the rotational axis 122 of the power take-off shaft 38.

Figure 49:
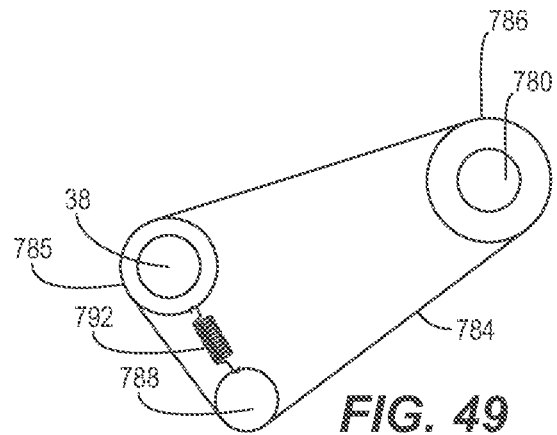
FIG. 49 is a schematic view of a coupling arrangement between a power take-off shaft of the motor unit of FIG. 42 and a tool input shaft.

As shown in FIG. 49, in some embodiments, the power take-off shaft 38 is coupled to an input shaft 780 of a tool via an endless drive member 784 (e.g., a belt or chain) that is coupled to first and second pulleys 785, 786 that are respectively arranged on the power take-off shaft 38 and input shaft 780. In the embodiment of FIG. 49, the motor unit 10 also includes a tensioner 788 with a spring 792 to adjust the tension of the endless drive member 784. In some embodiments, the first pulley 785 can be arranged on the input shaft 780 and the second pulley 786 can be arranged on the power take-off shaft 38 to produce a different gear reduction ratio.

Figure 50:
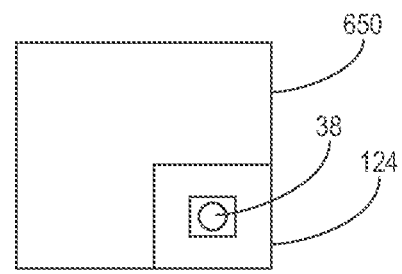
FIG. 50 is a schematic view of a gearbox of the motor unit of FIG. 42.

As shown in FIG. 50, in some embodiments, the gearbox 650 is sectioned to have a quartile faceplate 124 that allows for access to only the power take-off shaft 38.

Figure 51:
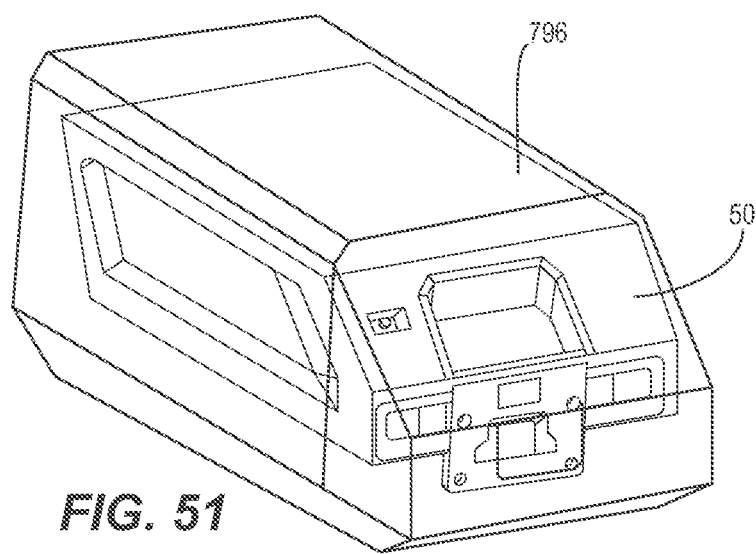
FIG. 51 is a perspective view of the battery of FIG. 4 in a cover.
Figure 52:
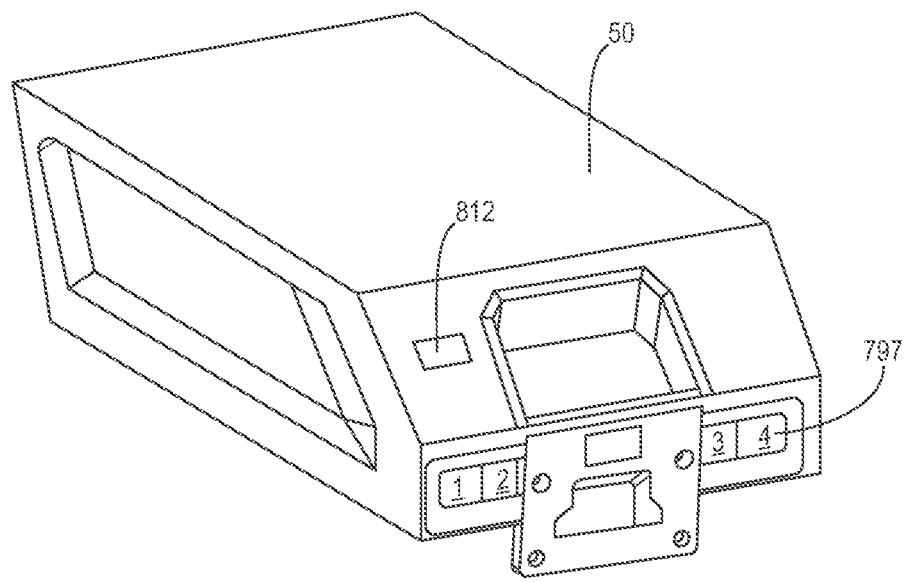
FIG. 52 is a perspective view of a battery for the motor unit of FIG. 42.

As shown in FIG. 51, in some embodiments, the battery 50 can be stored within a cover 796 to protect the electronics from the ingress of water or moisture. In some embodiments, the cover 796 is a hard case cover 796. As shown in FIG. 52, in some embodiments, the battery 50 includes a system lock out apparatus, such as a keypad 797 or a key, which can be utilized to prevent unauthorized individuals from accessing the battery 50, for example, in a scenario in which the battery 50 has been rented along with the motor unit 10.

Because the control electronics 42 of the motor unit 10 don't require intake of ambient air for combustion or exhaust of noxious gases, the control electronics 42 can be fully sealed within a fully sealed waterproof compartment within housing 14. As shown in FIG. 42a, in some embodiments, the housing 14 includes doors 798 that can open and close at various locations on the housing 14 to allow an operator to quickly reconfigure where the air intake and exhaust ports are located for cooling of the motor 36. In some embodiments, the motor unit 10 can operate using AC power from a remote power source, or DC power via the battery 50. Additionally, the motor unit 10 may include an AC power output 799, as a passthrough or inverted to AC power, for connection with an AC power cord of a power tool. In some embodiments, the housing 14 includes inlets 801 (FIG. 42*a*) for pressurized air for cleaning or to supplement a cooling airflow.

In some embodiments, the motor unit 10 can be mated with a new tool (e.g. one of the pump system 520, jetter 544, compactor 576, or rammer 624) and the memory 306 can be reprogrammed to optimize the motor unit 10 for operation with the new tool. In some embodiments, the electronic processor 302 automatically recognizes which type of new tool the motor unit 10 has been mated with, and governs operation of the motor unit 10 accordingly. In some embodiments, the electronic processor 302 can automatically detect with which tool the motor unit 10 has been mated via Radio Frequency Identification (RFID) communication with the new tool. In another embodiment, the tool may be detected with a resistor inserted into a plug connected to the electronic processor 302. For example, a resistor between 10K and 20K ohms would indicate to the electronic processor 302 that the motor unit 10 system was connected to a power trowel or other tool.

In yet another embodiment, the tool may be detected with a multi-position switch (e.g., a 10-position rotary switch). Each position on the switch would correspond with a different type of tool system.

In yet another embodiment, the tool may be detected with a user interface on the motor unit 10 in which a user selects, from a pre-programmed list, the make and model of tool to which the motor unit 10 is attached. The motor unit 10 would then apply the appropriate system controls for the tool.

In some embodiments, the memory 306 is reprogrammable via either BLUETOOTH or Wi-Fi communication protocols. In some embodiments, the electronic processor 302 has control modes for different uses of the same tool. The control modes may be preset or user-programmable, and may be programmed remotely via BLUETOOTH or Wi-Fi. In some embodiments, the electronic processor 302 utilizes master/slave tool-to-tool communication and coordination, such that the motor unit 10 can exert unidirectional control over a tool, or an operator can use a smartphone application to exert unidirectional control over the motor unit 10.

In some embodiments, the operator or original equipment manufacturer (OEM) is allowed limited access to control the speed of the motor unit 10 through the electronic processor 302 via, e.g., a controller area network (CAN)-like interface. In some embodiments, the electronic processor 302 is capable of a wider range of speed selection with a single gear set in the gear train 110 than a gasoline engine. For example, the control electronics 42 are configured to drive the motor 36 at less than 2,000 RPM, which is lower than any speed a gasoline engine is capable of, which permits the associated tool to have a greater overall runtime over a full discharge of the battery 50, than a gasoline engine. Additionally the control electronics 42 are configured to drive the motor at more than 3,600 RPM, which is higher than any speed a gasoline engine is capable of, and with the capability to deliver more torque. The wider range of speeds of motor 36 offers greater efficiency and capability than a gasoline engine. In some embodiments, the operator could have access to control the current drawn by the motor 36 in addition to the speed.

In some embodiments, the electronic processor 302 is configured to log and report data. For example, the electronic processor 302 is configured to provide wired or wireless diagnostics for monitoring and reading the status of the motor unit 10. For example, the electronic processor 302 can monitor and log motor unit 10 runtime for example, in a rental scenario. In some embodiments, the motor 36 and the electronic processor 302 use regenerative braking to charge the battery 50. In some embodiments, the motor unit 10 includes a DC output 803 for lights or accessories (FIG. 42). In some embodiments, the electronic processor 302 can detect anomalies or malfunctions of the motor unit 10 via voltage, current, motion, speed, and/or thermocouples. In some embodiments, the electronic processor 302 can detect unintended use of or stoppage of the motor unit 10. If the tool driven by the motor unit 10 (e.g. one of the pump system 520, jetter 544, compactor 576, or rammer 624) is not running with the intended characteristics or is not being used correctly or safely, the electronic processor 302 can detect the anomaly and deactivate the motor unit 10. For example, the motor unit 10 can include one or more accelerometers to sense if the motor unit 10 and tool is in the intended orientation. And, if the electronic processor 302 determines that the motor unit 10 is not in the intended orientation (i.e. the tool has fallen over), the electronic processor 302 can deactivate the motor unit 10.

In some embodiments, the motor unit 10 includes accessible sensor ports 802 (FIG. 42) to electrically connect with user-selected sensors for use with the piece of power equipment, such as accelerometers, gyroscopes, GPS units, or real time clocks, allowing an operator to customize the variables to be sensed and detected by the electronic processor 302. In some embodiments, the electronic processor 302 can indicate the status of the battery 50, such as when the battery is running low, to an operator via visual, audio, or tactile notifications. In some embodiments, the electronic processor 302 can operate an auxiliary motor that is separate from the motor 36 to drive an auxiliary device such as a winch. The auxiliary motor may be internal or external to the motor unit 10.

Figure 53:
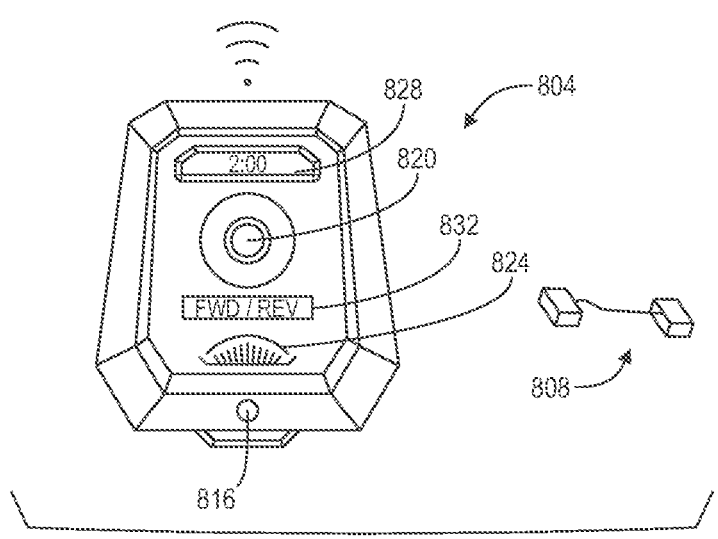
FIG. 53 is a plan view of a remote control for use with the motor unit of FIG. 42.

In some embodiments, the motor unit 10 can include digital controls on a customizable user interface, such as a touch display or a combination of knobs and buttons. In contrast, an analog gasoline engine does not include such digital controls. In some embodiments, the user interface for the motor unit 10 can be modular, wired, or wireless and can be attachable to the motor unit 10 or be hand held. In some embodiments, the motor unit 10 can be controlled with a remote control 804 that includes status indicators for certain characteristics of the motor unit 10, such as charge of the battery 50 and the temperature, as shown in FIG. 53. In some embodiments, the motor unit 10 can provide status indications with a remote, programmable device. In some embodiments, the remote control 804 can include a USB cord 808 that plugs into a USB port 812 on the battery 50 (FIG. 52), or a USB port elsewhere on the motor unit 10, such that the remote control 804 can be charged by the battery 50. In some embodiments the remote control 804 can be charged wirelessly from the battery 50. The remote control 804 can include a variety of controls, such as:

a button 816 to turn the motor unit 10 on or off;
a joystick 820 to steer the tool (e.g., the compactor 576);
a dial 824 to adjust the flow rate of the tool (e.g. the pump system 520 or jetter 544);
a timer 828 for a delayed start or stop of the tool; and
a switch 832 to select forward or reverse directions of the power take-off shaft 38.

The remote control 804 can also control the operating pressure of the tool (e.g. the pump system 520 or jetter 544), or other operating characteristics of the tool.

Figure 54:
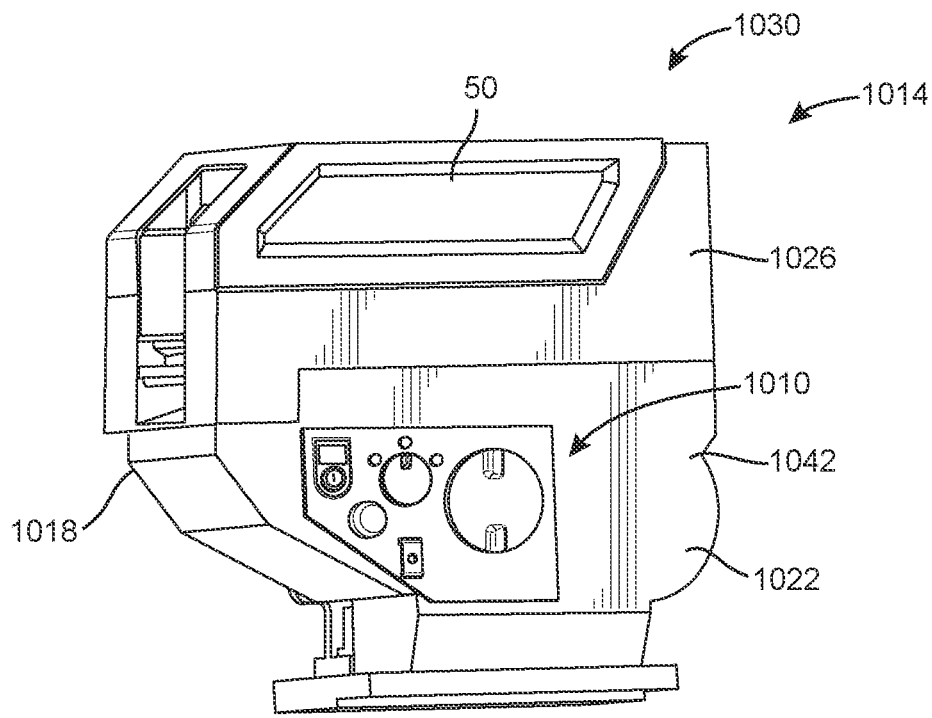
FIG. 54 is a perspective view of a stand-alone motor unit according to another embodiment of the invention.

FIGS. 54-58 illustrate a motor unit 1014 including a universal control panel 1010. The motor unit 1014 is otherwise similar to the motor unit 10 described above and operates in a similar way. As such, like reference numerals plus "1000" will be used for like features of the motor unit 1014. As shown in FIG. 54, the motor unit 1014 includes a housing 1018 that is split in to a base 1022 having a plurality of sides and a battery module 1026 that is removably coupled to the base 1022. The battery module 1026 includes the battery receptacle 1030 for receiving the battery pack 50, as described above. The battery pack 50 is removable from the battery receptacle 1030. In the illustrated embodiment, the control panel 1010 is positioned on one of the sides of the base 1022, and is thus carried onboard the motor unit 1014. In other embodiments, as will be described below, the control panel 1010 may be remotely positioned from the motor unit 1014, yet connected to the motor unit 1014 (e.g., via electrical wiring, a wiring harness, or a wireless communication protocol). In further embodiments, the control panel 1010 may be coupled to the battery module 1026 or supported elsewhere on the motor unit 1014.

Figure 55:
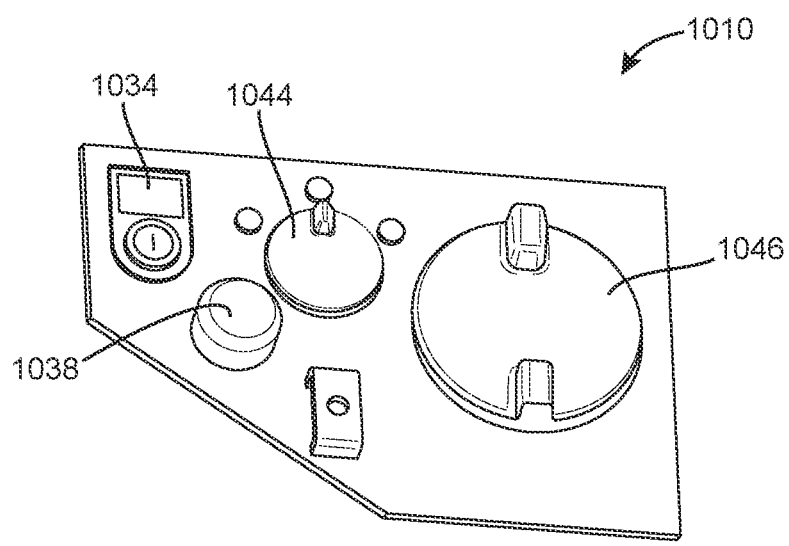
FIG. 55 is a perspective view of a universal control panel to be used with the stand-alone motor unit of FIG. 54.

With reference to FIG. 55, the universal control panel 1010 includes a plurality of user inputs. For example, the illustrated control panel 1010 includes an arming or power button 1034, an emergency stop button 1038, a mode selector 1044, and a throttle actuator or dial 1046. As explained in further detail below, each of the abovementioned user inputs is manipulatable by an operator to control operation of the motor unit 1014. In some embodiments, each of the user inputs on the control panel 1010 is in electrical communication with the motor 36 (or, more particularly, the control electronics 1042) via electrical wiring or a wiring harness. Alternatively, in other embodiments, the control panel 1010 may include an onboard wireless transceiver (not shown) with which the individual user inputs are in communication that communicates with a corresponding wireless transceiver (also not shown) in communication with the control electronics 1042.

The power button 1034 is operable to arm or enable activation of the motor 36. When the power button 1034 is depressed, a signal is provided to the control electronics 1042 that the motor unit 1014 is ready to receive a throttle input to initiate rotation of the power take-off shaft 38. The emergency stop button 1038 is operable to provide a signal to the control electronics 1042 to immediately deactivate the motor 36 if active, for example, in case a user loses control of the power equipment in which the motor unit 1014 is incorporated. The mode selector 1044 is operable to change the operational mode of the motor unit 1014. For example, the motor 36 may be operable in a first mode where the motor 36 runs the power take-off shaft 38 at a one horsepower setting or in a second mode where the motor 36 runs the power take-off shaft 38 at a five horsepower setting. A user may toggle between the first and second modes by actuating the mode selector 1044. In further embodiments, the mode selector 1044 may be capable of toggling between a range of modes where the motor 36 runs between one horsepower and five horsepower (e.g., two horsepower, three horsepower, four horsepower, etc.). Alternatively, the motor unit 1014 may be operable between a first, dynamic mode and a second, on/off mode. For example, in a dynamic mode, the motor 36 may vary the power delivered to the power take-off shaft 38 (and thus the rotational speed of the shaft 38), and in an on/off mode the motor 36 may only be toggled between an activated state where the motor 36 operates at a predetermined power and/or speed setting, and a deactivated state, where the motor 36 is inactive and thus power is not provided to the power take-off shaft 38. The mode selector 1044 allows a user to toggle between the modes discussed above. Alternatively, the mode selector 1044 may be inaccessible by the user, and the original equipment manufacturer of the power equipment in which the motor unit 1014 is incorporated may pre-program a particular operational mode in which the motor unit 1014 is operable.

The throttle dial 1046 is operable to vary the power drawn from the battery pack 50 by the motor 36 to rotate the power take-off shaft 38. The throttle dial 1046 is rotatably supported on the control panel 1010. As such, the throttle dial 1046 may rotate in a first direction (e.g., clockwise) to increase the power the motor 36 draws from the battery pack 50 to rotate the power take-off shaft 38 at higher rotational speeds. Conversely, the throttle dial 1046 may rotate in a second direction opposite the first direction (e.g., counter-clockwise) to decrease the power the motor 36 draws from the battery pack 50 to rotate the power take-off shaft 38 at lower rotational speeds. Alternatively, as will be discussed in more detail below, the throttle dial 1046 may be rotated to control other features or modes of the motor unit 1014. In some embodiments, the throttle dial 1046 may be biased towards a specific direction (e.g., clockwise or counter-clockwise), or towards a neutral position.

As shown in FIG. 54, in some embodiments, the control panel 1010 is carried onboard the motor unit 1014. In this manner, the user may arm the motor unit 1014 by actuating the power button 1034, disable the motor unit 1014 by actuating the emergency stop button 1038, change operating modes of the unit 1014, and/or adjust the throttle dial 1046 (and therefore the rotational speed of the shaft 38) by directly accessing the motor unit 1014 while mounted on the power equipment. In other words, the control panel 1010 is accessible to the user when the motor unit 1014 is mounted to the power equipment such that access to any of the user inputs isn't impeded by the other components of the power equipment. However, in some embodiments (such as that shown in FIG. 58 and described below), a remote actuator may be used with the throttle dial 1046 to remotely control the rotational speed of the shaft 38.

Figure 56:
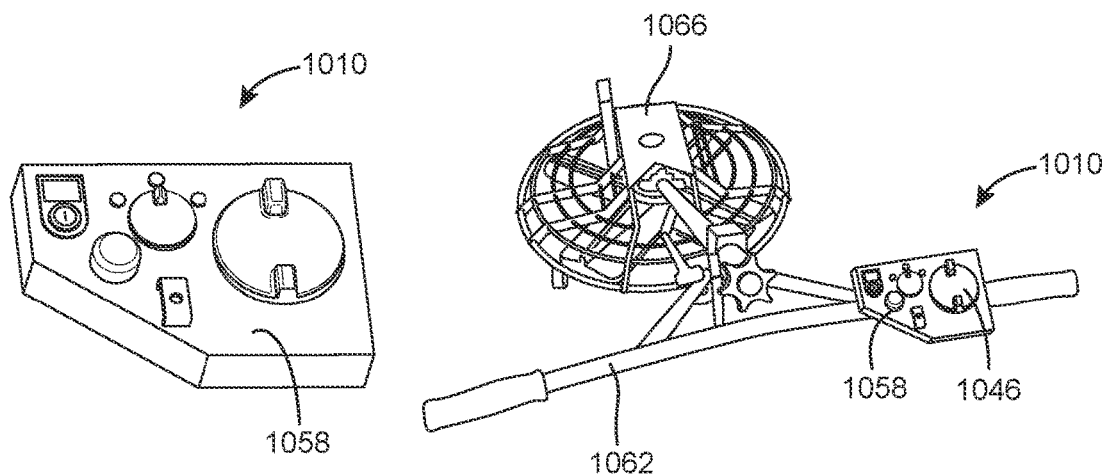
FIG. 56 is a perspective view of the universal control panel supported by a piece of power equipment.

As shown in FIG. 56, the control panel 1010 may be directly supported upon the piece of power equipment with which the motor unit 1014 is incorporated. For example, as shown in FIG. 56, the control panel 1010 is integrated with a housing 1058 which, in turn, is mounted to a handle 1062 of a piece of power equipment 1066. In the illustrated embodiment, the control panel 1010 is electrically connected to the control electronics 1042 of the motor unit 1014 using electrical wires or a wiring harness spanning between the control panel 1010 and the motor unit 1014. As such, a user may provide input to any of the user inputs to control the (remotely located) motor unit 1014. In other embodiments, the control panel 1010 may be mounted on the handle 1062 of the piece of power equipment 1066 and wirelessly communicate with the control electronics 1042 to control the motor unit 1014. In further embodiments, the control panel 1010 may be mounted elsewhere besides the handle 1062 of the piece of power equipment 1066 so long as it's readily accessible by the user. In the illustrated embodiment of FIG. 56, the control panel 1010 is coupled to a power trowel 1066. Remote mounting the control panel 1010 on the handle 1062 gives a user easy access to the throttle dial 1046 so a user can continually adjust the power provided by the motor 36 to the take-off shaft 38 while finishing concrete. Remote mounting may also position the emergency stop button 1038 near a user's hands during operation, increasing safety if the user were to lose control of the power trowel 1066.

Figure 57:
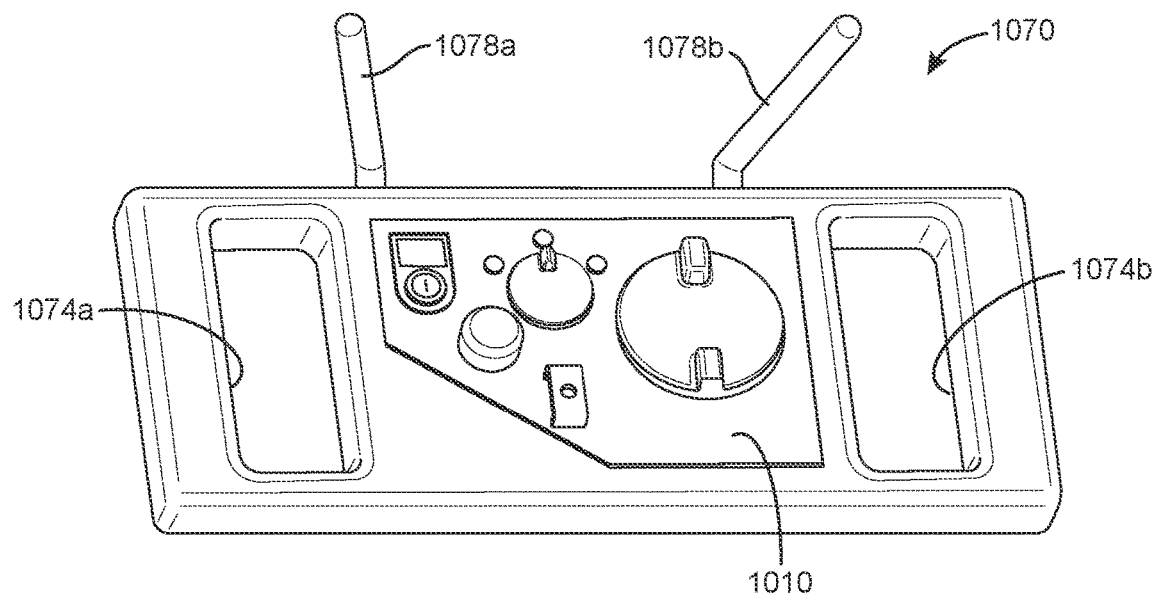
FIG. 57 is a perspective view of the universal control panel supported by a wireless remote control.

FIG. 57 illustrates a wireless remote control 1070 including the control panel 1010. The wireless remote control 1070 includes a wireless transceiver that may communicate with a corresponding wireless transceiver in the motor unit 1014. The user inputs on the wireless remote control 1070 are operable to control the motor unit 1014 as described above. As such, a user may control the motor unit 1014 remotely. The wireless remote control 1070 further defines two grips 1074a, 1074b (e.g., one for each of a user's hands) for a user to hold the wireless remote control 1070. The wireless remote control 1070 may also include antennas 1078a, 1078b so that a user may operate the motor unit 1014 from further distances. Providing a wireless remote control 1070 with the control panel 1010 is advantageous for applications where the motor unit 1014 is incorporated in, for example, a water pump. A user may wish to control the water pump inlet/outlet location while still being able to start or stop the pump from a distance away from the pump.

Figure 58:
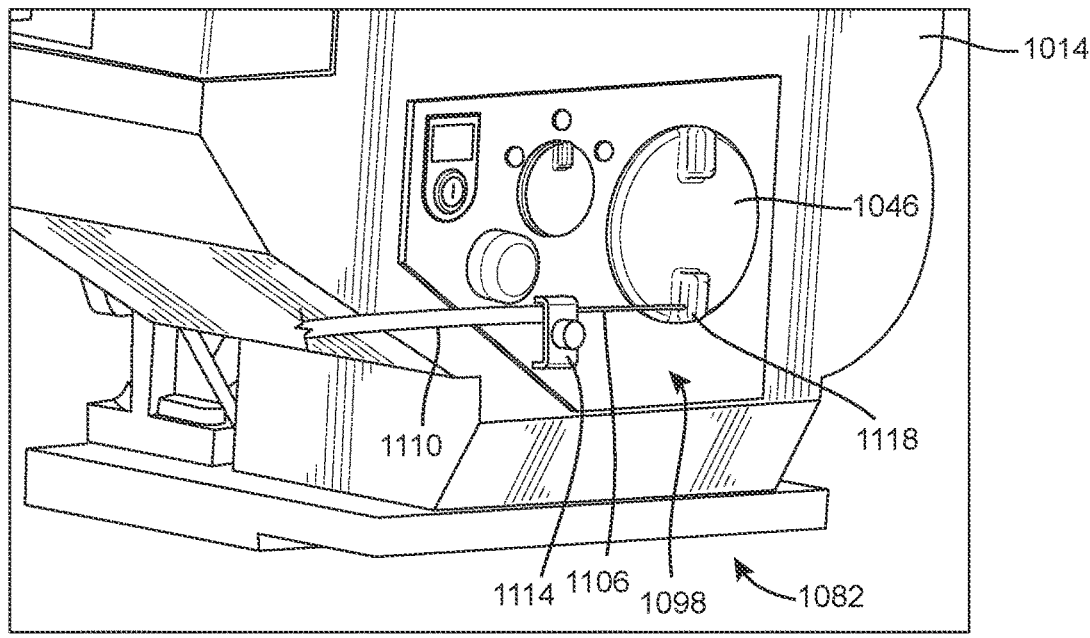
FIG. 58 is a perspective view of a portion of a remote throttle system for use with the universal control panel.
Figure 59:
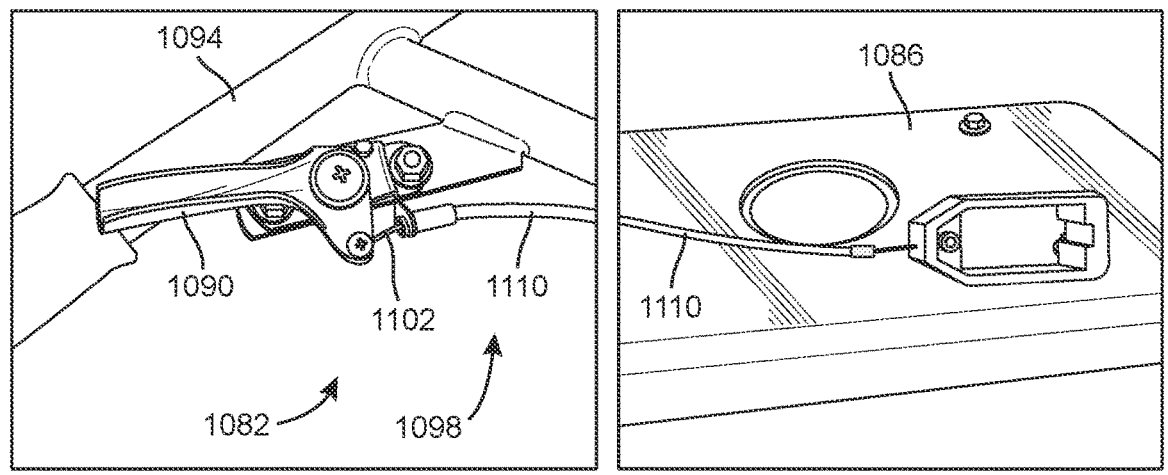
FIG. 59 is a perspective view of another portion of the remote throttle system of FIG. 58.

As shown in FIGS. 58 and 59, in some embodiments, the control panel 1010 may be carried onboard the motor unit 1014, and the motor unit 1014 may include a remote throttle system 1082 for controlling the motor unit 1014. For example, the motor unit 1014 may be supported by a piece of power equipment 1086 that includes a throttle lever 1090 that is pivotably coupled to a handle 1094. The remote throttle system 1082 includes the throttle lever 1090 and a throttle cable 1098 having a first end 1102 (FIG. 59) that is coupled to the throttle lever 1090 and a second end 1106 (FIG. 58) that is coupled to the throttle dial 1046 on the control panel 1010. The throttle cable 1098 is positioned within a cable sleeve 1110 that extends between the first and second ends 1102, 1106 of the throttle cable 1098 to protect the throttle cable 1098. The throttle cable 1098 is axially moveable within the cable sleeve 1110 in response to tension developed in the cable 1098. As shown in FIG. 58, the cable sleeve 1110 is secured to the control panel 1010 by a cable clamp 1114. The cable clamp 1114 holds the cable sleeve 1110 in place so that the throttle cable 1098 is allowed to move relative to the cable sleeve 1110. The second end 1106 of the throttle cable 1098 is secured to a portion 1118 of the throttle dial 1046 that is offset from the rotational axis of the throttle dial 1046.

During operation of the motor unit 1014, a user may pivot the throttle lever 1090 towards the handle 1094 of the piece of power equipment 1086. Pivoting the throttle lever 1090 progressively pulls the throttle cable 1098 to rotate the throttle dial 1046. Rotation of the throttle dial 1046 (assuming the power button 1034 has already been depressed to arm the motor unit 1014) activates the motor 36 to rotate the power take-off shaft 38. A user may then either release the throttle lever 1090 or move the throttle lever 1090 away from the handle, allowing the throttle cable 1098 to slacken and return the throttle dial 1046 back to a neutral position where the throttle dial 1046 does not provide a throttle input to the motor 36 (to thereby deactivate the motor 36 or return the motor to a predetermined "idle" state).

Figure 60:
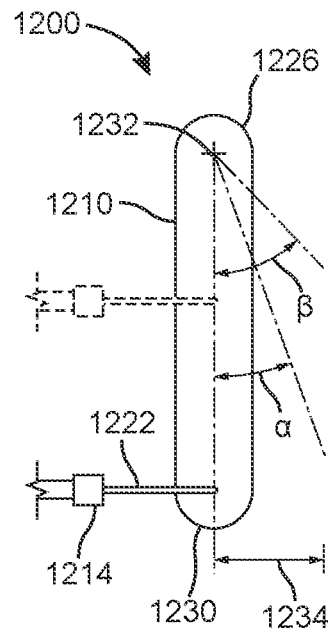
FIG. 60 is a schematic view of a remote throttle system according to another embodiment of the invention.

FIG. 60 illustrates a remote throttle system 1200 according to another embodiment of the invention. The remote throttle system 1200 includes a throttle lever 1210 integrated with a control panel, like the control panel 1010, and an actuator (e.g., a throttle cable 1214). The throttle lever 1210 is otherwise functionally identical to the throttle dial 1046 described above and may take the place of the throttle dial 1046 on the control panel 1010. The throttle cable 1214 may include a first end coupled to a throttle handle that is remotely positioned from the motor unit 1014 and a second end 1222 that is coupled to the throttle lever 1210.

With continued reference to FIG. 60, the throttle lever 1210 includes a first end 1226 and a second end 1230 opposite the first end 1226. The first end 1226 is rotationally coupled to the motor unit 1014 about a pivot 1232. Rotation of the throttle lever 1210 about the pivot 1232 controls operation of the motor 36. For example, the throttle lever 1210 can be moved in a first direction (e.g., clockwise) to rotate the power take-off shaft 38. The throttle lever 1210 may be biased in an opposite, second direction (e.g., counter-clockwise) to return the throttle lever 1210 to a neutral position coinciding with deactivation of the motor 36. The throttle cable 1214 is coupled to the throttle lever 1210 adjacent the second end 1230 of the throttle lever 1210. The throttle cable 1214 may be pulled by a user (e.g., by a throttle handle) to rotate the throttle lever 1210 in the first direction against the bias to activate the motor 36.

The position where the throttle cable 1214 may be coupled to the throttle lever 1210 may be adjustable to change the sensitivity a user experiences when actuating the throttle lever 1210. In other words, the angular distance through which the throttle lever 1210 rotates in response to pivoting movement of a throttle handle can be varied depending upon the distance between the pivot 1232 and the attachment point of the throttle cable 1214 to the lever 1210. For example, as shown in dotted lines in FIG. 60, the throttle cable 1214 may be coupled to a central location of the throttle lever 1210. Therefore, for a constant length of throttle cable 1214 pulled in response to actuation of the throttle handle, the angular distance (I) traveled by the throttle lever 1210 is larger than the angular distance (a) traveled by the throttle lever 1210 when the throttle cable 1214 is coupled to the second end 1230 of the throttle lever 1210. This adjustment changes the sensitivity a user feels when pulling the throttle cable 1214 to activate and adjust the rotational speed of the motor 36.

Figure 61:
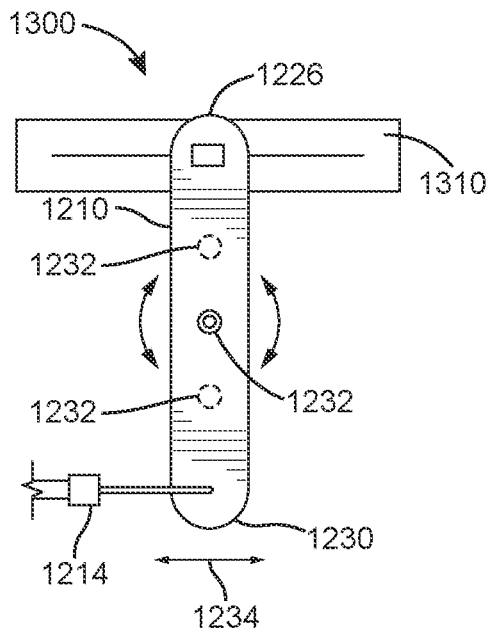
FIG. 61 is a schematic view of a remote throttle system according to another embodiment of the invention.

FIG. 61 illustrates a remote throttle system 1300 according to another embodiment of the invention. The remote throttle system 1300 is similar to the remote throttle system 1200 discussed above with like features being represented with like reference numbers. The remote throttle system 1300 is also adjustable to change the sensitivity a user feels when pulling the throttle cable 1214 to activate the motor 36. However, the throttle cable 1214 remains positioned adjacent the second end of the throttle lever 1210. Instead, the position of the pivot 1232 is adjustable. In the illustrated embodiment, the first end 1226 of the throttle lever 1210 interacts with a sensor (e.g., a linear potentiometer 1310). The potentiometer 1310 communicates with the motor unit 1014 to control operation of the motor 36. As such, movement of the first end 1226 of the throttle lever 1210 controls operation of the motor unit 1014. In some embodiments, an angular distance the first end 1226 of the throttle lever 1210 travels relative to the potentiometer 1310 varies the power output of the motor 36. For example, the pivot 1232 may be positioned closer to the first end 1226, closer to the second end 1230, or exactly between the first and second ends 1226, 1230. As the position of the pivot 1232 approaches the second end 1230 of the throttle lever 1210, the arc length traced by the first end 1226 of the throttle lever 1210 will become greater than that traced by the second end 1230 of the lever 1210 in response to actuation of the throttle handle. As such, the first end 1226 of the throttle lever 1210 travels a greater arc length, or angular distance, over the potentiometer 1310 as the distance between the pivot 1232 and the second end 1230 is decreased. The less angular distance the first end 1226 of the throttle lever 1210 travels the more sensitive the throttle cable 1214 becomes.

Figure 62:
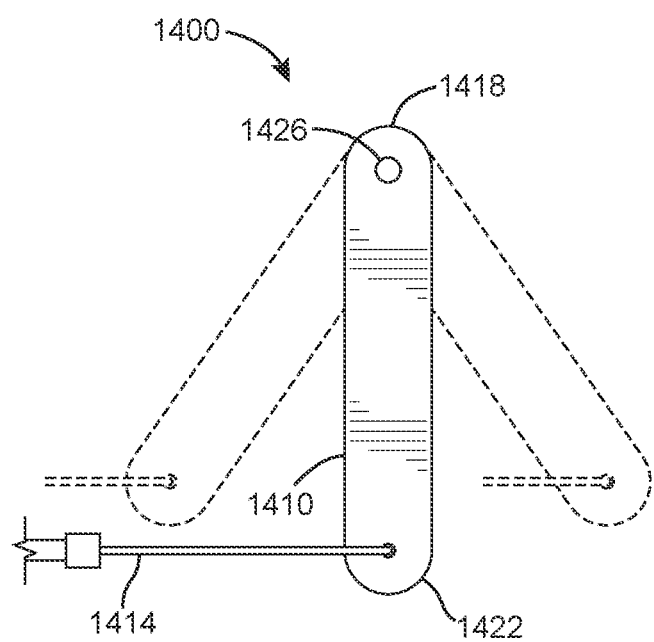
FIG. 62 is a schematic view of a remote throttle system according to another embodiment of the invention.

FIG. 62 illustrates a remote throttle system 1400 according to another embodiment of the invention. The remote throttle system 1400 is similar to the remote throttle system 1200 discussed above and includes a throttle lever 1410 and a throttle cable 1414. The throttle lever 1410 includes a first end 1418 and an opposite, second end 1422. The throttle lever 1410 is rotatable about a pivot 1426 located proximate the first end 1418, and is rotatable about the pivot 1426 in both a clockwise and counter-clockwise direction relative to a neutral position (shown in solid in FIG. 62). The throttle cable 1414 is coupled to the second end 1422 of the throttle lever 1410. The throttle cable 1414 may be actuated by a user to rotate the throttle lever 1410 and control the motor 36 of the motor unit 1014. In some embodiments, the throttle lever 1410 may have a stiff push/pull capability. In other words, rotation of the throttle lever 1410 is stiff and requires more force to move.

In the illustrated embodiment, the throttle lever 1410 is movable between a plurality of positions, as shown in dotted lines in FIG. 62. For example, the throttle lever 1410 may be moveable between a first position, in which the motor 36 is in a first mode, a second position, in which the motor 36 is in a second mode, and a third position, in which the motor 36 is in a third mode. Described below are various modes the motor 36 may be operable in response to which of the first, second, and third positions the throttle lever 1410 is located.

In one embodiment, the throttle lever 1410 may start in a first neutral position where the motor 36 is in an off mode. The throttle lever 1410 may then be rotated about the pivot 1426 in a first direction to a second position to operate the motor 36 in a forward mode where the motor 36 rotates the power take-off shaft 38 in a forward (e.g., clockwise) direction (at progressively increasing speeds with continued rotation of the lever 1410 in the first direction). Also, starting from the first neutral position, the throttle lever 1410 may be rotated about the pivot 1426 in a second, opposite direction to a third position to put the motor 36 in a reverse mode where the motor 36 rotates the power take-off shaft 38 in a reverse (e.g., counter-clockwise) direction (at progressively increasing speeds with continued rotation of the lever 1410 in the second direction). Alternatively, the throttle lever may be rotated further in the first direction from the second position to a fourth position to put the motor 36 in the reverse mode.

In another embodiment, the throttle lever 1410 may start in a first neutral position where the motor 36 is in an off mode. The throttle lever may then be rotated about the pivot 1426 in a first direction to a second position to put the motor 36 in a maximum speed mode where the motor 36 rotates the power take-off shaft 38 at a maximum speed. Also, starting from the first neutral position, the throttle lever 1410 may be rotated in a second, opposite direction to a third position to put the motor 36 in a low speed mode where the motor 36 rotates the power take-off shaft 38 at a speed that is lower than the maximum speed. In some embodiments, the motor 36 may rotate the power take-off shaft 38 at five horsepower in the max speed mode and at one horsepower in the low speed mode.

In another embodiment, the throttle lever 1410 may be rotated in a first direction to a first position, in which the motor 36 uses a first gear set to rotate the power take-off shaft 38. The throttle lever 1410 may then be rotated about the pivot 1426 in a second direction opposite the first direction to a second position, in which the motor 36 uses a second gear set to rotate the power take-off shaft 38. In further embodiments, the throttle lever 1410 may be rotated further in the first direction to change gear sets.

Figure 63:
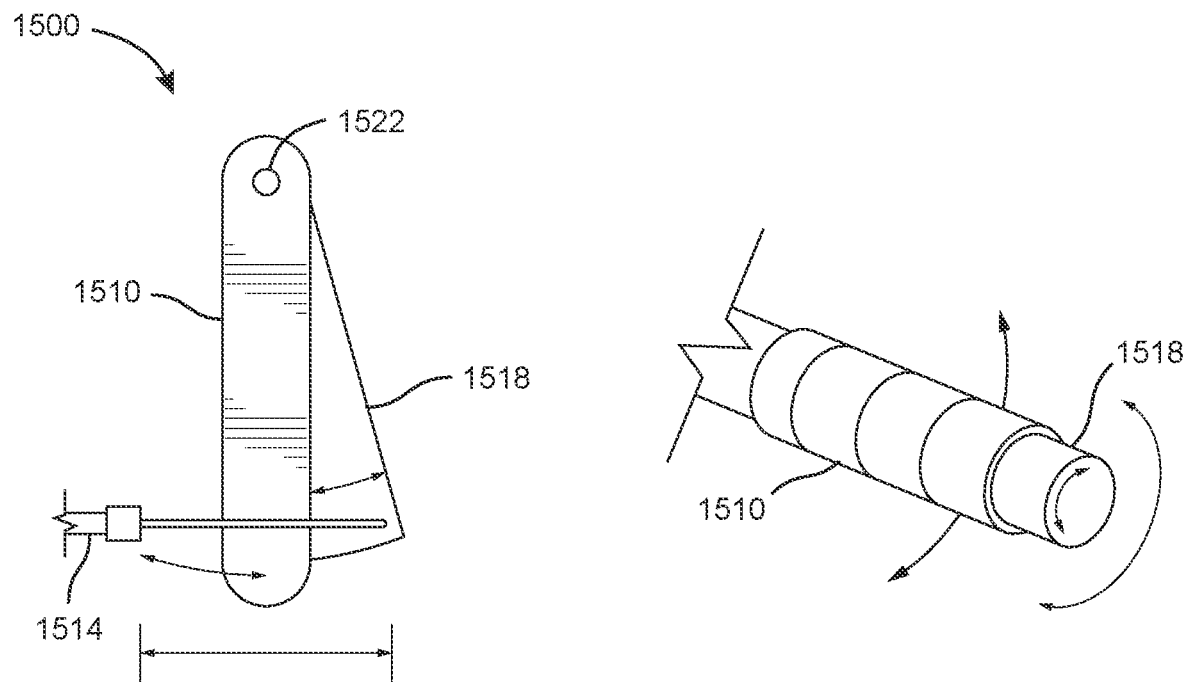
FIG. 63 is a schematic view of a remote throttle system according to another embodiment of the invention.

FIG. 63 illustrates a remote throttle system 1500 according to another embodiment of the invention. The remote throttle system 1500 includes a throttle lever 1510, a throttle cable 1514, and a switch 1518. The throttle lever 1510 is rotatable about a pivot 1522. The switch 1518 is coupled to the throttle lever 1510 about the pivot 1522. However, the switch 1518 is rotatable relative to the throttle lever 1510. As such, the switch 1518 may be biased away from the throttle lever 1510. In the illustrated embodiment, the throttle cable 1514 is coupled to an end of the switch 1518. The throttle cable 1514 is operable to rotate the switch 1518 towards the throttle lever 1510 to activate the switch 1518. Once the switch 1518 activates and contacts the throttle lever 1510, the throttle cable 1514 is operable to rotate both the switch 1518 and the throttle lever 1510 together about the pivot 1522. In another embodiment, the throttle lever 1510 and switch 1518 may be rotated by a user's hand, without an intermediate actuator or cable.

The switch 1518 may be electrically connected to the control electronics 42. The switch 1518 is operable to control a feature of the motor unit 1014 when activated. For example, the switch 1518 may be a safety switch that disables the motor 36 from operating until the switch 1518 is activated. As such, the switch 1518 must first be rotated towards the throttle lever 1510 to activate the switch 1518 (and therefore the motor 36) before the throttle lever 1510 may control the rotational speed and/or direction of the motor 36.

In another example, the switch 1518 may activate a light when rotated towards the throttle lever 1510. The light may illuminate an area in front of a piece of power equipment that supports the motor unit 1014. Activation of the switch 1518 would illuminate the area prior to the throttle lever 1510 activating the motor 36 so a user would be able to see the area where the piece of power equipment will be used. In further embodiments, the switch 1518 may activate or control other features not discussed herein of the motor unit 1014. For example, the switch 1518 could act as an on/off switch for a variety of features.

Figure 64:
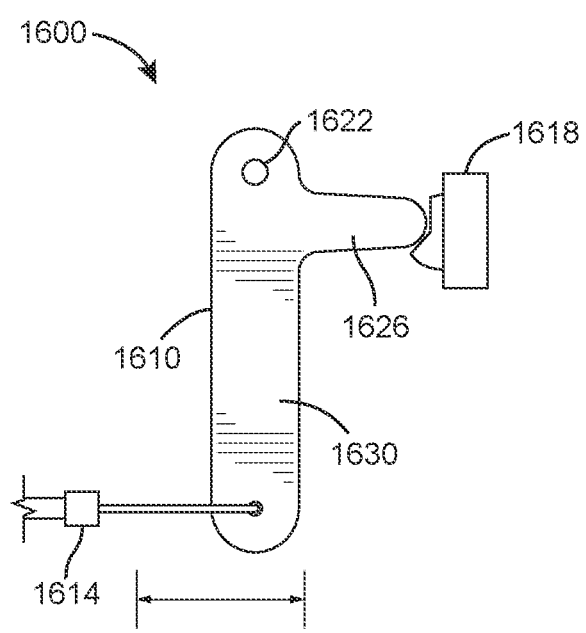
FIG. 64 is a schematic view of a remote throttle system according to another embodiment of the invention.

FIG. 64 illustrates a remote throttle system 1600 according to another embodiment of the invention. The remote throttle system 1600 includes a throttle lever 1610, a throttle cable 1614, and a switch 1618. The throttle lever 1610 is rotatable about a pivot 1622 and includes an extension 1626 extending from a body 1630. The throttle cable 1614 is coupled to the throttle lever 1610 to rotate the throttle lever 1610 about the pivot 1622. The switch 1618 is positioned adjacent the extension 1626 so that rotation of the throttle lever 1610 by the throttle cable 1614 activates the switch 1618 with the extension 1626.

As shown in FIG. 64, with the throttle lever 1610 in a neutral position, a user then actuates the throttle cable 1614 to rotate the throttle lever 1610 about the pivot 1622 in a clockwise direction. As the throttle lever 1610 rotates, the extension 1626 engages the switch 1618 to activate the switch 1618. Then, in sequence, continued pivoting movement of the throttle lever 1610 in a clockwise direction will increase the rotational speed of the motor 36 and the power take-off shaft 38. In some embodiments, the throttle lever 1610 is biased to rotate about the pivot 1622 in a counter-clockwise direction. As such, when the throttle lever 1610 is released by the throttle cable 1614, the throttle lever 1610 returns to the neutral position. As the throttle lever 1610 returns to the neutral position, the extension 1626 may engage the switch 1618 again to deactivate the switch 1618. In further embodiments, the switch 1618 may be remotely deactivated by a user.

The switch 1618 is similar to the switch 1518 described above and may activate similar features of the motor unit 1014 as those described above. In some embodiments, the switch 1618 may be an emergency stop switch to deactivate the motor 36.

Figure 65:
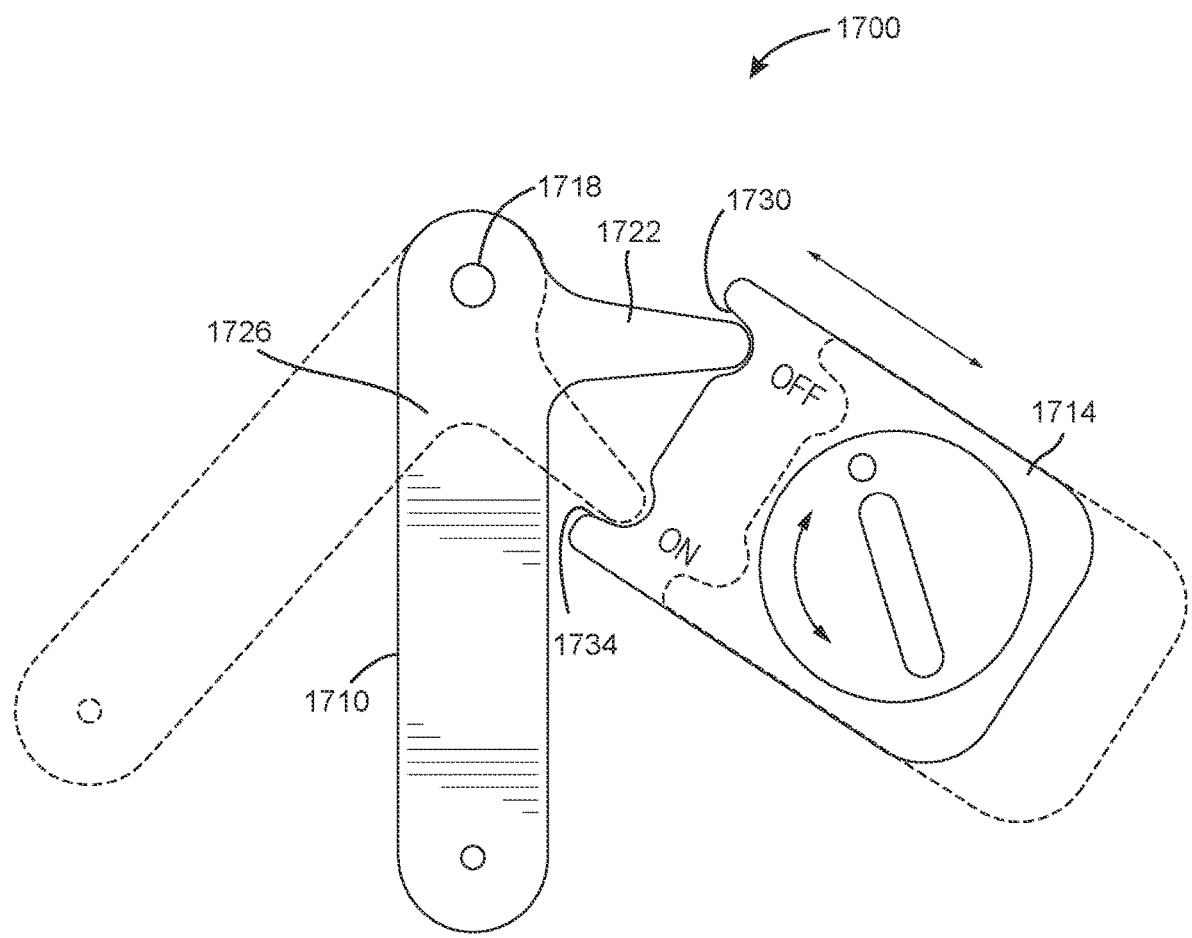
FIG. 65 is a schematic view of a remote throttle system according to another embodiment of the invention.

FIG. 65 is a remote throttle system 1700 according to another embodiment of the invention. The remote throttle system 1700 is operable in two different modes to control operation of the motor unit 1014. The remote throttle system 1700 includes a throttle lever 1710 and a mode selection bracket 1714. Although not illustrated, a throttle cable may be coupled to the throttle lever 1710 to actuate the throttle lever 1710. The throttle lever 1710 is rotatable about a pivot 1718 and includes an extension 1722 extending from a body 1726. The throttle lever 1710 is rotatable about the pivot 1718 to activate and control the rotational speed of the motor 36.

The mode selection bracket 1714 is movable between a first position and a second position, as shown in the broken lines. As such, the mode selection bracket 1714 is coupled to the motor unit 1014 adjacent the throttle lever 1710 and in a location where a user may have access to move the mode selection bracket 1714. The bracket 1714 includes a first detent 1730 and a second detent 1734 on a side of the bracket 1714 facing the throttle lever 1710. In the illustrated embodiment, a user may slide the bracket 1714 from the first position to the second position (shown in broken lines). In the first position, the bracket 1714 sets operation of the motor 36 to a first mode, and in the second position, the bracket 1714 sets the motor 36 to a second mode. In the illustrated embodiment of the system 1700, the first mode is an on/off mode and the second mode is a dynamic mode, both of which are further explained below.

In the on/off mode, the motor 36 is operable between a deactivated state, where the motor 36 remains inactive, and an activated state, where the motor 36 rotates. In some embodiments, the motor 36 operates at max power to rotate the power take-off shaft 38 when in the activated state. The motor unit 1014 may need to operate in the on/off mode for pieces of power equipment that only require the motor 36 to have one activated state. For example, a power washer only requires the motor 36 to operate at max throttle during use.

The extension 1722 of the throttle lever 1710 is movable between the first and second detents 1730, 1734. For example, a throttle cable may rotate the throttle lever 1710 about the pivot 1718 to position the extension 1722 into either the first or second detents 1730, 1734. In the illustrated embodiment, when the bracket 1714 is in the first position (i.e., the on/off mode shown in solid lines in FIG. 65), the bracket 1714 effectively functions as a bi-stable mechanism to position the extension 1722 in either the first detent 1730 or the second detent 1734. In other words, the extension 1722 will not rest at a position between the first and second detents 1730, 1734. When the extension 1722 is in the first detent 1730, the motor 36 receives input from the throttle lever 1710 to be in the deactivated state. However, when a user rotates the throttle lever 1710 to the second detent 1734, the motor 36 is activated and operable to rotate the power take-off shaft 38 at a predetermined rotational speed. A user may toggle the throttle lever 1710 between the first and second detents 1730, 1734 to change the state of the motor 36 as needed.

Alternatively, the bracket 1714 may be moved to the second position to allow the throttle lever 1710 to freely rotate about the pivot 1718 to operate the motor 36 in the second mode (i.e., a dynamic mode). In the second mode, the motor 36 may receive input from the throttle lever 1710 to operate in a dynamic mode where the motor 36 may vary the rotational speed of the power take-off shaft 38. With the bracket 1714 out of the way of the extension 1722, the throttle lever 1710 is able to freely rotate about the pivot 1718 between a plurality of positions. The user may vary the rotational position of the throttle lever 1710 to vary the rotational speed of the motor 36, and therefore the rotational speed of the power take-off shaft 38. For example, a user may move the bracket 1714 to the second position when the motor unit 1014 is supported by a power trowel. A user may desire to change the speed of a trowel blade to meet the requirement of curing concrete. It is contemplated that the mode selection bracket 1714 is preset to the on/off mode or the dynamic mode by the original equipment manufacturer of the power equipment in which the motor unit and remote throttle system 1700 are incorporated.

In some embodiments, the motor unit 1014 may include further switches that may also activate and deactivate the motor 36, such as safety switch or a kill switch. In further embodiments, the bracket 1714 may be replaced by a rotatable knob that rotates to toggle the motor 36 between the on/off mode and the dynamic mode.

Figure 66:
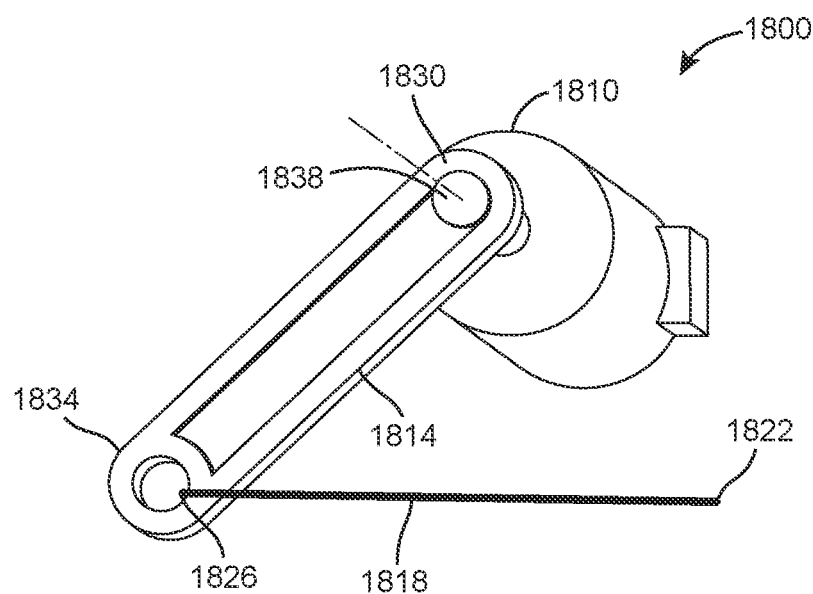
FIG. 66 is a perspective view of a remote throttle system according to another embodiment of the invention.

FIG. 66 illustrates a throttle system 1800 according to another embodiment of the invention. The throttle system 1800 may be used with the motor unit 1014 described above. In the illustrated embodiment, the throttle system 1800 is a remote throttle system that allows a user to operate the motor unit 1014 from a remote location (e.g., a handle of a trowel). The remote throttle system 1800 includes a rotational position sensor 1810, such as a potentiometer or encoder, and a throttle lever 1814 coupled for co-rotation with an input shaft 1838 of the sensor 1810. The potentiometer 1810 is operable to detect the position of the throttle lever 1814 and convert the detected position into an electrical signal output to the controller of the motor unit 1014 to control the rotational speed of the power take-off shaft 38.

The throttle lever 1814 may be located on a control panel, like the control panel 1010, and may be directly manipulated by a user to adjust the rotational position of the lever 1814, and thus adjust the rotational speed of the shaft 38. Alternatively, the lever 1814 may be indirectly manipulated by an actuator (e.g., a throttle cable 1818). In some embodiments, the throttle lever 1814 may be omitted and the sensor 1810 integrated with a control panel, like the control panel 1010, such that the user may directly manipulate the input shaft 1838 of the sensor 1810 in the same manner as the throttle dial 1046 described above. In other embodiments, the sensor 1810 may be configured as a linear position sensor (e.g., a linear potentiometer or linear encoder), and the throttle lever 1814 may be configured as a sliding actuator.

With continued reference to FIG. 66, a throttle cable 1818 may be attached to the throttle lever 1814 to permit remote actuation of the throttle system 1800. The cable 1818 includes a first end 1822 coupled, for example, to a throttle handle that is remotely positioned from the motor unit 1014 and a second end 1826 that is coupled to the throttle lever 1814. In some embodiments, the cable 1818 may be a component of existing controls on a piece of power equipment with which the motor unit 1014 may be used.

Figure 67:
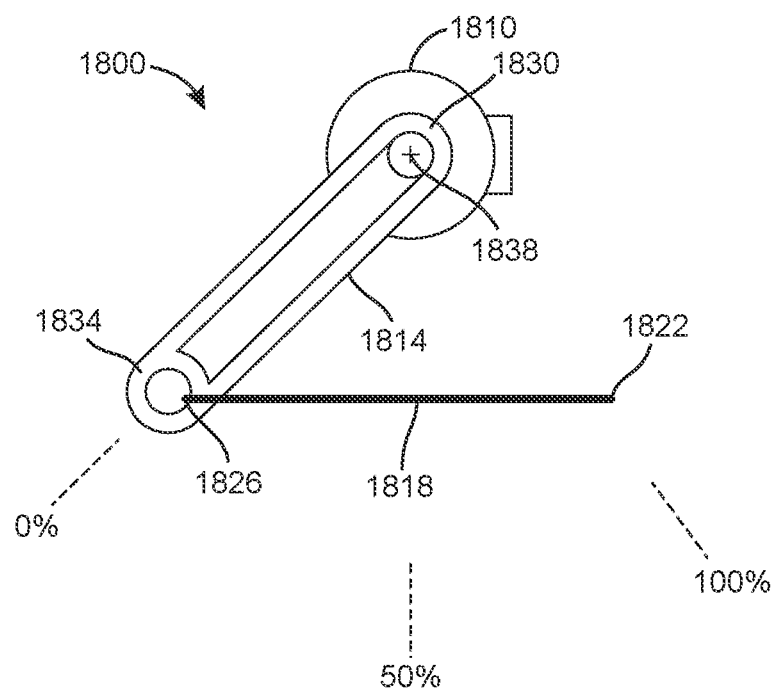
FIG. 67 is a side view of the remote throttle system of FIG. 66 in a first application.

As shown in FIG. 67, pivoting movement of the throttle lever 1814 from a no-load position (0%) to a full-load position (100%) is linear. In other words, the power output by the motor 1018 is directly proportional to the angular displacement of the throttle lever 1814. For example, an angular displacement of the throttle lever 1814 from 0% to 50% of its full range of angular displacement will adjust the power output of the motor unit 1014 from 0% to 50% of the total available power. In some embodiments, the throttle lever 1814 may be biased to the no-load position (i.e., 0% throttle) by a spring. In other embodiments, the throttle system 1800 may include a friction clutch that holds the throttle lever 1814 in a user-selected position after initially being set by the user.

Figure 68:
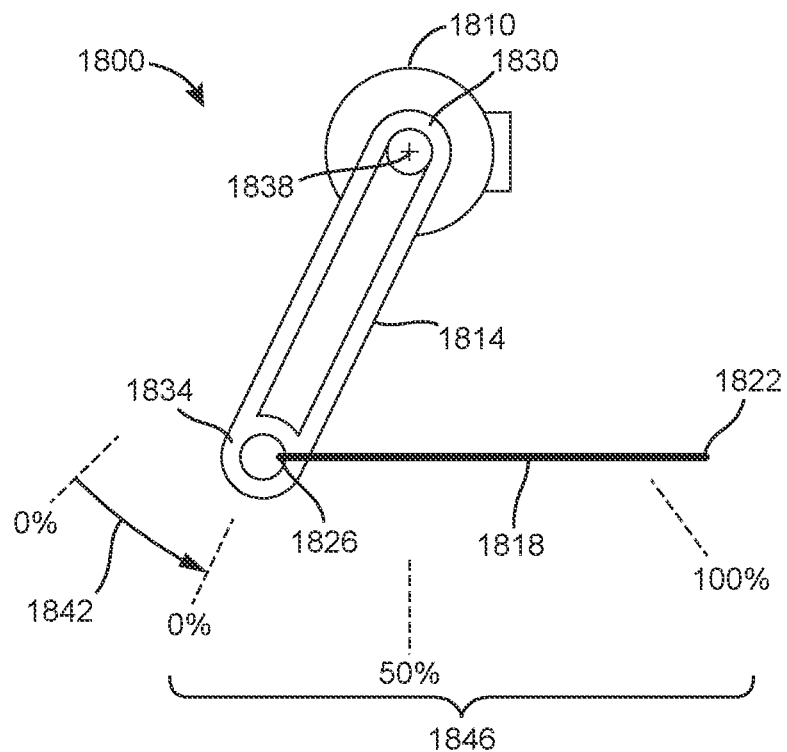
FIG. 68 is a side view of the remote throttle system of FIG. 66 in a second application.

In some embodiments, as shown in FIG. 68, it may be desirable to configure the throttle system 1800 with a "dead" or "inactive zone 1842" coinciding with a portion of the total range of angular displacement of the throttle lever 1814. For example, the sensor 1810 may be calibrated such that a first portion 1842 of the total range of angular displacement of the throttle lever 1814 will output an electrical signal to the controller of the motor unit 1014 coinciding with 0% throttle. After the throttle lever 1814 exits the inactive zone 1842 and enters an "active zone 1846", the sensor 1810 outputs an electrical signal to the controller to increase the power output (and thus the rotational speed) of the power take-off shaft 38. As such, the throttle system 1800 may simulate slack in the throttle cable 1818 by including the inactive zone 1842.

Figure 69:
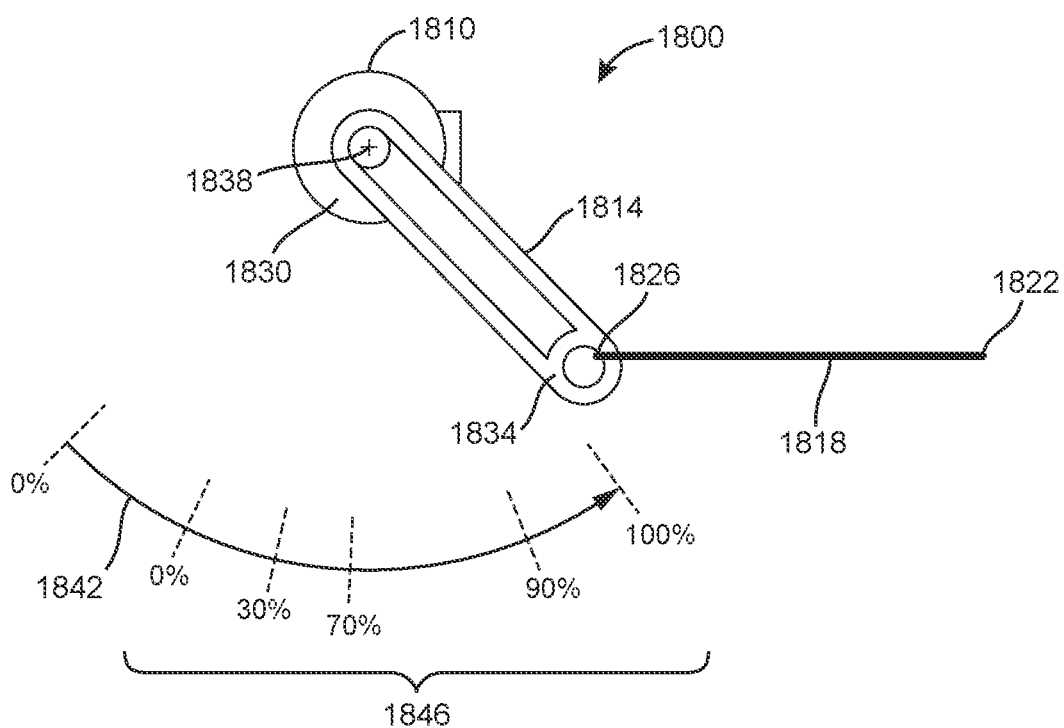
FIG. 69 is a first side view of the remote throttle system of FIG. 66 in a third application.

In further embodiments, it may desirable to have the movement of the throttle lever 1814 correlate to a non-linear change in the power output from the motor 36 to the power take-off shaft 38. In other words, the angular displacement of the throttle lever 1814 coinciding with 0% throttle through 30% throttle may be different than the angular displacement of the throttle lever 1814 coinciding with 70% throttle through 100% throttle. For example, as shown in FIG. 69, the throttle system 1800 may include the inactive zone 1842 and the active zone 1846. As the throttle lever 1814 moves across the active zone 1846, an increase of throttle from 0% to 30% requires the throttle lever 1814 to move a lower angular displacement compared to the angular displacement of the lever 1814 to increase the throttle from 70% to 100%. Such an embodiment would allow for finer speed control of the power take-off shaft 38 at higher power outputs and speeds of the motor 36.

In an alternative embodiment, the throttle system 1800 may be able to program the high and low speed positions of the motor 36 based off the position of the throttle lever 1814. For example, if a fully tensioned throttle cable 1818 (or alternatively, a linkage system) were longer or shorter due to manufacturer variability, the throttle cable 1818 may not be able to pull the throttle lever 1814 to the 100% throttle position or return the throttle lever 1814 to the 0% throttle position. As such, the throttle system 1800 may be calibrated to correlate the minimum and maximum positions of the throttle lever 1814 or hand controls to the 0% and 100% load or throttle positions, respectively, of the motor unit 1014. The minimum and maximum positions of the throttle lever 1814 or hand controls on a piece of power equipment may then be programmed and stored in the controller of the motor unit 1014.

Various features and advantages of the invention are set forth in the following claims.

What is claimed is:

1. A stand-alone motor unit for use with a piece of power equipment, the motor unit comprising:
    a housing;
    a flange coupled to the housing on a first side thereof, the flange configured to couple the motor unit to the piece of power equipment;
    an electric motor;
    a battery pack to provide power to the motor;
    a battery receptacle arranged on the housing and configured to receive the battery pack;
    a power take-off shaft receiving torque from the motor;
    a throttle in communication with the motor, the throttle movable to adjust the rotational speed of the power take-off shaft; and
    a switch located adjacent the throttle;
    wherein the switch is activated and the rotational speed of the power take-off shaft is adjusted, in sequence, in response to actuation of the throttle; and
    wherein the throttle includes a body and an extension extending from the body, wherein the extension engages the switch to activate the switch;
    wherein the extension is rotatable to engage the switch and activate the switch.

2. The motor unit of claim 1, further comprising:
    a control panel arranged on the housing, the control panel operable to control operation of the electric motor;
    wherein the control panel includes:
        a motor light-emitting-diode indicator operable to indicate a state of the electric motor, and
        a power light-emitting-diode indicator operable to indicate a state of the battery pack.

3. The motor unit of claim 2, wherein the control panel is removably coupled to the housing.

4. The motor unit of claim 2, further comprising a throttle cable having a first end coupled to the throttle and a second end configured to be coupled to a throttle actuator on the piece of power equipment.

5. The motor unit of claim 2, wherein the throttle is rotatable in a first direction to increase power drawn by the motor from the battery pack to rotate the power take-off shaft at higher rotational speeds, and wherein the throttle is rotatable in an opposite, second direction to decrease power drawn by the motor from the battery pack to rotate the power take-off shaft at lower rotational speeds.

6. The motor unit of claim 2, wherein the throttle is biased toward a neutral position in which the motor is deactivated, wherein the throttle is rotatable in a first direction away from the neutral position to operate the motor in a first mode, and wherein the throttle is rotatable in an opposite, second direction away from the neutral position to operate the motor in a second mode that is different than the first mode.

7. The motor unit of claim 6, wherein, when the motor is operating in the first mode, the power take-off shaft rotates in a first rotational direction, and when the motor is operating in the second mode, the power take-off shaft rotates in a second rotational direction that is opposite the first rotational direction.

8. The motor unit of claim 6, wherein, when the motor is operating in the first mode, the motor outputs a first parameter, and when the motor is operating in the second mode, the motor outputs a second parameter that is different than the first parameter.

9. The motor unit of claim 8, wherein the first parameter is a first horsepower and the second parameter is a second horsepower.

10. The motor unit of claim 2, further comprising a position sensor coupled to the throttle for movement with the throttle, wherein the position sensor is operable to detect the position of the throttle to control the rotational speed of the power take-off shaft.

11. The motor unit of claim 2, wherein the control panel includes a user input selected from the group consisting of a power button, an emergency stop, a mode selector, and a throttle dial.

12. The motor unit of claim 2, wherein the control panel is in wireless communication with the motor.

13. The motor unit of claim 12, wherein the motor is electrically coupled to a first wireless communication device and the control panel includes a second wireless communication device that communicates with the first wireless communication device to control operation of the motor.

14. The motor unit of claim 1, wherein the switch is configured to arm the motor unit in response to being activated.

15. The motor unit of claim 1, further comprising an actuator coupled to the throttle, wherein the actuator is operable to receive input from a user and, in sequence, activate the switch and the throttle to adjust the rotational speed of the power take-off shaft.

16. The motor unit of claim 1, wherein the throttle is rotatable about a pivot axis to activate the switch.

17. The motor unit of claim 2, wherein the throttle is a moveable throttle positioned on the control panel to control the rotational speed of the power take-off shaft.

18. The motor unit of claim 1, further comprising a control panel arranged on the housing operable to control operation of the electric motor, wherein the throttle is arranged on the control panel, and wherein the control panel further includes:
   a motor indicator operable to indicate a state of the electric motor, and
   a power indicator operable to indicate a state of the battery pack.

19. The motor unit of claim 2, wherein the control panel further includes an ON/OFF indicator configured to indicate if the motor is armed.

20. The motor unit of claim 2, wherein the state of the electric motor is a temperature condition of the electric motor.

* * * * *